(12) United States Patent
Iguchi et al.

(10) Patent No.: US 11,210,814 B2
(45) Date of Patent: Dec. 28, 2021

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/155,634

(22) Filed: Jan. 22, 2021

(65) Prior Publication Data

US 2021/0142521 A1    May 13, 2021

Related U.S. Application Data

(63) Continuation of application No. PCT/JP2019/039904, filed on Oct. 9, 2019.
(60) Provisional application No. 62/743,229, filed on Oct. 9, 2018.

(51) Int. Cl.
*G06T 9/00* (2006.01)
*H04N 13/161* (2018.01)

(52) U.S. Cl.
CPC ............. *G06T 9/00* (2013.01); *H04N 13/161* (2018.05)

(58) Field of Classification Search
None
See application file for complete search history.

(56) References Cited

U.S. PATENT DOCUMENTS

2010/0118119 A1* 5/2010 Newton ............... H04N 5/85
348/42
2014/0375638 A1 12/2014 Tomaru et al.

FOREIGN PATENT DOCUMENTS

WO    2014/020663    2/2014

OTHER PUBLICATIONS

International Search Report (ISR) dated December 17, 2019 in International (PCT) Application No. PCT/JP2019/039904.
(Continued)

*Primary Examiner* — Christopher Braniff
(74) *Attorney, Agent, or Firm* — Wenderoth, Lind & Ponack, L.L.P.

(57) ABSTRACT

A three-dimensional data encoding method includes: generating encoded data by encoding third point cloud data that is a combination of first point cloud data and second point cloud data; and generating a bitstream including the encoded data and control information. The encoded data includes a piece of geometry information and pieces of attribute information of each of three-dimensional points included in the third point cloud data. One of the pieces of attribute information includes first information indicating whether a corresponding one of the three-dimensional points belongs to the first point cloud data or the second point cloud data. The control information includes second information indicating, among the pieces of attribute information, a piece of attribute information including the first information.

13 Claims, 83 Drawing Sheets

(56) References Cited

OTHER PUBLICATIONS

George P. Gerdan, et al. "Transforming Cartesian coordinates X,Y,Z to Geographical coordinates φ, λ, h", The Australian Surveyor, vol. 44, No. 1, pp. 55-63, Jun. 1999.
Extended European Search Report dated Oct. 27, 2021 in corresponding European Patent Application No. 19871199.6.
Khaled Mammou et al, "G-PCC codec description v2", ISO/IEC JTC1/SC29/WG11 N18189, Jan. 2019, pp. 1-39, XP055741386.

* cited by examiner

| | GEOMETRY INFORMATION | ATTRIBUTE INFORMATION |
|---|---|---|
| n = 1 | G(1) = (x_1, y_1, z_1) | A(1) = (R_1, G_1, B_1) |
| n = 2 | G(2) = (x_2, y_2, z_2) | A(2) = (R_2, G_2, B_2) |
| ⋮ | ⋮ | ⋮ |
| n = N | G(N) = (x_N, y_N, z_N) | A(N) = (R_N, G_N, B_N) |

FIG. 19

EXAMPLES OF SEMANTICS OF pcc_nal_unit_type
(1) if pcc_codec_type == Codec 1
    0:Codec1 Goemetry
    1:Codec1 AttributeX
    2:Codec1 AttributeY
    3:Codec1 Geom. PS
    4:Codec1 AttrX. PS
    5:Codec1 AttrX. PS
    6:Codec1 Geometry Sequence PS
    7:Codec1 AttributeX Sequence PS
    8:Codec1 AttributeY Sequence PS
    9:Codec1 AU Header
   10:Codec1 GOF Header
 11 ~:Codec1 reserved for future use (2) if pcc_codec_type == Codec 2
    0:Codec2 DataA
    1:Codec2 MetaDataA
    2:Codec2 MetaDataB
  3 ~:Codec2 reserved for future use

```
Geometry_header(){
    gps_idx
    offset
    other_geometry_information
    if(combine_frame_flag){
        number_of_combine_frame
    }
    if(tile){
        tile_type
        tile_idx
    }
    if(slice){
        slice_type
        slice_idx
    }
}
```

```
Geometry_data(){
    for(depth<maxDepth){
        for(i<MaxNodes){
            occupancy_Code(depth, i)
            node_information(depth, i){
                if(i==MaxNodes-1){
                    combine_information();
                }
            }
        }
    }
}
```

```
combine_information(){
  NumberOfPoints
  for(i<NumberOfPoints){
    FrameIndex (i)
  }
}
```

```
combine_information(){
  bitmapIsFramePointsFlag
}
```

00010101
      BIT MAP
LEAF NODE

```
Attribute_header(){
   aps_idx
   offset
   other_attribute_information
   if(combine_frame_flag){
      number_of_combine_frame
   }
   if(tile){
      tile_type
      tile_idx
   }
   if(slice){
      slice_type
      slice_idx
   }
}
```

```
Attribute_data(){
   combine_information();
}
```

HEADER  PAYLOAD

FIG. 80

| VALUE | BIT |
|---|---|
| 0 | 1 |
| 1 | 010 |
| 2 | 011 |
| 3 | 00100 |
| 4 | 00101 |
| 5 | 00110 |
| 6 | 00111 |
| 7 | 0001000 |
| ... | ... |

FIG. 81

| VALUE | BIT |
|---|---|
| 3 | 00100 |
| 4 | 00101 |
| 5 | 00110 |
| 6 | 00111 |

→ prefix 00  1  suffix 00

TERMINAL SYMBOL

FIG. 82

```
attribute_header{
...
NumLoD
...
for (i=0; i<NumLoD; i++) {
 NumOfPoint[i]
}
...
for (i=0; i<NumLoD-1; i++) {
 Thres_Lod[i]
}
...
for (i=0; i<NumLoD; i++) {
 NumNeighborPoint[i]
}
...
for (i=0; i<NumLoD; i++) {
 THd[i]
}
...
for (i=0; i<NumLoD; i++) {
 QS[i]
}
...
for (i=0; i<NumLoD; i++) {
 R_TH[i]
}
...
}
```

FIG. 83

```
attribute_data{
...
for (i=0; i<NumLoD; i++) {
 for (j=0; j<NumOfPoint[i]; j++) {
  n-bit code
  if (n-bit code == R_TH[i])
   remaining code
 }
}
...
}
```

FIG. 86

| VALUE | BIT   |
|-------|-------|
| 3     | 00100 |
| 4     | 00101 |
| 5     | 00110 |
| 6     | 00111 | prefix  suffix 00  1  00

↑ TERMINAL SYMBOL

FIG. 87

| VALUE | BIT     |
|-------|---------|
| 0     | 1       |
| 1     | 010     |
| 2     | 011     |
| 3     | 00100   |
| 4     | 00101   |
| 5     | 00110   |
| 6     | 00111   |
| 7     | 0001000 |
| ...   | ...     |

00100 REVERSE REFERENCE

FIG. 97

| SPS | GPS(1-4) | G(1-4) | APS1(1-4) | A1(1-4) | G(5) | G(6-9) | APS1(6-9) | A1(6-9) |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2019/039904 filed on Oct. 9, 2019, claiming the benefit of priority of U.S. Provisional Patent Application No. 62/743,229 filed on Oct. 9, 2018, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see International Publication WO 2014/020663).

SUMMARY

There has been a demand for reducing a processing amount in encoding and decoding of three-dimensional data.

The present disclosure has an object to provide a three-dimensional data encoding method, a three-dimensional data decoding method, a three-dimensional data encoding device, or a three-dimensional data decoding device that is capable of reducing a processing amount.

A three-dimensional data encoding method according to one aspect of the present disclosure includes: generating encoded data by encoding third point cloud data that is a combination of first point cloud data and second point cloud data; and generating a bitstream including the encoded data and control information. The encoded data includes a piece of geometry information and pieces of attribute information of each of three-dimensional points included in the third point cloud data. One of the pieces of attribute information includes first information indicating whether a corresponding one of the three-dimensional points belongs to the first point cloud data or the second point cloud data. The control information includes second information indicating, among the pieces of attribute information, a piece of attribute information including the first information.

A three-dimensional data decoding method according to one aspect of the present disclosure includes: obtaining encoded data from a bitstream, the encoded data including a piece of geometry information and pieces of attribute information of each of three-dimensional points included in third point cloud data that is a combination of first point cloud data and second point cloud data; obtaining second information from control information included in the bitstream, the second information indicating, among the pieces of attribute information, a piece of attribute information including first information indicating whether a corresponding one of the three-dimensional points belongs to the first point cloud data or the second point cloud data; and obtaining the first information using the second information.

The present disclosure provides a three-dimensional data encoding method, a three-dimensional data decoding method, a three-dimensional data encoding device, or a three-dimensional data decoding device that is capable of reducing a processing amount.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 19 is a diagram illustrating a semantics example of pcc_nal_unit_type according to Embodiment 3;

FIG. 80 is a diagram showing an example of exponential Golomb coding according to Embodiment 6;

FIG. 81 is a diagram for describing a process for an exponential Golomb code according to Embodiment 6;

FIG. 82 is a diagram showing a syntax example of an attribute header according to Embodiment 6;

FIG. 83 is a diagram showing a syntax example of attribute data according to Embodiment 6;

FIG. 86 is a diagram for describing a process for an exponential Golomb code according to Embodiment 6;

FIG. 87 is a diagram showing an example of a reverse reference table that indicates a relationship between remaining codes and values thereof according to Embodiment 6;

FIG. 97 is a diagram showing an example of encoded data according to Embodiment 7;

DETAILED DESCRIPTION OF THE EMBODIMENTS

Figure 1:
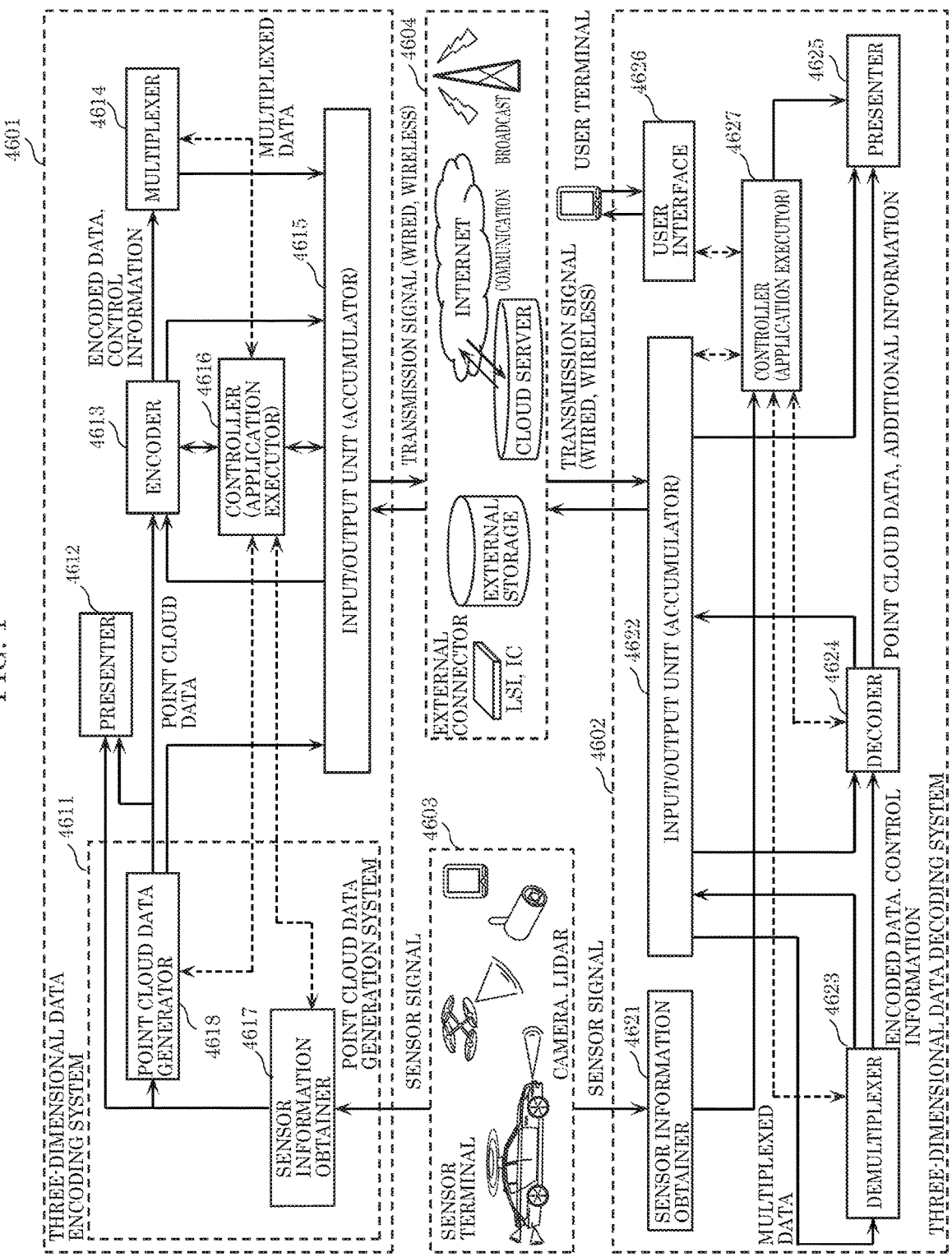
FIG. 1 is a diagram illustrating a configuration of a three-dimensional data encoding and decoding system according to Embodiment 1.

A three-dimensional data encoding method according to one aspect of the present disclosure includes: generating encoded data by encoding third point cloud data that is a combination of first point cloud data and second point cloud data; and generating a bitstream including the encoded data and control information. The encoded data includes a piece of geometry information and pieces of attribute information of each of three-dimensional points included in the third point cloud data. One of the pieces of attribute information includes first information indicating whether a corresponding one of the three-dimensional points belongs to the first point cloud data or the second point cloud data. The control information includes second information indicating, among the pieces of attribute information, a piece of attribute information including the first information.

With this configuration, when any of the pieces of attribute information includes the first information, a three-dimensional data decoding device that decodes the bitstream generated in the three-dimensional data encoding method can easily determine the attribute information including the first information using the second information included in the control information. Therefore, the three-dimensional data encoding method can reduce the processing amount of the three-dimensional data decoding device.

For example, the control information may be common to frames.

For example, the three-dimensional data encoding method may further include encoding the piece of attribute information including the first information using lossless encoding.

For example, the three-dimensional data encoding method may further include setting a quantization parameter so that the lossless encoding is to be used.

For example, the three-dimensional data encoding method may further include: adjusting a position of a point cloud included in the second point cloud data using motion information indicating motion between the first point cloud data and the second point cloud data; and generating the third point cloud data by combining the first point cloud data and the second point cloud data after the adjusting. The encoded data may include the motion information.

With this configuration, the three-dimensional data encoding method can bring the positions of point clouds to be combined closer to each other, so that the coding efficiency can be improved.

A three-dimensional data decoding method according to one aspect of the present disclosure includes: obtaining encoded data from a bitstream, the encoded data including a piece of geometry information and pieces of attribute information of each of three-dimensional points included in third point cloud data that is a combination of first point cloud data and second point cloud data; obtaining second information from control information included in the bitstream, the second information indicating, among the pieces of attribute information, a piece of attribute information including first information indicating whether a corresponding one of the three-dimensional points belongs to the first point cloud data or the second point cloud data; and obtaining the first information using the second information.

With this configuration, when the first information is included in any of pieces of attribute information, the three-dimensional data decoding method can easily determine the attribute information including the first information using the second information included in the control information. Therefore, the three-dimensional data decoding method can reduce the processing amount.

For example, the control information may be common to frames.

For example, the piece of attribute information including the first information may be encoded using lossless encoding.

For example, a quantization parameter may be set so that the lossless encoding is to be used.

For example, the three-dimensional data decoding method may further include separating the first point cloud data and the second point cloud data from the third point cloud data using the first information.

For example, the three-dimensional data decoding method may further include: obtaining motion information from the bitstream, the motion information indicating motion between the first point cloud data and the second point cloud data; and adjusting a position of a point cloud included in the second point cloud data using the motion information.

With this configuration, the three-dimensional data decoding method can decode a bitstream encoded with an improved coding efficiency by bringing the positions of point clouds to be combined closer to each other.

A three-dimensional data encoding device according to one aspect of the present disclosure includes a processor and memory. Using the memory, the processor: generates encoded data by encoding third point cloud data that is a combination of first point cloud data and second point cloud data; and generates a bitstream including the encoded data and control information. The encoded data includes a piece of geometry information and pieces of attribute information of each of three-dimensional points included in the third point cloud data. One of the pieces of attribute information includes first information indicating whether a corresponding one of the three-dimensional points belongs to the first point cloud data or the second point cloud data. The control information includes second information indicating, among the pieces of attribute information, a piece of attribute information including the first information.

With this configuration, when any of pieces of attribute information includes the first information, a three-dimensional data decoding device that decodes the bitstream generated by the three-dimensional data encoding device can easily determine the attribute information including the first information using the second information included in the control information. Therefore, the three-dimensional data encoding device can reduce the processing amount of the three-dimensional data decoding device.

A three-dimensional data decoding device according to one aspect of the present disclosure includes a processor and memory. Using the memory, the processor: obtains encoded data from a bitstream, the encoded data including a piece of geometry information and pieces of attribute information of each of three-dimensional points included in third point cloud data that is a combination of first point cloud data and second point cloud data; obtains second information from control information included in the bitstream, the second information indicating, among the pieces of attribute information, a piece of attribute information including first information indicating whether a corresponding one of the three-dimensional points belongs to the first point cloud data or the second point cloud data; and obtains the first information using the second information.

With this configuration, when the first information is included in any of pieces of attribute information, the three-dimensional data decoding device can easily determine the attribute information including the first information using the second information included in the control information. Therefore, the three-dimensional data decoding device can reduce the processing amount.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LIDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
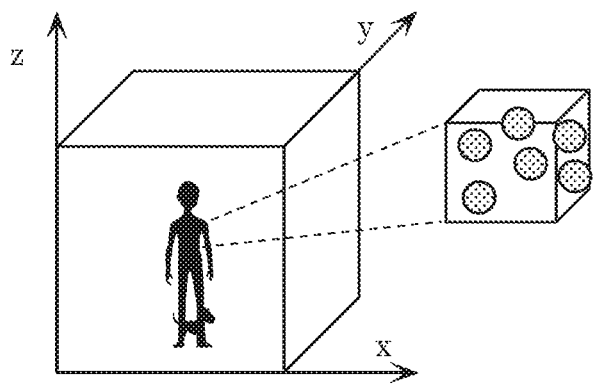
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One piece of attribute information may be associated with one piece of geometry information, or attribute information on a plurality of different types of attributes may be associated with one piece of geometry information. Alternatively, a plurality of pieces of attribute information on the same type of attribute may be associated with one piece of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
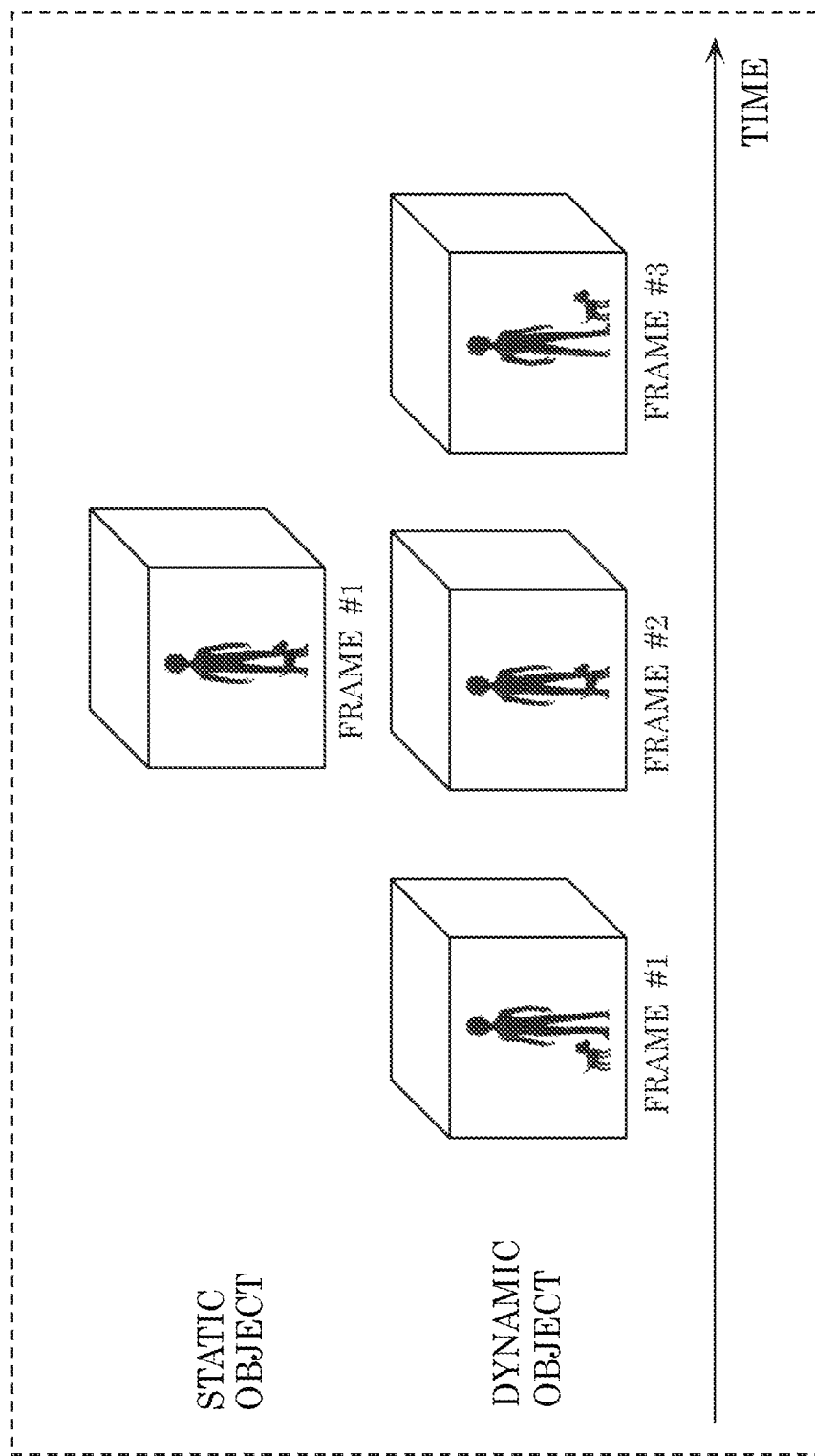
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LIDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
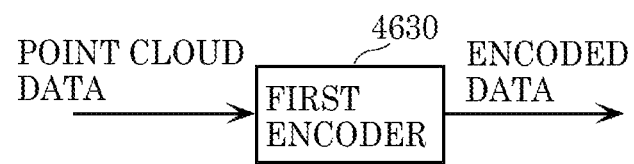
FIG. 5 is a diagram illustrating a structure of a first encoder according to Embodiment 1.
Figure 6:
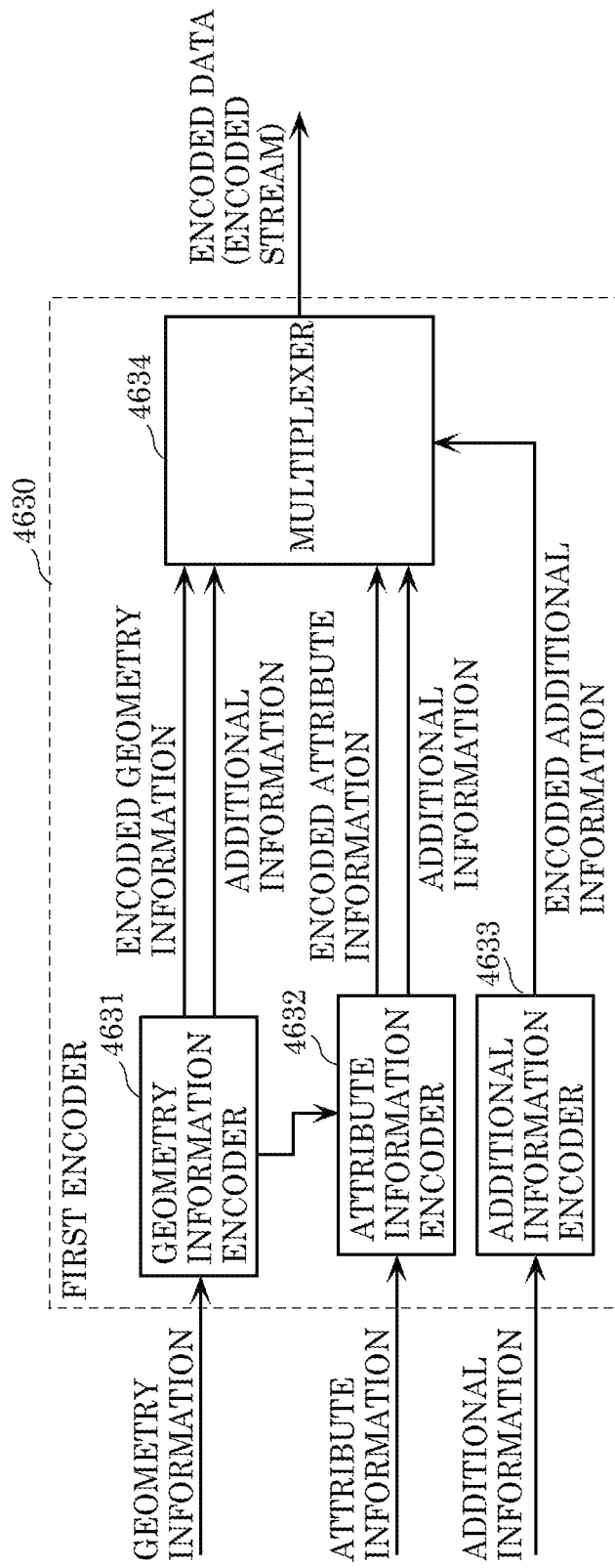
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (current node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
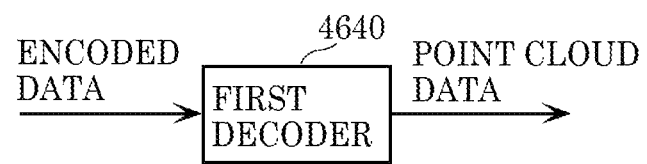
FIG. 7 is a diagram illustrating a structure of a first decoder according to Embodiment 1.
Figure 8:
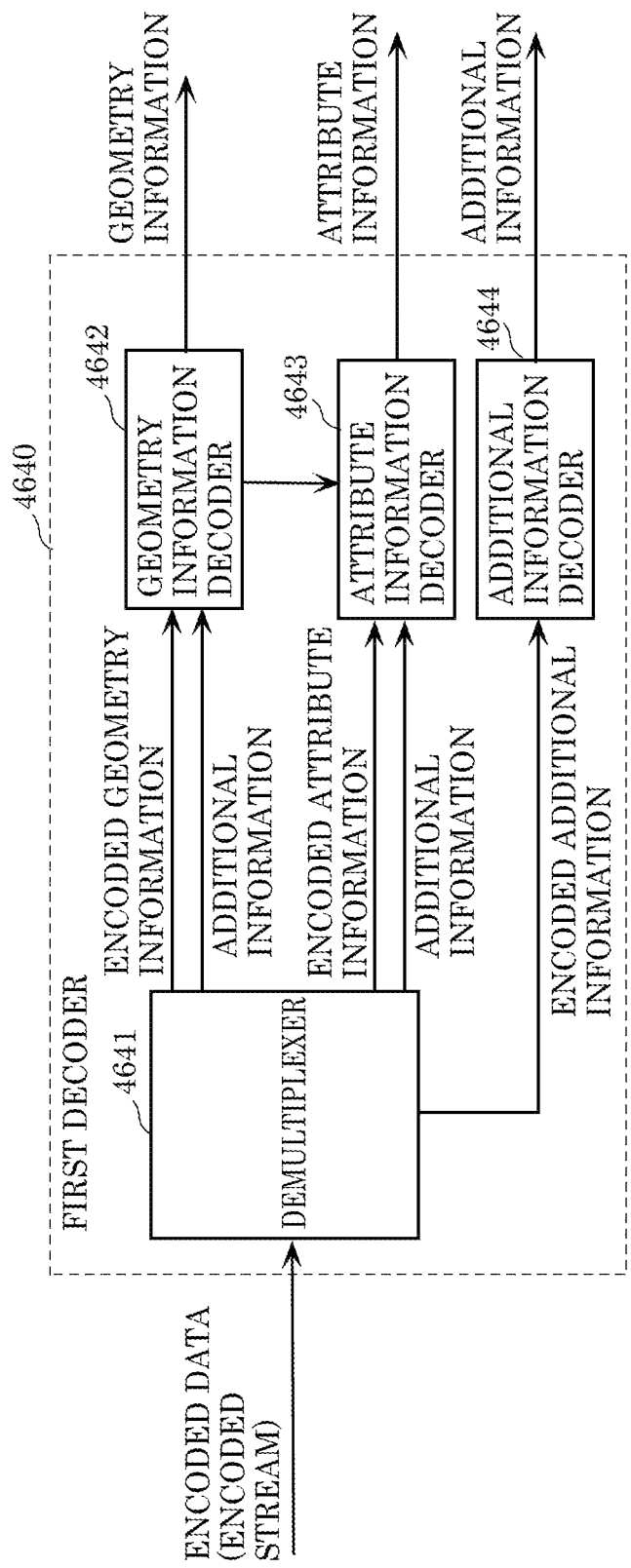
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information.

For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
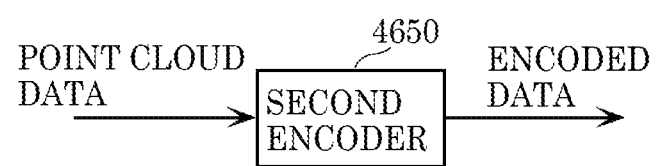
FIG. 9 is a diagram illustrating a structure of a second encoder according to Embodiment 1.
Figure 10:
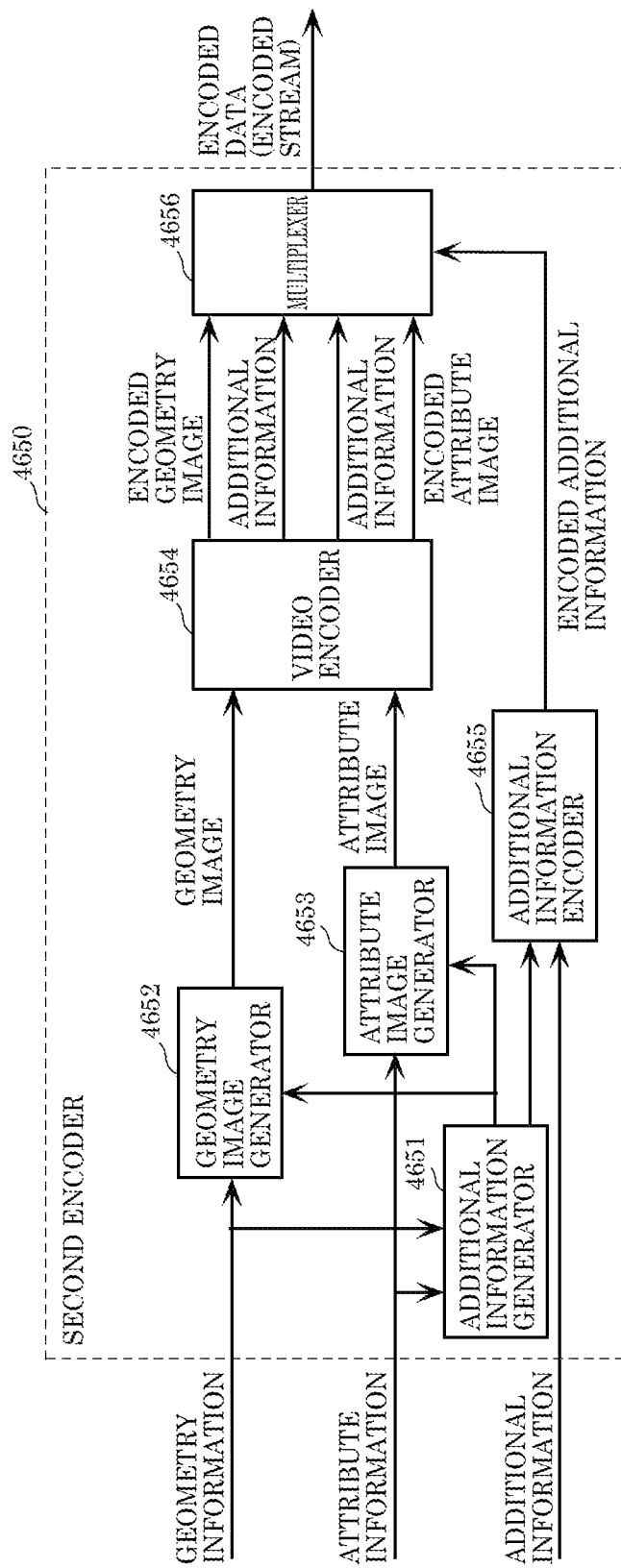
FIG. 10 is a block diagram illustrating the second encoder according to Embodiment 1.

Next, second encoder 4650, which is an example of encoder 4613 that performs encoding in the second encoding method, will be described. FIG. 9 is a diagram showing a configuration of second encoder 4650. FIG. 10 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 11:
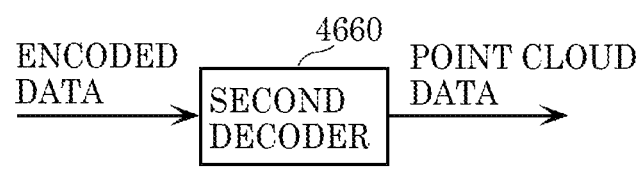
FIG. 11 is a diagram illustrating a structure of a second decoder according to Embodiment 1.
Figure 12:
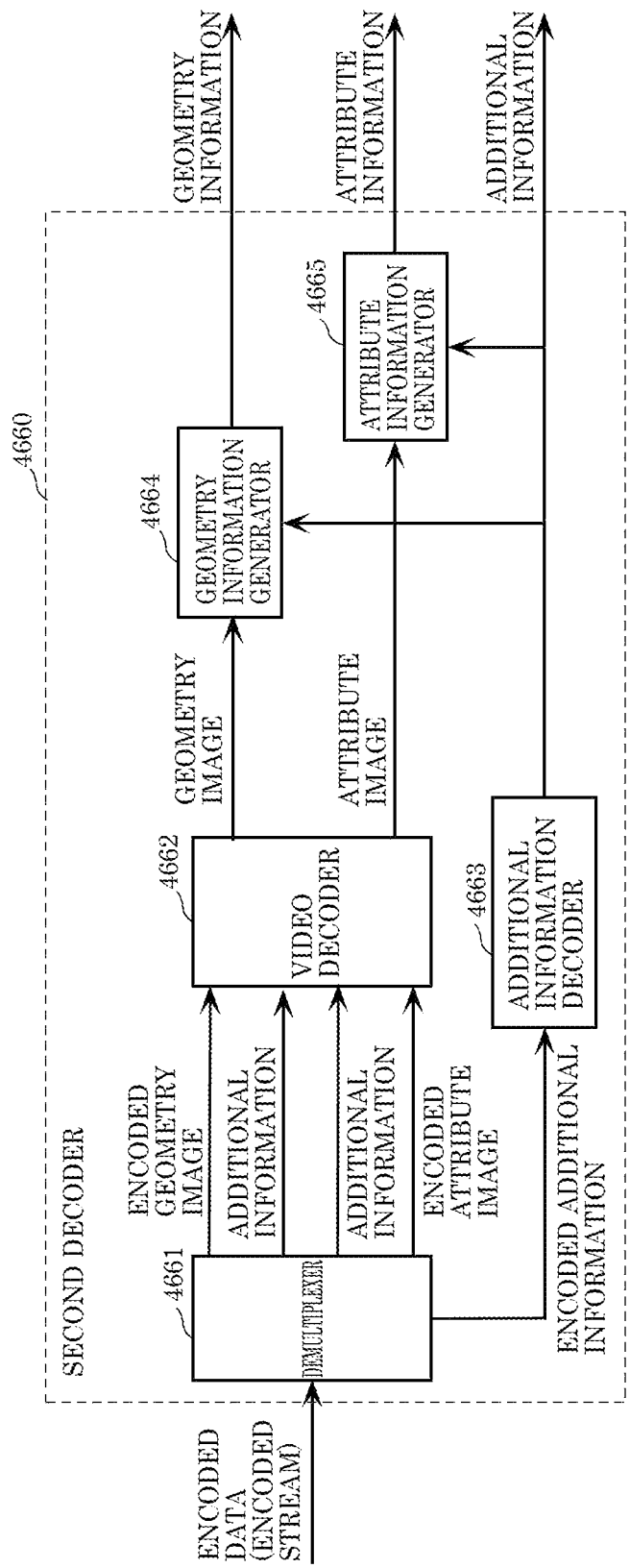
FIG. 12 is a block diagram illustrating the second decoder according to Embodiment 1.

Next, second decoder 4660, which is an example of decoder 4624 that performs decoding in the second encoding method, will be described. FIG. 11 is a diagram showing a configuration of second decoder 4660. FIG. 12 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 13:
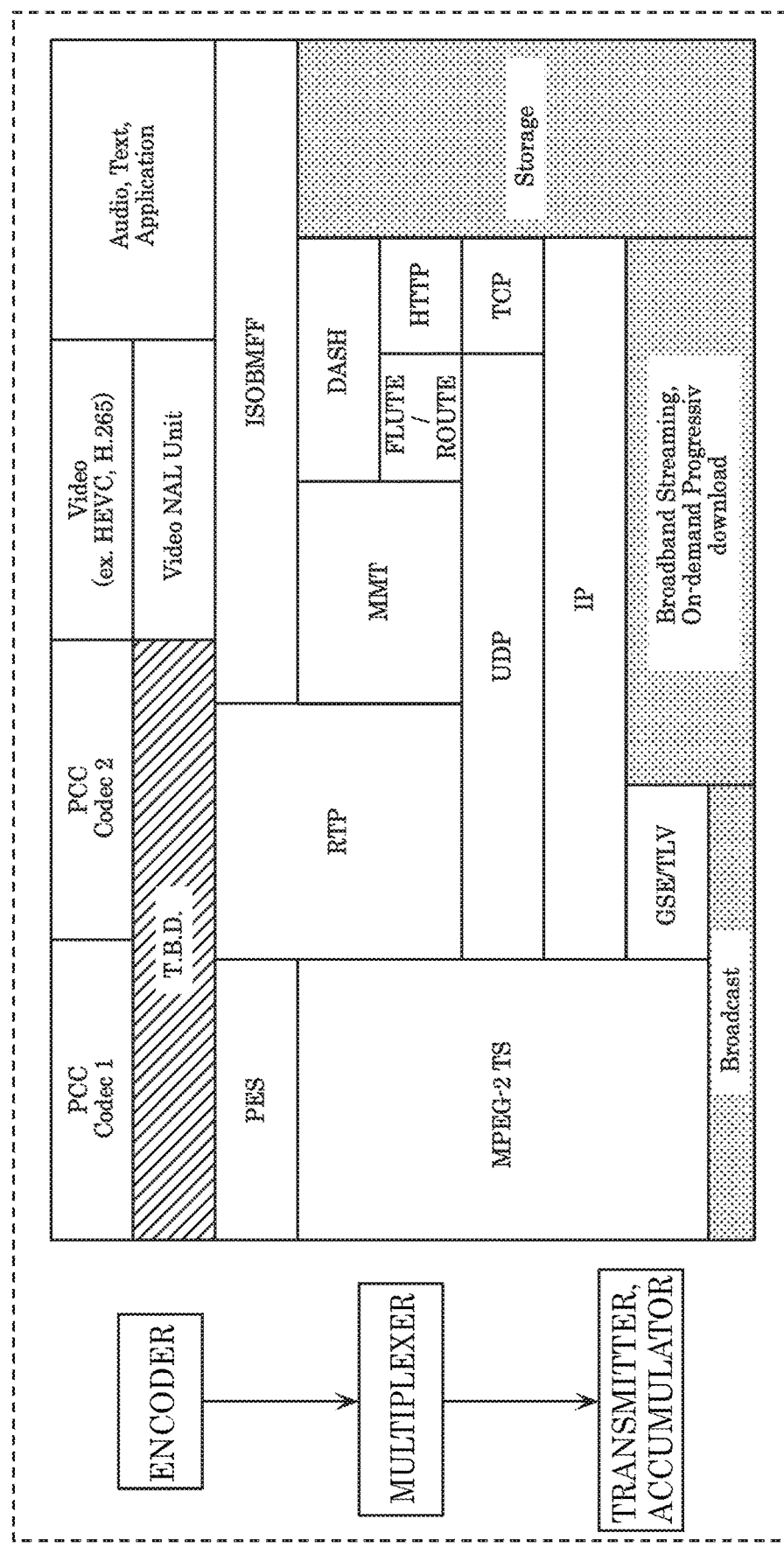
FIG. 13 is a diagram illustrating a protocol stack related to PCC encoded data according to Embodiment 1.

In the following, a problem with the PCC encoding scheme will be described. FIG. 13 is a diagram showing a protocol stack relating to PCC-encoded data. FIG. 13 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In Embodiment 2, a method of storing the NAL unit in an ISOBMFF file will be described.

ISOBMFF is a file format standard prescribed in ISO/IEC14496-12. ISOBMFF is a standard that does not depend on any medium, and prescribes a format that allows various media, such as a video, an audio, and a text, to be multiplexed and stored.

A basic structure (file) of ISOBMFF will be described. A basic unit of ISOBMFF is a box. A box is formed by type, length, and data, and a file is a set of various types of boxes.

Figures 14, 15:
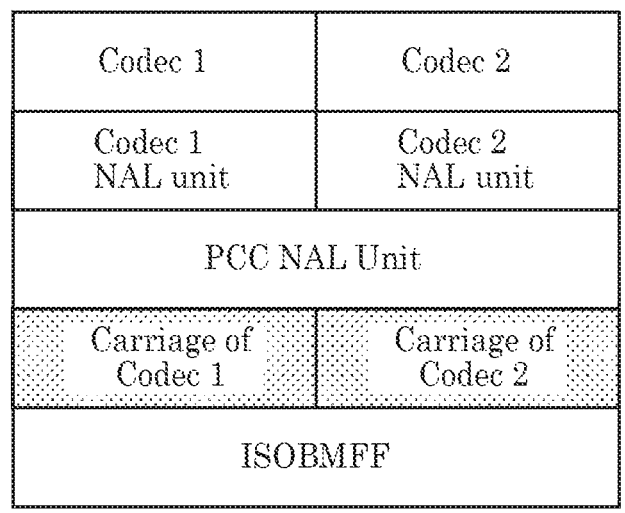
FIG. 14 is a diagram illustrating a basic structure of ISOBMFF according to Embodiment 2.
FIG. 15 is a diagram illustrating a protocol stack according to Embodiment 2.

FIG. 14 is a diagram showing a basic structure (file) of ISOBMFF. A file in ISOBMFF includes boxes, such as ftyp that indicates the brand of the file by four-character code (4CC), moov that stores metadata, such as control information (signaling information), and mdat that stores data.

A method for storing each medium in the ISOBMFF file is separately prescribed. For example, a method of storing an AVC video or an HEVC video is prescribed in ISO/IEC14496-15. Here, it can be contemplated to expand the functionality of ISOBMFF and use ISOBMFF to accumulate or transmit PCC-encoded data. However, there has been no convention for storing PCC-encoded data in an ISOBMFF file. In this embodiment, a method of storing PCC-encoded data in an ISOBMFF file will be described.

FIG. 15 is a diagram showing a protocol stack in a case where a common PCC codec NAL unit in an ISOBMFF file. Here, a common PCC codec NAL unit is stored in an ISOBMFF file. Although the NAL unit is common to PCC codecs, a storage method for each codec (Carriage of Codec1, Carriage of Codec2) is desirably prescribed, since a plurality of PCC codecs are stored in the NAL unit.

Embodiment 3

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 16:
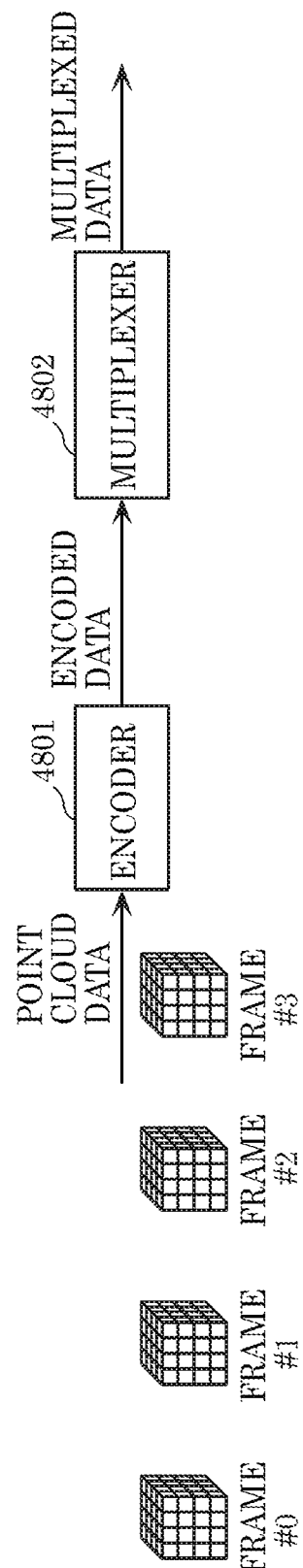
FIG. 16 is a diagram illustrating structures of an encoder and a multiplexer according to Embodiment 3.

FIG. 16 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 17:
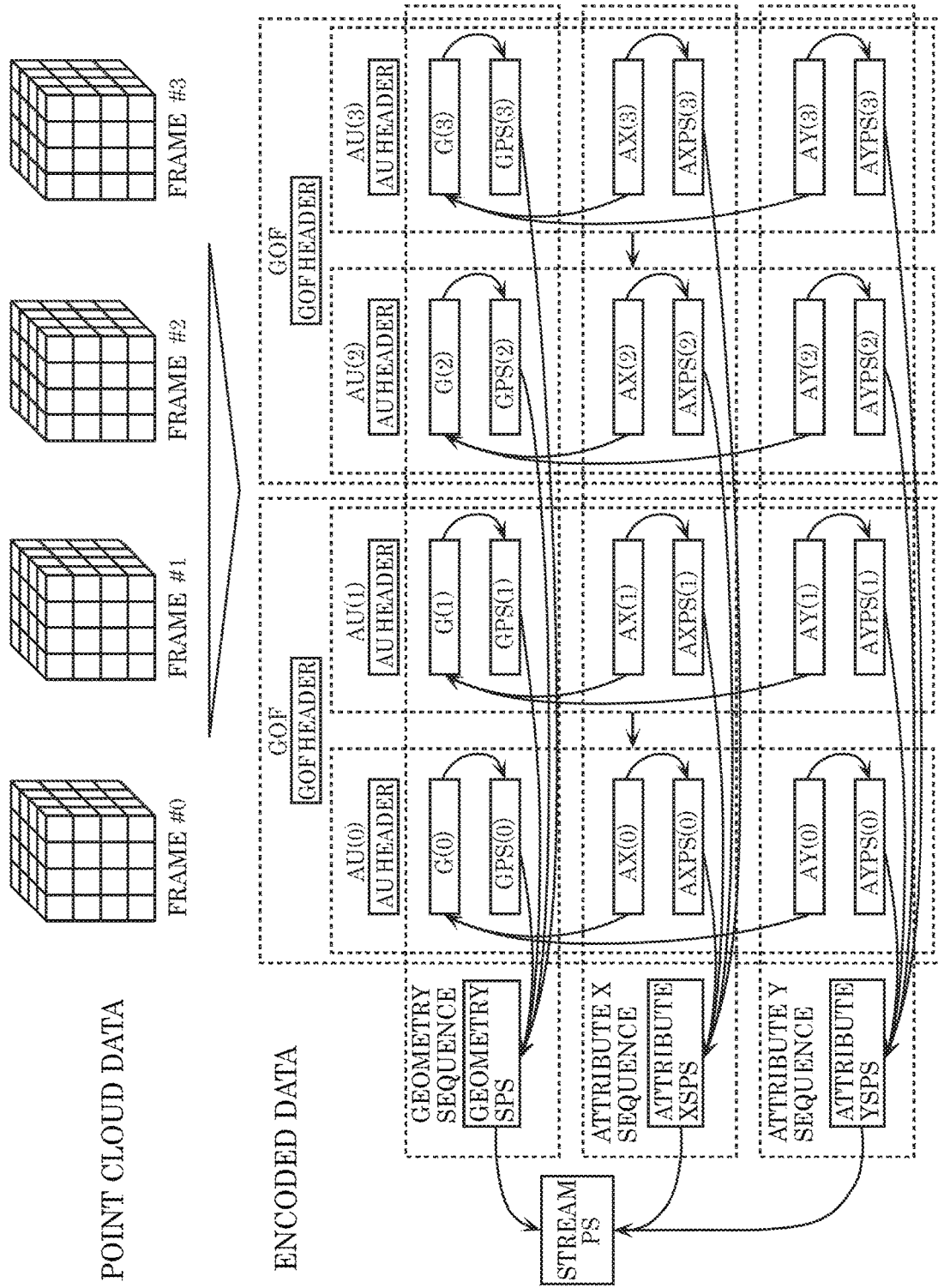
FIG. 17 is a diagram illustrating a structure example of encoded data according to Embodiment 3.

FIG. 17 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 17 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 17 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 17 shows an example in which there is one type of geometry information, and there are two types of attribute information, the present invention is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 18:
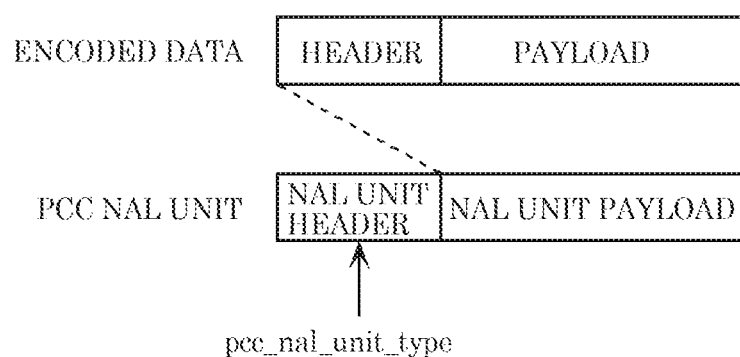
FIG. 18 is a diagram illustrating a structure example of encoded data and a NAL unit according to Embodiment 3.

For example, a data format is defined for each type of encoded data. FIG. 18 is a diagram showing an example of encoded data and a NAL unit.

For example, as shown in FIG. 18, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 19 is a diagram showing a semantics example of pcc_nal_unit_type.

As shown in FIG. 19, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 20:
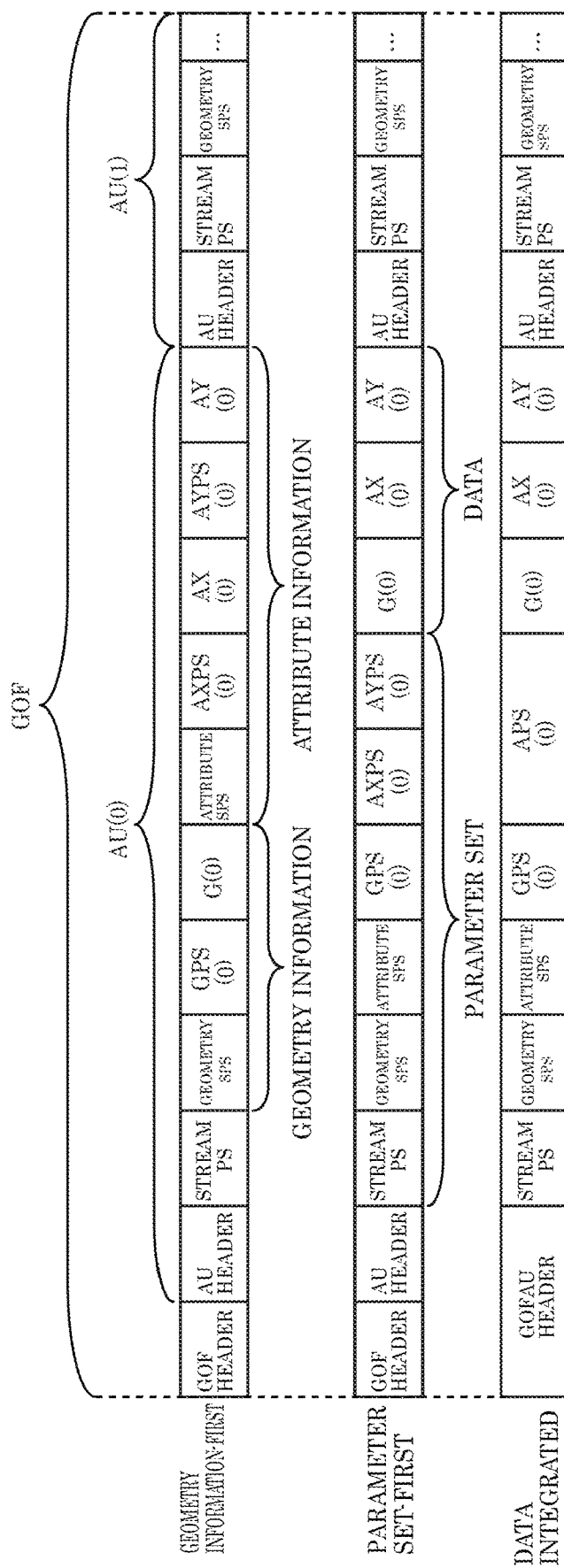
FIG. 20 is a diagram illustrating an example of a transmitting order of NAL units according to Embodiment 3.

FIG. 20 is a diagram showing examples of the order of transmission of NAL units. FIG. 20 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 20 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 20, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Embodiment 4

For HEVC encoding, in order to enable parallel processing in a decoding device, there are slice-based or tile-based data division tools, for example. However, there is no such tool for point cloud compression (PCC) encoding.

In PCC, various data division methods are possible, depending on the parallel processing, the compression efficiency, and the compression algorithm. Here, definitions of a slice and a tile, a data structure, and transmission and reception methods will be described.

Figure 21:
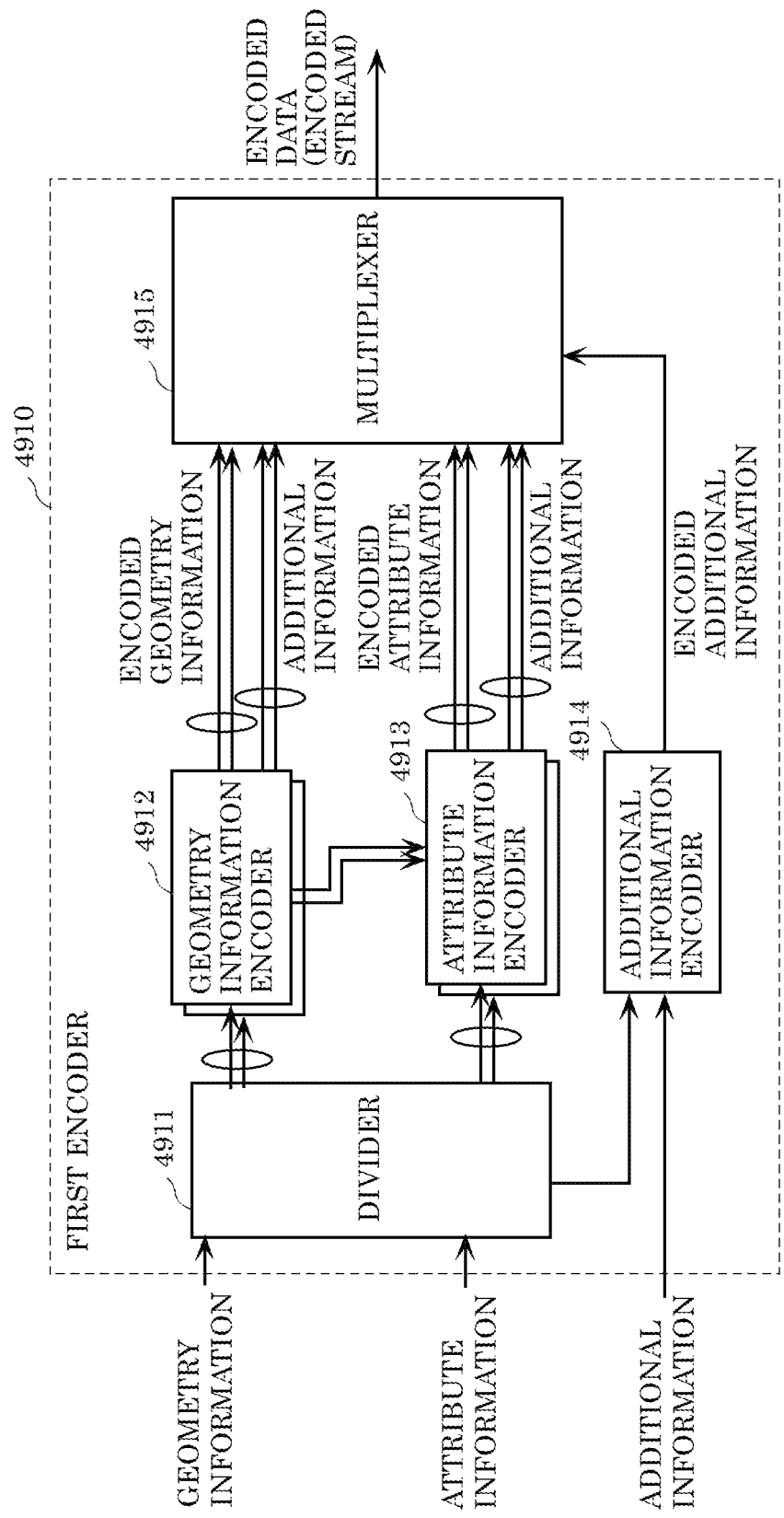
FIG. 21 is a block diagram showing a first encoder according to Embodiment 4.

FIG. 21 is a block diagram showing a configuration of first encoder 4910 included in a three-dimensional data encoding device according to this embodiment. First encoder 4910 generates encoded data (encoded stream) by encoding point cloud data in a first encoding method (geometry-based PCC (GPCC)). First encoder 4910 includes divider 4911, a plurality of geometry information encoders 4912, a plurality of attribute information encoders 4913, additional information encoder 4914, and multiplexer 4915.

Divider 4911 generates a plurality of pieces of divided data by dividing point cloud data. Specifically, divider 4911 generates a plurality of pieces of divided data by dividing a space of point cloud data into a plurality of subspaces. Here, a subspace is a combination of tiles or slices, or a combination of tiles and slices. More specifically, point cloud data includes geometry information, attribute information, and additional information. Divider 4911 divides geometry information into a plurality of pieces of divided geometry information, and divides attribute information into a plurality of pieces of divided attribute information. Divider 4911 also generates additional information concerning the division.

The plurality of geometry information encoders 4912 generate a plurality of pieces of encoded geometry information by encoding a plurality of pieces of divided geometry information. For example, the plurality of geometry information encoders 4912 processes a plurality of pieces of divided geometry information in parallel.

The plurality of attribute information encoders 4913 generate a plurality of pieces of encoded attribute information by encoding a plurality of pieces of divided attribute information. For example, the plurality of attribute information encoders 4913 process a plurality of pieces of divided attribute information in parallel.

Additional information encoder 4914 generates encoded additional information by encoding additional information included in the point cloud data and additional information concerning the data division generated in the division by divider 4911.

Multiplexer 4915 generates encoded data (encoded stream) by multiplexing a plurality of pieces of encoded geometry information, a plurality of pieces of encoded attribute information, and encoded additional information, and transmits the generated encoded data. The encoded additional information is used for decoding.

Note that, although FIG. 21 shows an example in which there are two geometry information encoders 4912 and two attribute information encoders 4913, the number of geometry information encoders 4912 and the number of attribute information encoders 4913 may be one, or three or more. The plurality of pieces of divided data may be processed in parallel in the same chip, such as by a plurality of cores of a CPU, processed in parallel by cores of a plurality of chips, or processed in parallel by a plurality of cores of a plurality of chips.

Figure 22:
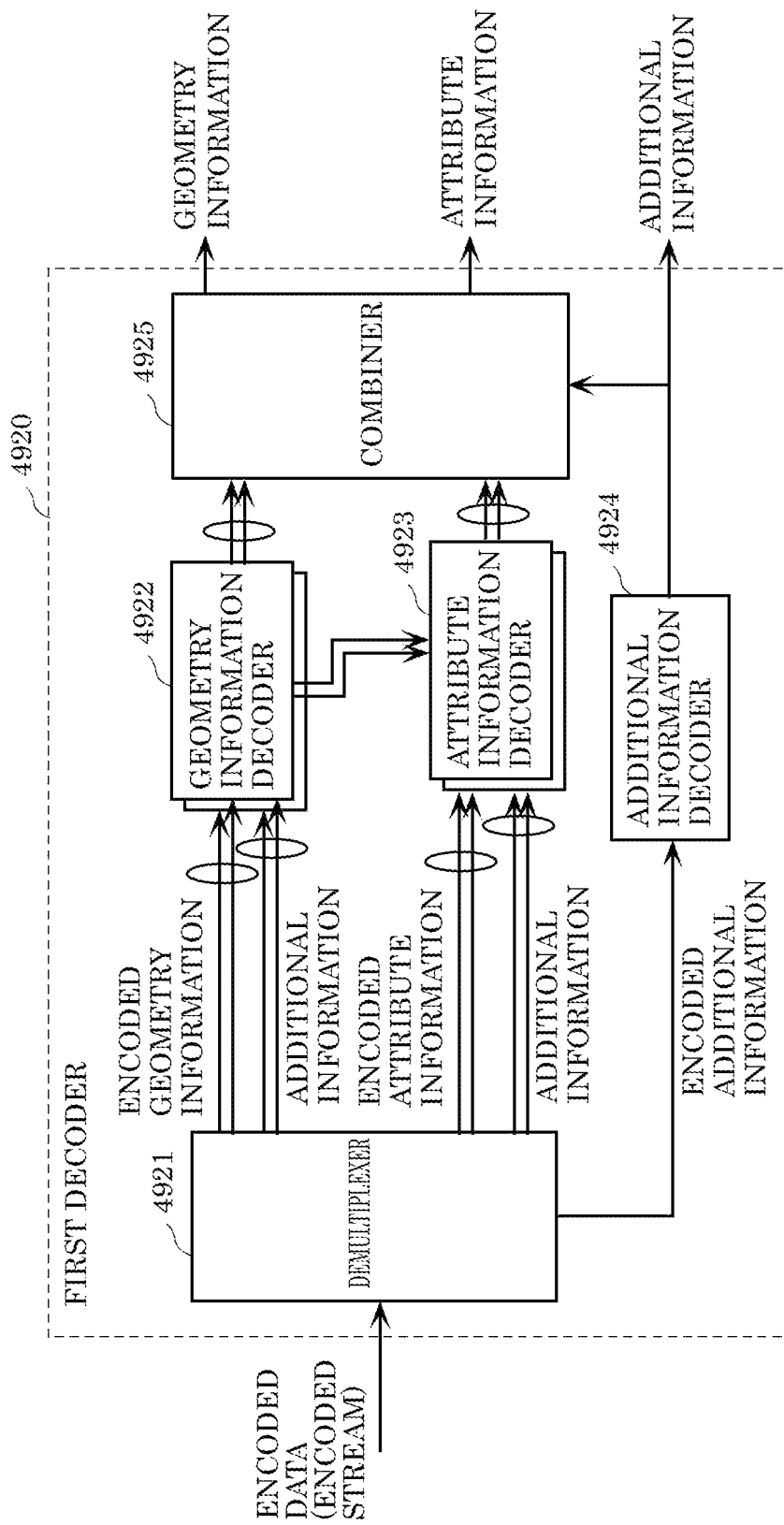
FIG. 22 is a block diagram showing a first decoder according to Embodiment 4.

FIG. 22 is a block diagram showing a configuration of first decoder 4920. First decoder 4920 reproduces point cloud data by decoding encoded data (encoded stream) generated by encoding the point cloud data in the first encoding method (GPCC). First decoder 4920 includes demultiplexer 4921, a plurality of geometry information decoders 4922, a plurality of attribute information decoders 4923, additional information decoder 4924, and combiner 4925.

Demultiplexer 4921 generates a plurality of pieces of encoded geometry information, a plurality of pieces of encoded attribute information, and encoded additional information by demultiplexing encoded data (encoded stream).

The plurality of geometry information decoders 4922 generate a plurality of pieces of divided geometry information by decoding a plurality of pieces of encoded geometry information. For example, the plurality of geometry information decoders 4922 process a plurality of pieces of encoded geometry information in parallel.

The plurality of attribute information decoders 4923 generate a plurality of pieces of divided attribute information by decoding a plurality of pieces of encoded attribute information. For example, the plurality of attribute information decoders 4923 process a plurality of pieces of encoded attribute information in parallel.

Additional information decoder 4924 generates additional information by decoding encoded additional information.

Combiner 4925 generates geometry information by combining a plurality of pieces of divided geometry information using additional information. Combiner 4925 generates attribute information by combining a plurality of pieces of divided attribute information using additional information.

Note that, although FIG. 22 shows an example in which there are two geometry information decoders 4922 and two attribute information decoders 4923, the number of geometry information decoders 4922 and the number of attribute information decoders 4923 may be one, or three or more. The plurality of pieces of divided data may be processed in parallel in the same chip, such as by a plurality of cores of a CPU, processed in parallel by cores of a plurality of chips, or processed in parallel by a plurality of cores of a plurality of chips.

Figure 23:
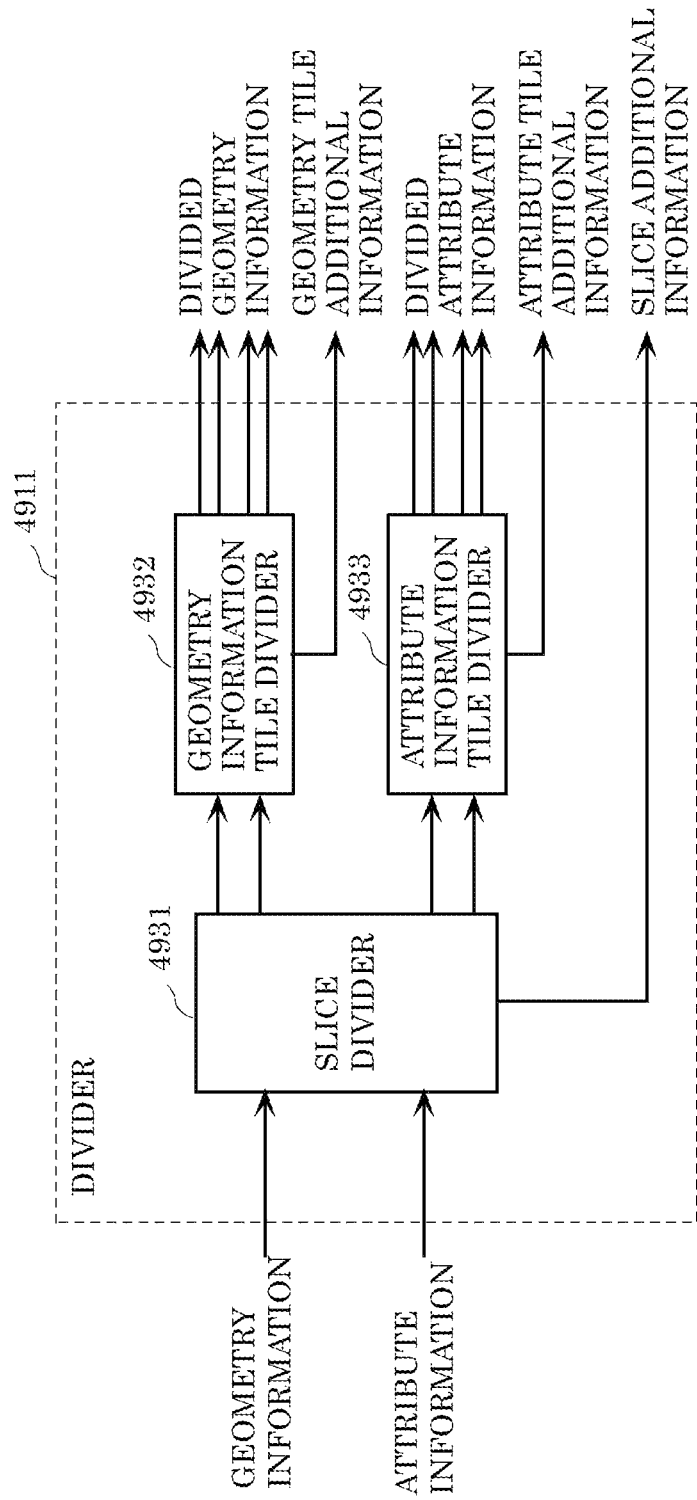
FIG. 23 is a block diagram showing a divider according to Embodiment 4.

Next, a configuration of divider 4911 will be described. FIG. 23 is a block diagram showing divider 4911. Divider 4911 includes slice divider 4931, geometry information tile divider (geometry tile divider) 4932, attribute information tile divider (attribute tile divider) 4933.

Slice divider 4931 generates a plurality of pieces of slice geometry information by dividing geometry information (position (geometry)) into slices. Slice divider 4931 also generates a plurality of pieces of slice attribute information by dividing attribute information (attribute) into slices. Slice divider 4931 also outputs slice additional information (slice metadata) including information concerning the slice division and information generated in the slice division.

Geometry information tile divider 4932 generates a plurality of pieces of divided geometry information (a plurality of pieces of tile geometry information) by dividing a plurality of pieces of slice geometry information into tiles. Geometry information tile divider 4932 also outputs geometry tile additional information (geometry tile metadata) including information concerning the tile division of geometry information and information generated in the tile division of geometry information.

Attribute information tile divider 4933 generates a plurality of pieces of divided attribute information (a plurality of pieces of tile attribute information) by dividing a plurality of pieces of slice attribute information into tiles. Attribute information tile divider 4933 also outputs attribute tile additional information (attribute tile metadata) including information concerning the tile division of attribute information and information generated in the tile division of attribute information.

Note that the number of slices or tiles generated by division is equal to or greater than 1. That is, the slice division or tile division may not be performed.

Although an example in which tile division is performed after slice division has been shown here, slice division may be performed after tile division. Alternatively, other units of division may be defined in addition to slice and tile, and the division may be performed based on three or more units of division.

Figure 24:
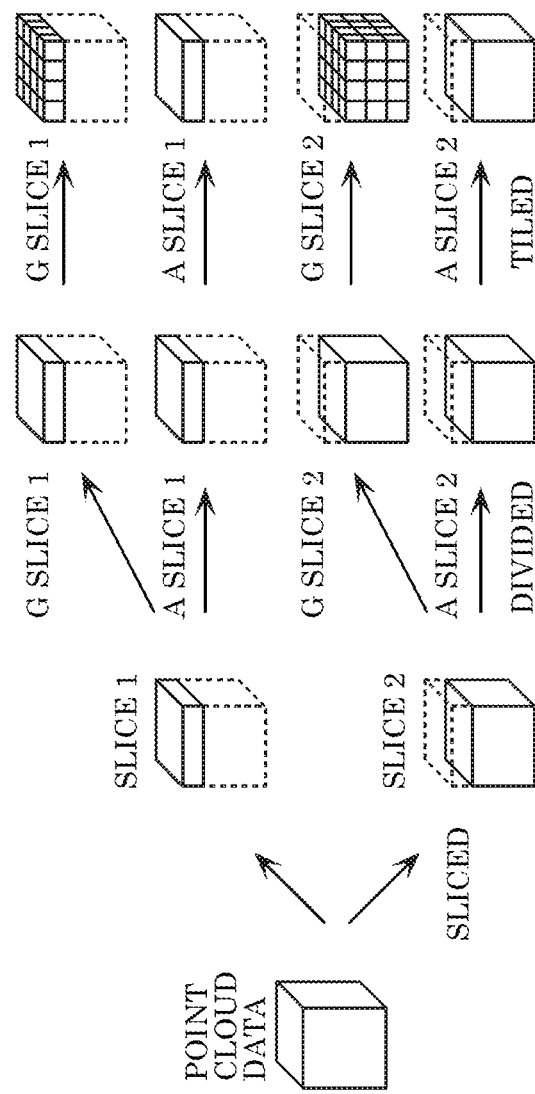
FIG. 24 is a diagram illustrating an example of dividing slices and tiles according to Embodiment 4.

Hereinafter, the dividing method for point cloud data will be described. FIG. 24 is a diagram illustrating an example of slice and tile dividing.

First, the method for slice dividing will be described. Divider 4911 divides three-dimensional point cloud data into arbitrary point clouds on a slice-by-slice basis. In slice dividing, divider 4911 does not divide the geometry information and the attribute information constituting points, but collectively divides the geometry information and the attribute information. That is, divider 4911 performs slice dividing so that the geometry information and the attribute information of an arbitrary point belong to the same slice. Note that, as long as these are followed, the number of divisions and the dividing method may be any number and any method. Furthermore, the minimum unit of division is a point. For example, the numbers of divisions of geometry information and attribute information are the same. For example, a three-dimensional point corresponding to geometry information after slice dividing, and a three-dimensional point corresponding to attribute information are included in the same slice.

Also, divider 4911 generates slice additional information, which is additional information related to the number of divisions and the dividing method at the time of slice dividing. The slice additional information is the same for geometry information and attribute information. For example, the slice additional information includes the information indicating the reference coordinate position, size, or side length of a bounding box after division. Also, the slice additional information includes the information indicating the number of divisions, the division type, etc.

Next, the method for tile dividing will be described. Divider 4911 divides the data divided into slices into slice geometry information (G slice) and slice attribute information (A slice), and divides each of the slice geometry information and the slice attribute information on a tile-by-tile basis.

Note that, although FIG. 24 illustrates the example in which division is performed with an octree structure, the number of divisions and the dividing method may be any number and any method.

Also, divider 4911 may divide geometry information and attribute information with different dividing methods, or may divide geometry information and attribute information with the same dividing method. Additionally, divider 4911 may divide a plurality of slices into tiles with different dividing methods, or may divide a plurality of slices into tiles with the same dividing method.

Furthermore, divider 4911 generates tile additional information related to the number of divisions and the dividing method at the time of tile dividing. The tile additional information (geometry tile additional information and attribute tile additional information) is separate for geometry information and attribute information. For example, the tile additional information includes the information indicating the reference coordinate position, size, or side length of a bounding box after division. Additionally, the tile additional information includes the information indicating the number of divisions, the division type, etc.

Next, an example of the method of dividing point cloud data into slices or tiles will be described. As the method for slice or tile dividing, divider 4911 may use a predetermined method, or may adaptively switch methods to be used according to point cloud data.

At the time of slice dividing, divider 4911 divides a three-dimensional space by collectively handling geometry information and attribute information. For example, divider 4911 determines the shape of an object, and divides a three-dimensional space into slices according to the shape of the object. For example, divider 4911 extracts objects such as trees or buildings, and performs division on an object-by-object basis. For example, divider 4911 performs slice dividing so that the entirety of one or a plurality of objects are included in one slice. Alternatively, divider 4911 divides one object into a plurality of slices.

In this case, the encoding device may change the encoding method for each slice, for example. For example, the encoding device may use a high-quality compression method for a specific object or a specific part of the object. In this case, the encoding device may store the information indicating the encoding method for each slice in additional information (metadata).

Also, divider 4911 may perform slice dividing so that each slice corresponds to a predetermined coordinate space based on map information or geometry information.

At the time of tile dividing, divider 4911 separately divides geometry information and attribute information. For example, divider 4911 divides slices into tiles according to the data amount or the processing amount. For example, divider 4911 determines whether the data amount of a slice (for example, the number of three-dimensional points included in a slice) is greater than a predetermined threshold value. When the data amount of the slice is greater than the threshold value, divider 4911 divides slices into tiles. When the data amount of the slice is less than the threshold value, divider 4911 does not divide slices into tiles.

For example, divider 4911 divides slices into tiles so that the processing amount or processing time in the decoding device is within a certain range (equal to or less than a predetermined value). Accordingly, the processing amount per tile in the decoding device becomes constant, and distributed processing in the decoding device becomes easy.

Additionally, when the processing amount is different between geometry information and attribute information, for example, when the processing amount of geometry information is greater than the processing amount of attribute information, divider 4911 makes the number of divisions of geometry information larger than the number of divisions of attribute information.

Furthermore, for example, when geometry information may be decoded and displayed earlier, and attribute information may be slowly decoded and displayed later in the decoding device according to contents, divider 4911 may make the number of divisions of geometry information larger than the number of divisions of attribute information. Accordingly, since the decoding device can increase the parallel number of geometry information, it is possible to make the processing of geometry information faster than the processing of attribute information.

Note that the decoding device does not necessarily have to process sliced or tiled data in parallel, and may determine whether or not to process them in parallel according to the number or capability of decoding processors.

By performing division with the method as described above, it is possible to achieve adaptive encoding according to contents or objects. Also, parallel processing in decoding processing can be achieved. Accordingly, the flexibility of a point cloud encoding system or a point cloud decoding system is improved.

Figure 25:
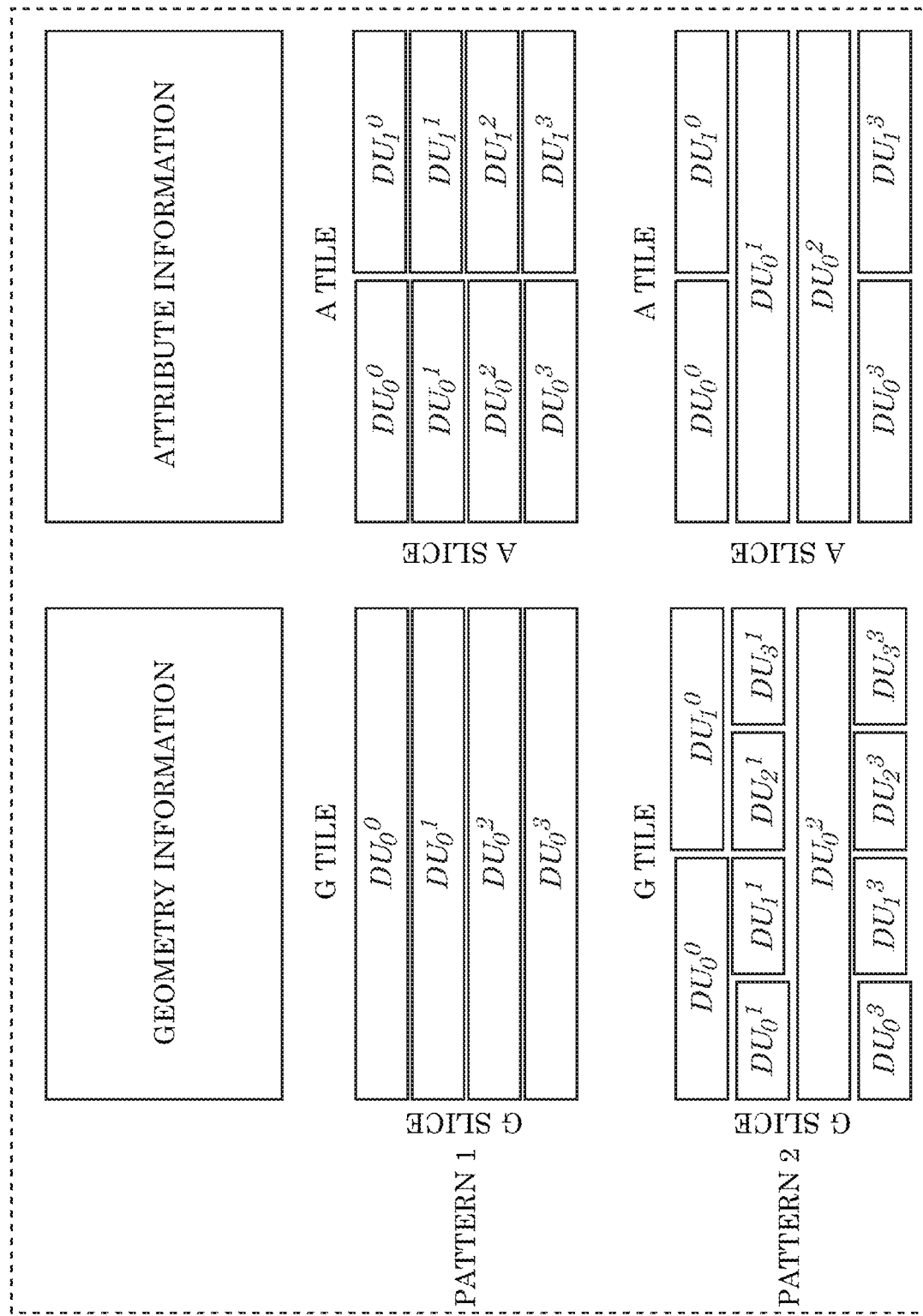
FIG. 25 is a diagram illustrating dividing pattern examples of slices and tiles according to Embodiment 4.

FIG. 25 is a diagram illustrating dividing pattern examples of slices and tiles. DU in the diagram is a data unit (DataUnit), and indicates the data of a tile or a slice. Additionally, each DU includes a slice index (SliceIndex) and a tile index (TileIndex). The top right numerical value of a DU in the diagram indicates the slice index, and the bottom left numerical value of the DU indicates the tile index.

In Pattern 1, in slice dividing, the number of divisions and the dividing method are the same for G slice and A slice. In tile dividing, the number of divisions and the dividing method for G slice are different from the number of divisions and the dividing method for A slice. Additionally, the same number of divisions and dividing method are used among a plurality of G slices. The same number of divisions and dividing method are used among a plurality of A slices.

In Pattern 2, in slice dividing, the number of divisions and the dividing method are the same for G slice and A slice. In tile dividing, the number of divisions and the dividing method for G slice are different from the number of divisions and the dividing method for A slice. Additionally, the number of divisions and the dividing method are different among a plurality of G slices. The number of divisions and the dividing method are different among a plurality of A slices.

Next, a method of encoding divided data will be described. The three-dimensional data encoding device (first encoder 4910) encodes each piece of divided data. When encoding attribute information, the three-dimensional data encoding device generates, as additional information, dependency information that indicates on which configuration information (geometry information, additional information, or other attribute information) the encoding is based. That is, the dependency information indicates configuration information on a reference destination (dependency destination). In this case, the three-dimensional data encoding device generates dependency information based on configuration information corresponding to a pattern of division of attribute information. Note that the three-dimensional data encoding device may generate dependency information based on configuration information for a plurality of patterns of division of attribute information.

The dependency information may be generated by the three-dimensional data encoding device, and the generated dependency information may be transmitted to a three-dimensional data decoding device. Alternatively, the three-dimensional data decoding device may generate dependency information, and the three-dimensional data encoding device may transmit no dependency information. Alternatively, a dependency used by the three-dimensional data encoding device may be previously determined, and the three-dimensional data encoding device may transmit no dependency information.

Figure 26:
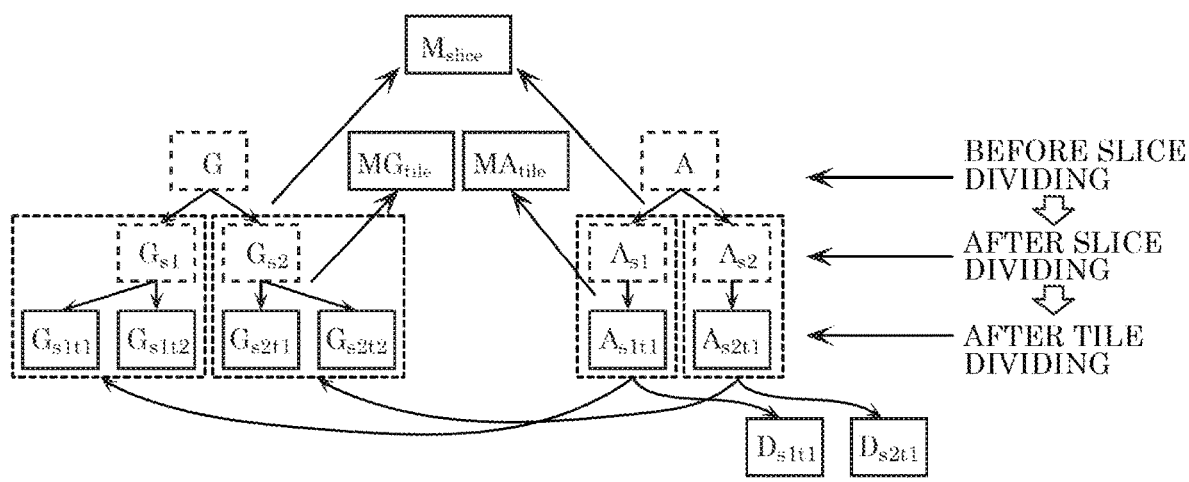
FIG. 26 is a diagram illustrating an example of dependency relationships according to Embodiment 4.

FIG. 26 is a diagram showing an example of the dependency between data. In the drawing, the destination of an arrow indicates a dependency destination, and the source of an arrow indicates a dependency source. The three-dimensional data decoding device first decodes data concerning a dependency destination and then decodes data concerning a dependency source. Data indicated by a solid line in the drawing is data that is actually transmitted, and data indicated by a dotted line is data that is not transmitted.

In the drawing, G denotes geometry information, and A denotes attribute information. $G_{s1}$ denotes geometry information concerning slice number 1, and $G_{s2}$ denotes geometry information concerning slice number 2. $G_{s1t1}$ denotes geometry information concerning slice number 1 and tile number 1, $G_{s1t2}$ denotes geometry information concerning slice number 1 and tile number 2, $G_{s2t1}$ denotes geometry information concerning slice number 2 and tile number 1, and $G_{s2t2}$ denotes geometry information concerning slice number 2 and tile number 2. Similarly, $A_{s1}$ denotes attribute information concerning slice number 1, and $A_{s2}$ denotes attribute information concerning slice number 2. $A_{s1t1}$ denotes attribute information concerning slice number 1 and tile number 1, $A_{s1t2}$ denotes attribute information concerning slice number 1 and tile number 2, $A_{s2t1}$ denotes attribute information concerning slice number 2 and tile number 1, and $A_{s2t2}$ denotes attribute information concerning slice number 2 and tile number 2.

$M_{slice}$ denotes slice additional information, $MG_{tile}$ denotes geometry tile additional information, and $MA_{tile}$ denotes attribute tile additional information. $D_{s1t1}$ denotes dependency information for attribute information $A_{s1t1}$, and $D_{s2t1}$ denotes dependency information for attribute information $A_{s2t1}$.

The three-dimensional data encoding device may rearrange data in the order of decoding so that the three-dimensional data decoding device does not need to rearrange data. Note that the three-dimensional data decoding device may rearrange data, or both the three-dimensional data encoding device and the three-dimensional data decoding device may rearrange data.

Figure 27:
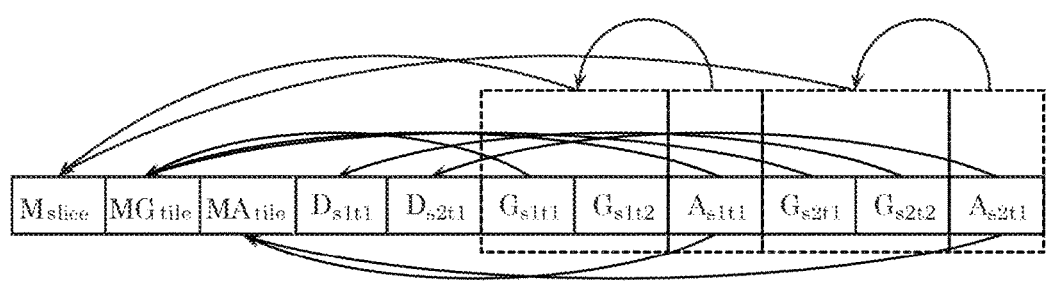
FIG. 27 is a diagram illustrating an example of decoding order of data according to Embodiment 4.

FIG. 27 is a diagram showing an example of the order of decoding of data. In the example in FIG. 27, data is decoded in order from left to right. When there is a dependency between data to be decoded, the three-dimensional data decoding device first decodes data on the dependency destination. For example, the three-dimensional data encoding device transmits the data after rearranging the data in that order. Note that the order can be any order as far as the data concerning the dependency destination is first decoded. The three-dimensional data encoding device may transmit additional information and dependency information before transmitting data.

Figure 28:
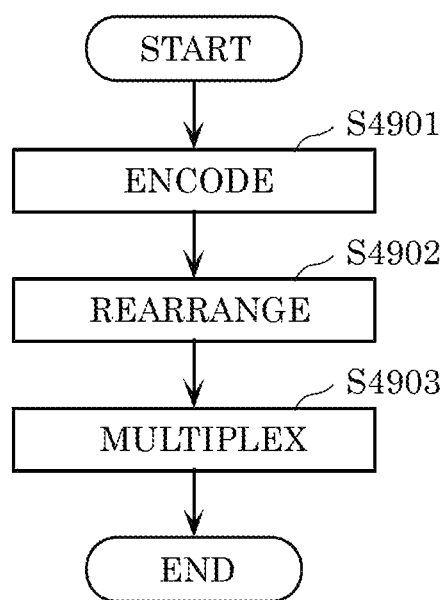
FIG. 28 is a flowchart of an encoding process according to Embodiment 4.

FIG. 28 is a flowchart showing a flow of a process performed by the three-dimensional data encoding device. First, the three-dimensional data encoding device encodes a plurality of slices or tiles of data as described above (S4901). The three-dimensional data encoding device then rearrange the data so that the data concerning the dependency destination comes first as shown in FIG. 27 (S4902). The three-dimensional data encoding device then multiplexes the rearranged data (into a NAL unit) (S4903).

Figure 29:
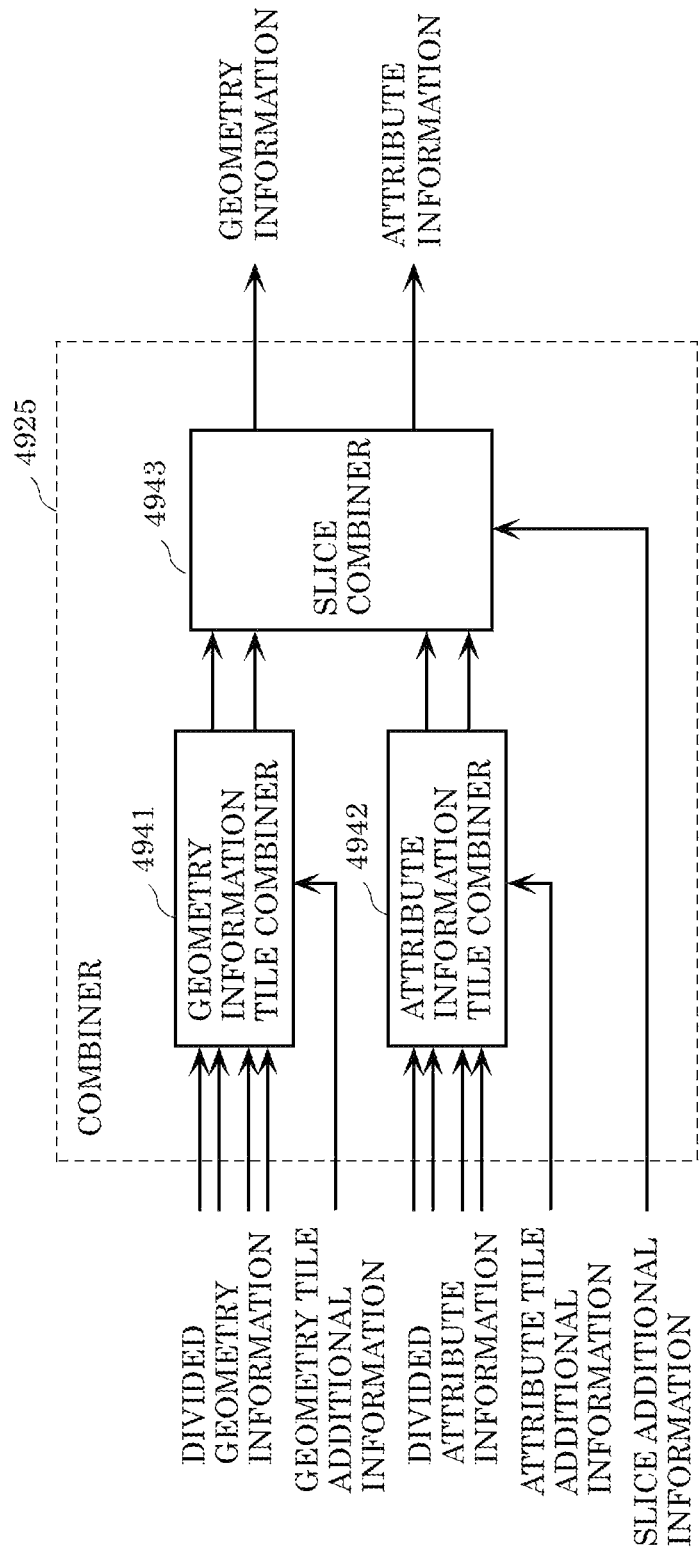
FIG. 29 is a block diagram of a combiner according to Embodiment 4.

Next, a configuration of combiner 4925 included in first decoder 4920 will be described. FIG. 29 is a block diagram showing a configuration of combiner 4925. Combiner 4925 includes geometry information tile combiner (geometry tile combiner) 4941, attribute information tile combiner (attribute tile combiner) 4942, and slice combiner 4943.

Geometry information tile combiner 4941 generates a plurality of pieces of slice geometry information by combining a plurality of pieces of divided geometry information using geometry tile additional information. Attribute information tile combiner 4942 generates a plurality of pieces of slice attribute information by combining a plurality of pieces of divided attribute information using attribute tile additional information.

Slice combiner 4943 generates geometry information by combining a plurality of pieces of slice geometry information using slice additional information. Slice combiner 4943 also generates attribute information by combining a plurality of pieces of slice attribute information using slice additional information.

Note that the number of slices or tiles generated by division is equal to or greater than 1. That is, the slice division or tile division may not be performed.

Furthermore, although an example in which tile division is performed after slice division has been shown here, slice division may be performed after tile division. Alternatively, other units of division may be defined in addition to slice and tile, and the division may be performed based on three or more units of division.

Figure 30:
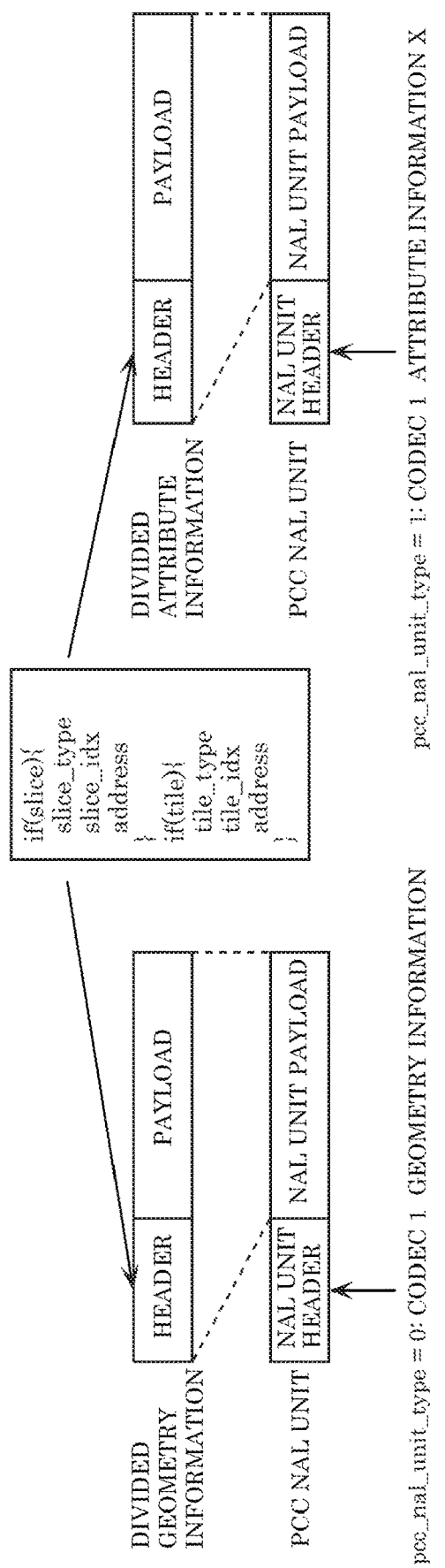
FIG. 30 is a diagram illustrating a structural example of encoded data and NAL units according to Embodiment 4.

Next, a configuration of encoded data divided into slices or tiles, and a method of storing (multiplexing) encoded data into a NAL unit will be described. FIG. 30 is a diagram showing a configuration of encoded data and a method of storing encoded data into a NAL unit.

Encoded data (divided geometry information and divided attribute information) is stored in a payload of a NAL unit.

Encoded data includes a header and a payload. The header includes identification information for identifying data included in the payload. The identification information includes a type (slice_type, tile_type) of slice division or tile division, index information (slice_idx, tile_idx) for identifying a slice or tile, geometry information on data (slice or tile), or an address (address) of data, for example. The index information for identifying a slice is referred to also as a slice index (SliceIndex). The index information for identifying a tile is referred to also as a tile index (TileIndex). The type of division may be a scheme based on an object shape, a scheme based on map information or geometry information, or a scheme based on a data amount or processing amount, for example.

All or part of the information described above may be stored in one of the header of the divided geometry information and the header of the divided attribute information and not be stored in the other. For example, when the same division method is used for the geometry information and the attribute information, the same type of division (slice_type, tile_type) and the same index information (slice_idx, tile_idx) are used for the geometry information and the attribute information. Therefore, these pieces of information may be included in the header of one of the geometry information and the attribute information. For example, when the attribute information depends on the geometry information, the geometry information is processed first. Therefore, the header of the geometry information may include these pieces of information, and the header of the attribute information may not include these pieces of information. In this case, the three-dimensional data decoding device determines that the attribute information concerning the dependency source belongs to the same slice or tile as the slice or tile of the geometry information concerning the dependency destination, for example.

The additional information (slice additional information, geometry tile additional information, or attribute tile additional information) concerning the slice division or tile division, dependency information indicating a dependency and the like may be stored in an existing parameter set (GPS, APS, geometry SPS, attribute SPS or the like) and transmitted. When the division method varies with frame, information indicating a division method may be stored in a parameter set (GPS, APS or the like) for each frame. When the division method does not vary in a sequence, information indicating a division method may be stored in a parameter set (geometry SPS or attribute SPS) for each sequence. Furthermore, when the same division method is used for the geometry information and the attribute information, information indicating the division method may be stored in a parameter set (stream PS) for the PCC stream.

The information described above may be stored in any of the parameter sets described above, or may be stored in a plurality of parameter sets. Alternatively, a parameter set for tile division or slice division may be defined, and the information described above may be stored in the parameter set. Alternatively, these pieces of information may be stored in the header of encoded data.

The header of encoded data includes identification information indicating a dependency. That is, when there is a dependency between data, the header includes identification information that allows the dependency source to refer to the dependency destination. For example, the header of the data of the dependency destination includes identification information for identifying the data. The header of the data of the dependency source includes identification information indicating the dependency destination. Note that the identification information for identifying data, the additional information concerning slice division or tile division, and the identification information indicating a dependency may be omitted if these pieces of information can be identified or derived from other information.

Figure 31:
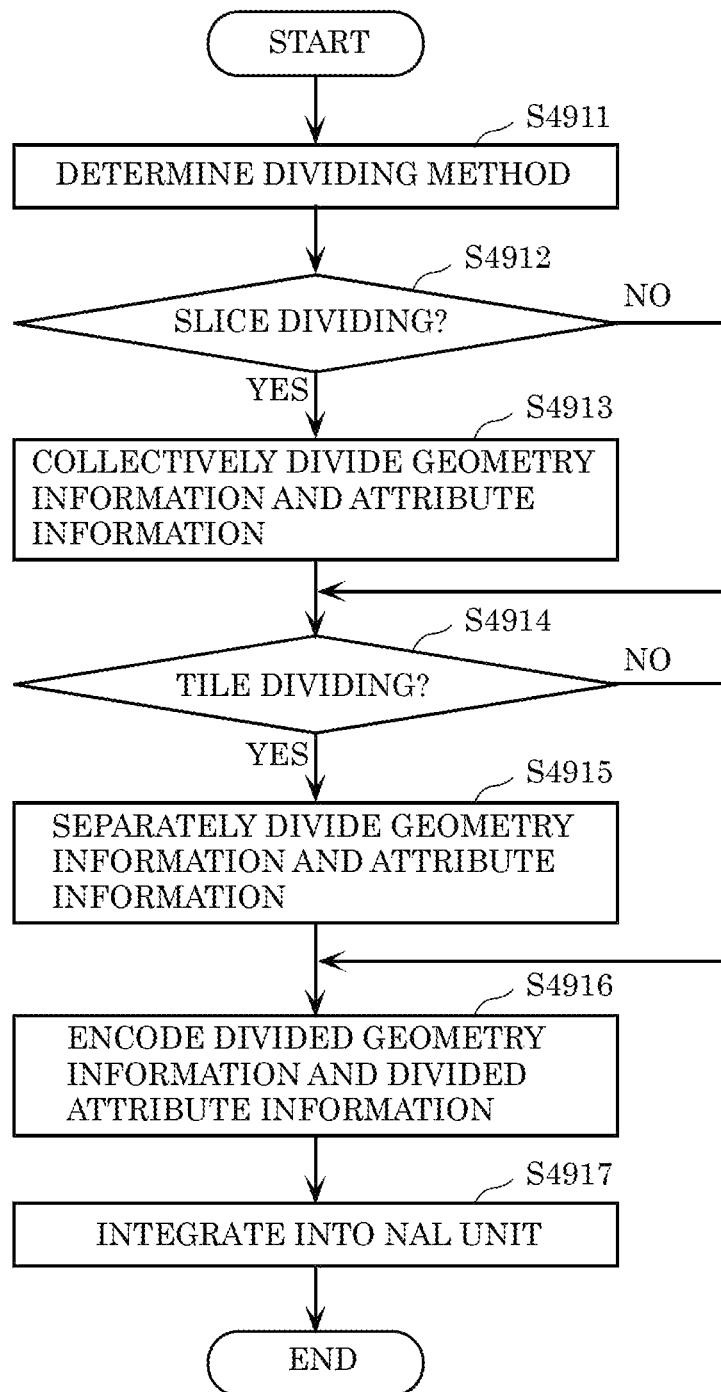
FIG. 31 is a flowchart of an encoding process according to Embodiment 4.

Next, a flow of a process of encoding point cloud data and a flow of a process of decoding point cloud data according to this embodiment will be described. FIG. 31 is a flowchart of a process of encoding point cloud data according to this embodiment.

First, the three-dimensional data encoding device determines a division method to be used (S4911). The division method includes a determination of whether to perform slice division or not and a determination of whether to perform tile division. The division method may include the number of slices or tiles in the case where slice division or tile division is performed, and the type of division, for example. The type of division is a scheme based on an object shape, a scheme based on map information or geometry information, or a scheme based on a data amount or processing amount, for example. The division method may be determined in advance.

When slice division is to be performed (if Yes in S4912), the three-dimensional data encoding device generates a plurality of pieces of slice geometry information and a plurality of pieces of slice attribute information by collectively dividing the geometry information and the attribute information (S4913). The three-dimensional data encoding device also generates slice additional information concerning the slice division. Note that the three-dimensional data encoding device may independently divide the geometry information and the attribute information.

When tile division is to be performed (if Yes in S4914), the three-dimensional data encoding device generates a plurality of pieces of divided geometry information and a plurality of pieces of divided attribute information by independently dividing the plurality of pieces of slice geometry information and the plurality of pieces of slice attribute information (or the geometry information and the attribute information) (S4915). The three-dimensional data encoding device also generates geometry tile additional information and attribute tile additional information concerning the tile division. The three-dimensional data encoding device may collectively divide the slice geometry information and the slice attribute information.

The three-dimensional data encoding device then generates a plurality of pieces of encoded geometry information and a plurality of pieces of encoded attribute information by encoding each of the plurality of pieces of divided geometry information and the plurality of pieces of divided attribute information (S4916). The three-dimensional data encoding device also generates dependency information.

The three-dimensional data encoding device then generates encoded data (encoded stream) by integrating (multiplexing) the plurality of pieces of encoded geometry information, the plurality of pieces of encoded attribute information and the additional information into a NAL unit (S4917). The three-dimensional data encoding device also transmits the generated encoded data.

Figure 32:
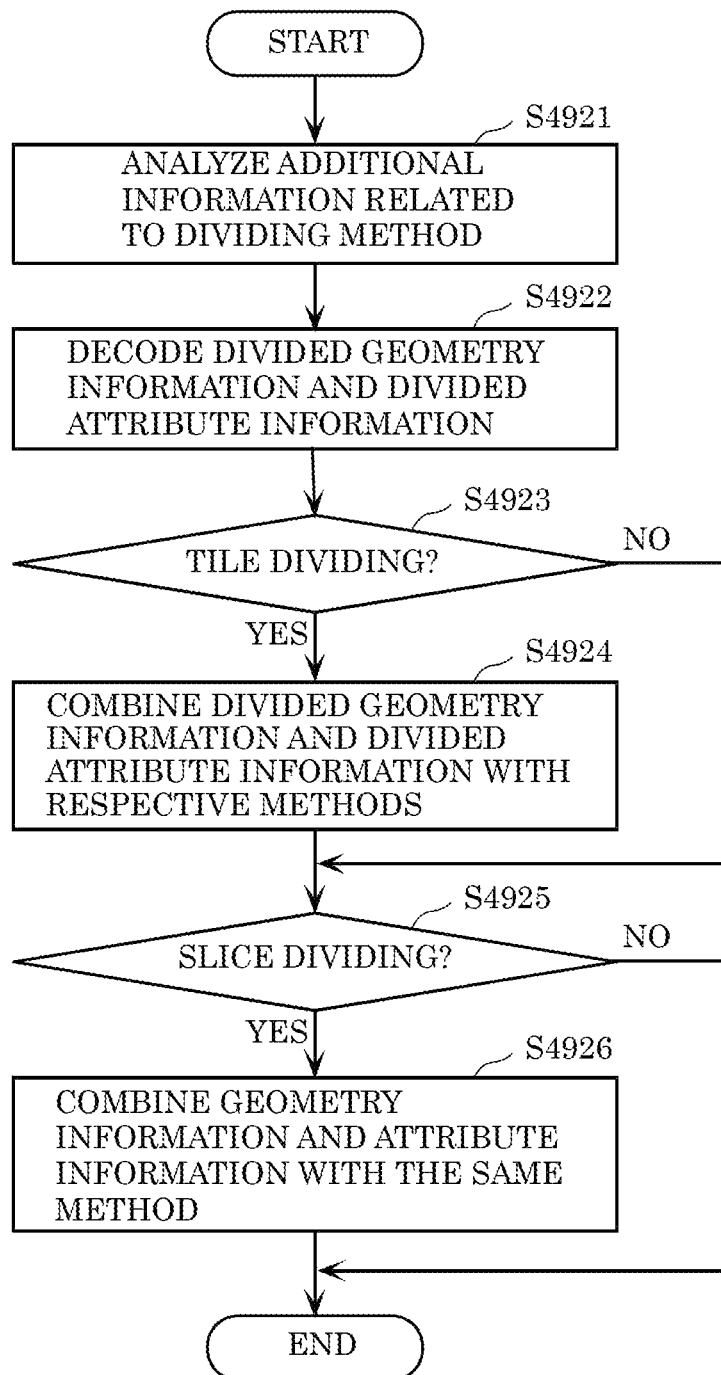
FIG. 32 is a flowchart of a decoding process according to Embodiment 4.

FIG. 32 is a flowchart of a process of decoding point cloud data according to this embodiment. First, the three-dimensional data decoding device determines the division method by analyzing additional information (slice additional information, geometry tile additional information, and attribute tile additional information) concerning the division method included in encoded data (encoded stream) (S4921). The division method includes a determination of whether to perform slice division or not and a determination of whether to perform tile division or not. The division method may include the number of slices or tiles in the case where slice division or tile division is performed, and the type of division, for example.

The three-dimensional data decoding device then generates divided geometry information and divided attribute information by decoding a plurality of pieces of encoded geometry information and a plurality of pieces of encoded attribute information included in the encoded data using dependency information included in the encoded data (S4922).

If the additional information indicates that tile division has been performed (if Yes in S4923), the three-dimensional data decoding device generates a plurality of pieces of slice geometry information and a plurality of pieces of slice attribute information by combining the plurality of pieces of divided geometry information and the plurality of pieces of divided attribute information in respective manners based on the geometry tile additional information and the attribute tile additional information (S4924). Note that the three-dimensional data decoding device may combine the plurality of pieces of divided geometry information and the plurality of pieces of divided attribute information in the same manner.

If the additional information indicates that slice division has been performed (if Yes in S4925), the three-dimensional data decoding device generates geometry information and attribute information by combining the plurality of pieces of slice geometry information and the plurality of pieces of slice attribute information (the plurality of pieces of divided geometry information and the plurality of pieces of divided attribute information) in the same manner based on the slice additional information (S4926). Note that the three-dimensional data decoding device may combine the plurality of pieces of slice geometry information and the plurality of pieces of slice attribute information in different manners.

Figure 33:
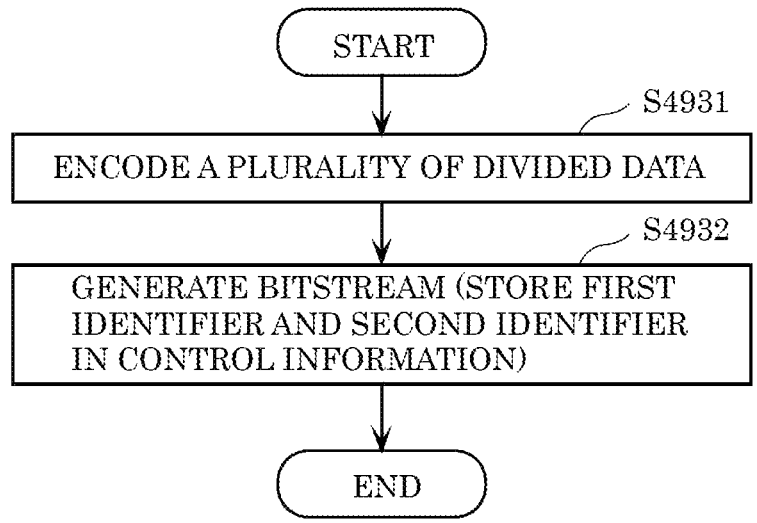
FIG. 33 is a flowchart of an encoding process according to Embodiment 4.

As described above, the three-dimensional data encoding device according to this embodiment performs the process shown in FIG. 33. First, the three-dimensional data encoding device divides data into a plurality of pieces of divided data (tiles, for example) that are included in a plurality of subspaces (slices, for example) generated by dividing a target space including a plurality of three-dimensional points and each of which includes one or more three-dimensional points. Here, the divided data is a collection of one or more pieces of data including one or more three-dimensional points that is included in a subspace. The divided data can also be regarded as a space and may include a space including no three-dimensional point. One subspace may include a plurality of pieces of divided data, or one subspace may include one piece of divided data. Note that a plurality of subspaces or one subspace may be set in a target space.

The three-dimensional data encoding device then generates a plurality of pieces of encoded data each associated with a different one of the plurality of pieces of divided data by encoding each of the plurality of pieces of divided data (S4931). The three-dimensional data encoding device generates a bitstream including the plurality of pieces of encoded data and a plurality of pieces of control information (the header shown in FIG. 30, for example) each associated with a different one of the plurality of pieces of encoded data (S4932). In each of the plurality of pieces of control information, a first identifier (slice_idx, for example) that indicates a subspace associated with the piece of encoded data associated with the piece of control information and a second identifier (tile_idx, for example) that indicates a piece of divided data associated with the piece of encoded data associated with the piece of control information are stored.

With such a configuration, the three-dimensional data decoding device that decodes the bitstream generated by the three-dimensional data encoding device can easily reproduce the target space by combining the plurality of pieces of divided data using the first identifier and the second identifier. Therefore, the processing amount of the three-dimensional data decoding device can be reduced.

For example, in the encoding described above, the three-dimensional data encoding device encodes the geometry information and the attribute information on the three-dimensional points included in each of the plurality of pieces of divided data. Each of the plurality of pieces of encoded data includes encoded data of the geometry information and the encoded data of the attribute information. Each of the plurality of pieces of control information includes the control information for the encoded data of the geometry information and the control information for the encoded data of the attribute information. The first identifier and the second identifier are stored in the control information for the encoded data of the geometry information.

For example, in the bitstream, each of the plurality of pieces of control information is arranged to precede the encoded data associated with the control information.

One or more subspaces are set in a target space including a plurality of three-dimensional points, and each subspace includes one or more pieces of divided data each including one or more three-dimensional points. The three-dimensional data encoding device generates a plurality of pieces of encoded data each associated with a different one of a plurality of pieces of divided data by encoding each of the plurality of pieces of divided data, and generates a bitstream including the plurality of pieces of encoded data and a plurality of pieces of control information each associated with a different one of the plurality of pieces of encoded data, and each of the plurality of pieces of control information may store the first identifier that indicates a subspace associated with the piece of encoded data associated with the piece of control information and the second identifier that indicates a piece of divided data associated with the piece of encoded data associated with the piece of control information.

For example, the three-dimensional data encoding device includes a processor and memory, and the processor performs the processes described above using the memory.

Figure 34:
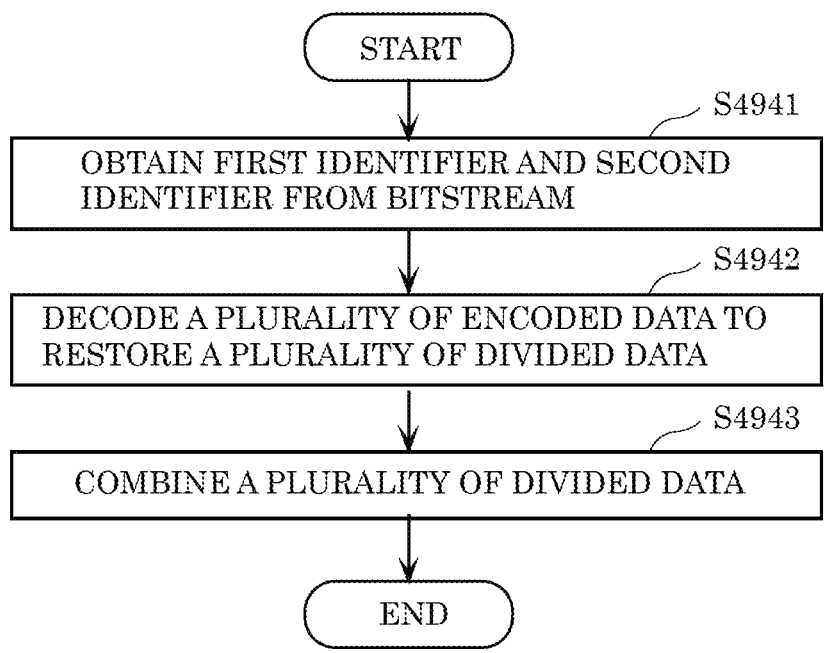
FIG. 34 is a flowchart of a decoding process according to Embodiment 4.

The three-dimensional data decoding device according to this embodiment performs the process shown in FIG. 34. First, from a bitstream including a plurality of pieces of encoded data generated by encoding of each of a plurality of pieces of divided data (tiles, for example) that are included in a plurality of subspaces (slices, for example) generated by dividing a target space including a plurality of three-dimensional points and each of which includes one or more three-dimensional points, and a plurality of pieces of control information (the header shown in FIG. 30, for example) for each of the plurality of pieces of encoded data, the three-dimensional data decoding device obtains the first identifier (slice_idx, for example) that indicates a subspace associated with the piece of encoded data associated with the piece of control information and the second identifier (tile_idx, for example) that indicates a piece of divided data associated with the piece of encoded data associated with the piece of control information, which are included in the plurality of pieces of control information (S4941). The three-dimensional data decoding device then reproduces the plurality of pieces of divided data by decoding the plurality of pieces of encoded data (S4942). The three-dimensional data decoding device then reproduces the target space by combining the plurality of pieces of divided data using the first identifier and the second identifier (S4943). For example, the three-dimensional data decoding device reproduces the plurality of subspaces by combining the plurality of pieces of divided data using the second identifier, and reproduces the target space (the plurality of three-dimensional points) by combining the plurality of subspaces using the first identifier. Note that the three-dimensional data decoding device may obtain encoded data of a desired subspace or desired divided data from the bitstream using at least one of the first identifier and the second identifier, and selectively or preferentially decode the obtained encoded data.

With such a configuration, the three-dimensional data decoding device can easily reproduce the target space by combining the plurality of pieces of divided data using the first identifier and the second identifier. Therefore, the processing amount of the three-dimensional data decoding device can be reduced.

For example, each of a plurality of pieces of encoded data is generated by encoding geometry information and attribute information on a three-dimensional point included in an associated piece of divided data, and includes encoded data of the geometry information and encoded data of the attribute information. Each of the plurality of pieces of control information includes control information for the encoded data of the geometry information and control information for the encoded data of the attribute information. The first identifier and the second identifier are stored in the control information for the encoded data of the geometry information.

For example, in the bitstream, the control information is arranged to precede the associated encoded data.

For example, the three-dimensional data decoding device includes a processor and memory, and the processor performs the processes described above using the memory.

Embodiment 5

In encoding of geometry information using neighborhood dependency, the coding efficiency can be improved as the density of a point cloud increases. In this embodiment, the three-dimensional data encoding device collectively encodes point cloud data of successive frames by combining the point cloud data of the successive frames. In this process, the three-dimensional data encoding device generates encoded data additionally including information for identifying a frame to which each leaf node included in the combined point cloud data belongs.

Here, point cloud data of successive frames are likely to be similar to each other. That is, occupancy codes for successive frames are likely to have a common higher-level part. In other words, occupancy codes for successive frames can share a higher-level part if the successive frames are collectively encoded.

By encoding an index of a frame, a determination of to which frame a point cloud belongs is made at a leaf node.

Figure 35:
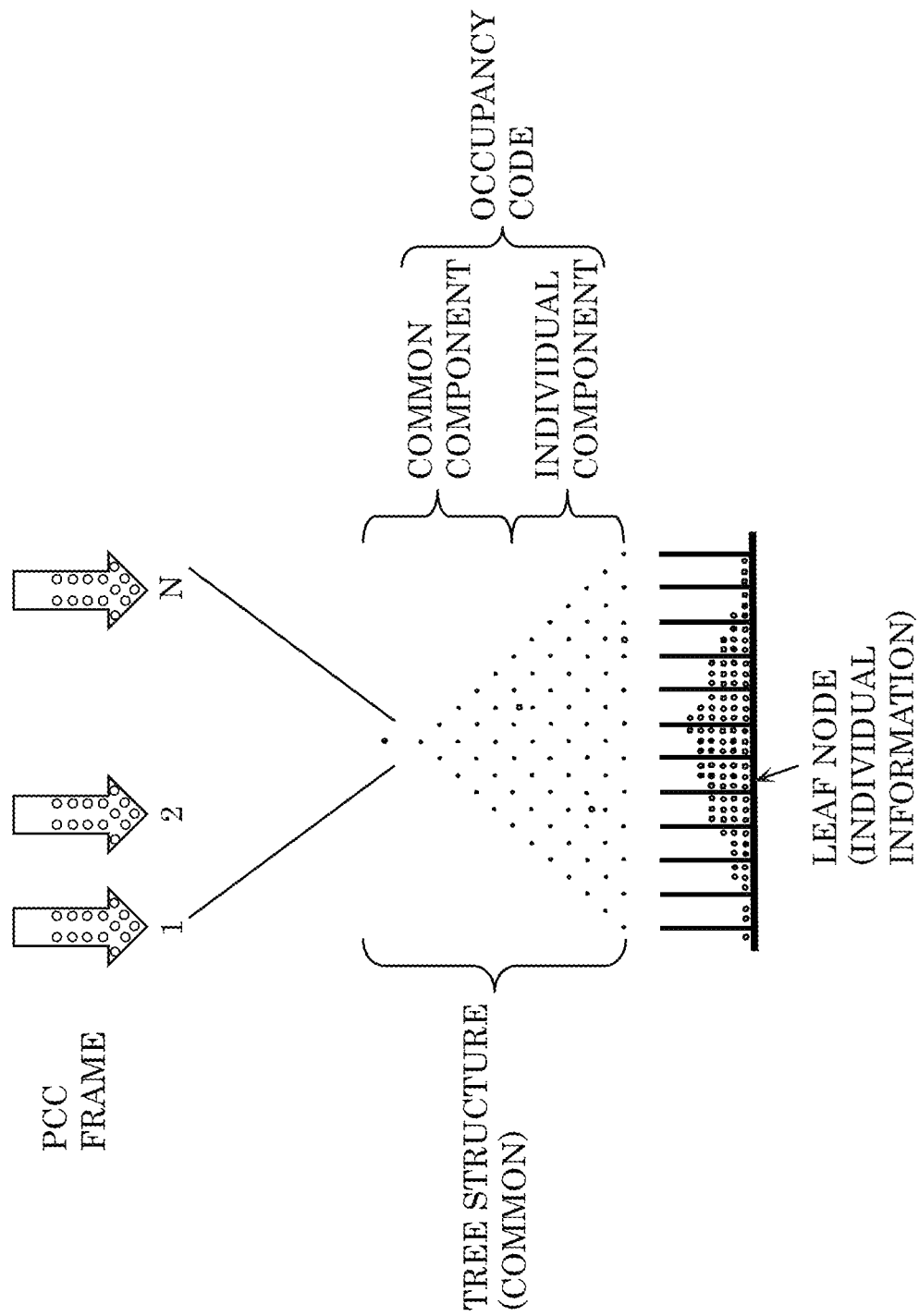
FIG. 35 is a diagram showing a concept of generation of a tree structure and an occupancy code from point cloud data of a plurality of frames according to Embodiment 5.

FIG. 35 is a diagram showing a concept of generation of a tree structure and an occupancy code from point cloud data of N point cloud compression (PCC) frames. In this drawing, a point in a hollow arrow indicates a point that belongs to a PCC frame. First, a frame index for identifying a frame is assigned to a point that belongs to each PCC frame.

Points belonging to the N frames are then converted into a tree structure, and an occupancy code is generated. Specifically, to which leaf node in the tree structure each point belongs is determined. In the drawing, the tree structure represents a set of nodes. The determination of to which node a point belongs is made beginning with the highest-level node. The determination result for each node is encoded into an occupancy code. The occupancy code is common among the N frames.

A node can include points belonging to different frames to which different frame indices are assigned. When the octree has a low resolution, a node can include points belonging to the same frame to which the same frame index is assigned.

In a lowest-level node (leaf node), points belonging to a plurality of frames can be mixed (duplicated).

As for the tree structure and the occupancy code, a higher-level part of the tree structure and occupancy codes in the higher-level part can be a common component for all the frames, and a lower-level part of the tree structure and occupancy codes in the lower-level part can be an individual component for each frame or can be partially a common component and partially an individual component.

For example, at a lowest-level node, such as a leaf node, zero or more points having a frame index are generated, and information indicating the number of points and information on the frame index of each point are generated. These pieces of information can be regarded as individual information for frames.

Figure 36:
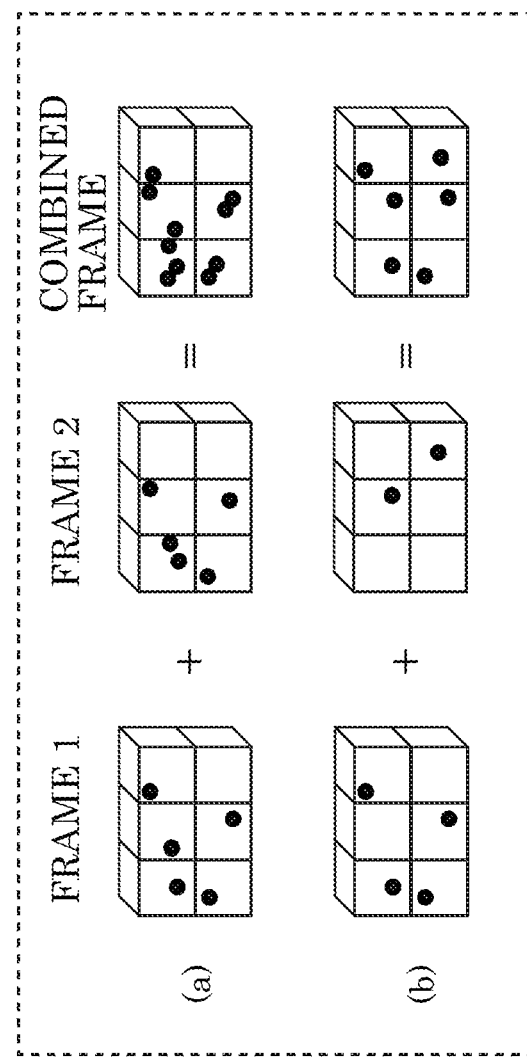
FIG. 36 is a diagram showing an example of frame combining according to Embodiment 5.

FIG. 36 is a diagram showing an example of frame combining. As shown in part (a) of FIG. 36, if a tree structure is generated by combining a plurality of frames, the density of the points of the frames included in the same node increases. In addition, if the tree structure is shared, the data amount of the occupancy codes can be reduced. In this way, the coding efficiency can be improved.

As shown in part (b) of FIG. 36, as the individual components of the occupancy codes in the tree structure become denser, the effectiveness of the arithmetic encoding increases, so that the coding efficiency can be improved.

In the following, combining of a plurality of PCC frames associated with different times will be described as an example. However, the description holds true for a case where there is not a plurality of frames, that is, frame combining is not performed (N=1). Furthermore, the plurality of pieces of point cloud data to be combined is not limited to a plurality of frames, that is, a plurality of pieces of point cloud data on the same object associated with different time points. That is, the method described below can be applied to combining of a plurality of pieces of point cloud data associated with different spaces or different times and spaces. The method described below can also be applied to combining of point cloud data or point cloud files of different contents.

Figure 37:
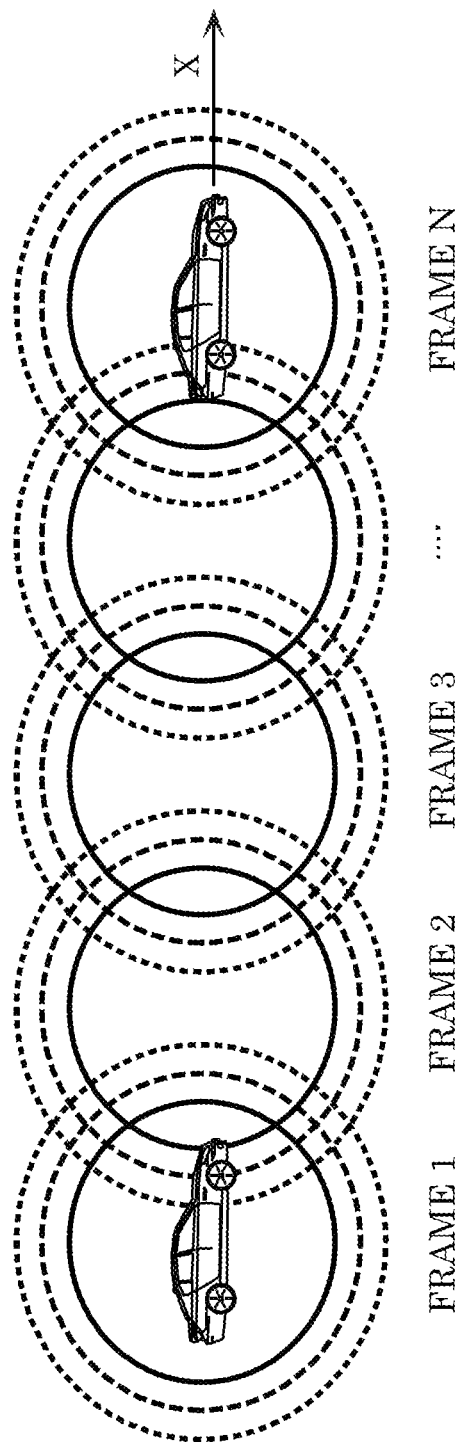
FIG. 37 is a diagram showing an example of combining of a plurality of frames according to Embodiment 5.

FIG. 37 is a diagram showing an example of combining of a plurality of PCC frames associated with different times. FIG. 37 shows an example in which an automobile obtains point cloud data with a sensor such as LiDAR while the automobile is moving. A dotted line indicates an effective range of the sensor in each frame, that is, a range of point cloud data. As the effective range of the sensor increases, the range of the point cloud data also increases.

The method of combining and encoding point cloud data is effective for point cloud data, such as point cloud data described below. For example, in the example shown in FIG. 37, the automobile is moving, and a frame is identified by 360° scanning of the periphery of the automobile. That is, frame 2, the frame following frame 1, corresponds to another 360° scanning performed when the vehicle has moved in an X direction.

In this case, frame 1 and frame 2 partially overlap with each other and therefore can include common point cloud data. Therefore, if frame 1 and frame 2 are combined and encoded, the coding efficiency can be improved. Note that more frames may be able to be combined. However, as the number of frames combined increases, the number of bits required for encoding of the frame indices assigned to the lead nodes increases.

Alternatively, point cloud data may be obtained by sensors at different positions. In that case, each piece of point cloud data obtained at a different position can be used as a frame. That is, the plurality of frames may be point cloud data obtained by a single sensor or point cloud data obtained by a plurality of sensors. Furthermore, objects may be partially or totally the same or may be different in the plurality of frames.

Figure 38:
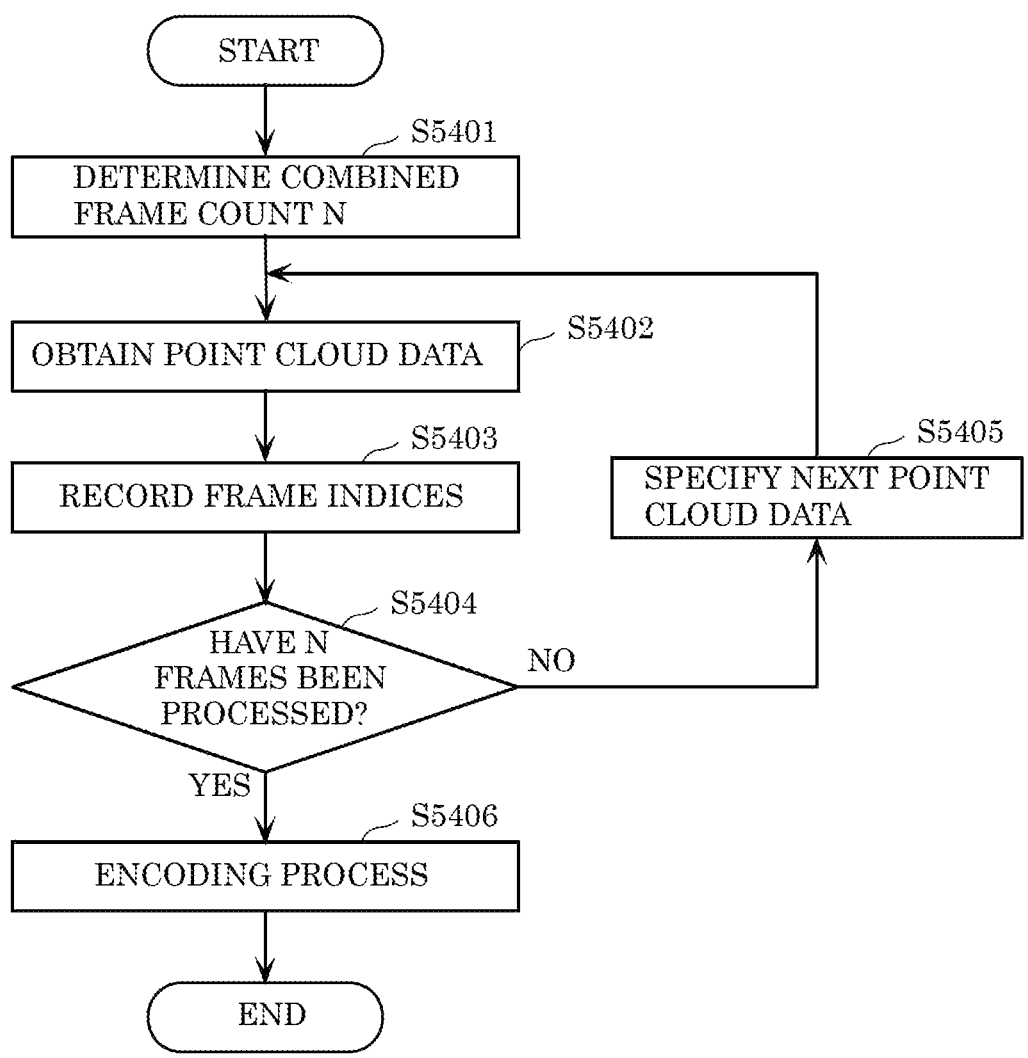
FIG. 38 is a flowchart of a three-dimensional data encoding process according to Embodiment 5.

Next, a flow of a three-dimensional data encoding process according to this embodiment will be described. FIG. 38 is a flowchart of the three-dimensional data encoding process. According to the combined frame count N, which is the number of frames to be combined, the three-dimensional data encoding device reads point cloud data of all the N frames.

First, the three-dimensional data encoding device determines the combined frame count N (S5401). For example, the combined frame count N is specified by a user.

The three-dimensional data encoding device then obtains point cloud data (S5402). The three-dimensional data encoding device then records frame indices of the obtained point cloud data (S5403).

When the N frames have not been processed (if No in S5404), the three-dimensional data encoding device specifies next point cloud data (S5405), and performs step S5402 and the following processing on the specified point cloud data.

On the other hand, when the N frames have been processed (if Yes in S5404), the three-dimensional data encoding device combines the N frames and encodes the resulting, combined frame (S5406).

Figure 39:
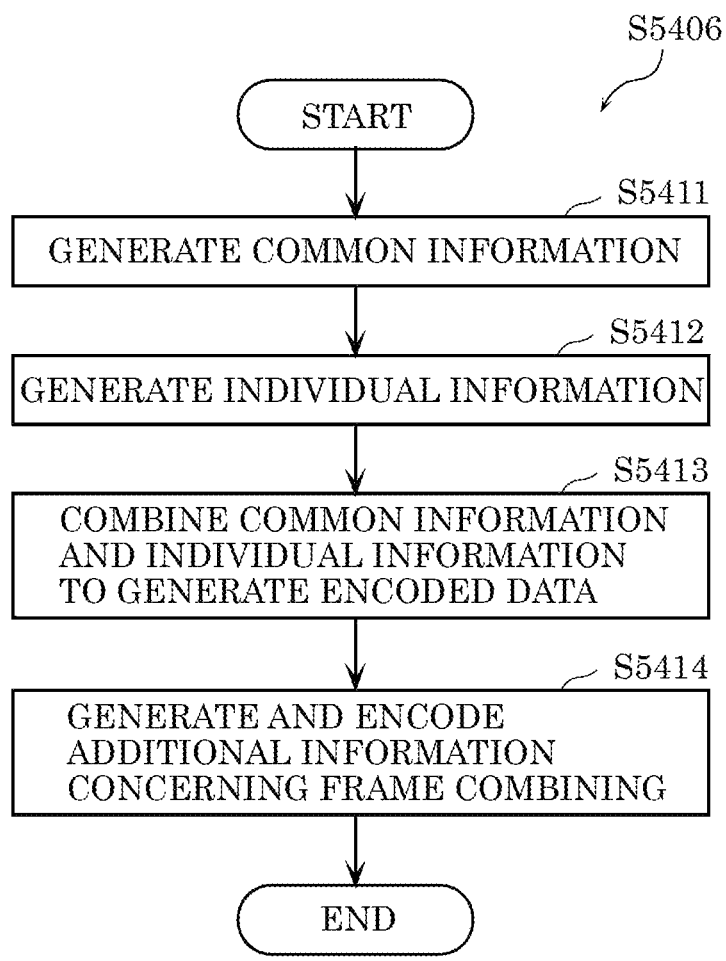
FIG. 39 is a flowchart of an encoding process according to Embodiment 5.

FIG. 39 is a flowchart of the encoding process (S5406). First, the three-dimensional data encoding device generates common information that is common to the N frames (S5411). For example, the common information includes an occupancy code and information indicating the combined frame count N.

The three-dimensional data encoding device then generates individual information that is individual information on each frame (S5412). For example, the individual information includes the number of points included in a leaf node, and the frame indices of the points included in the leaf node.

The three-dimensional data encoding device then combines the common information and the individual information, and generates encoded data by encoding the combined information (S5413). The three-dimensional data encoding device then generates additional information (metadata) concerning the frame combining, and encodes the generated additional information (S5414).

Figure 40:
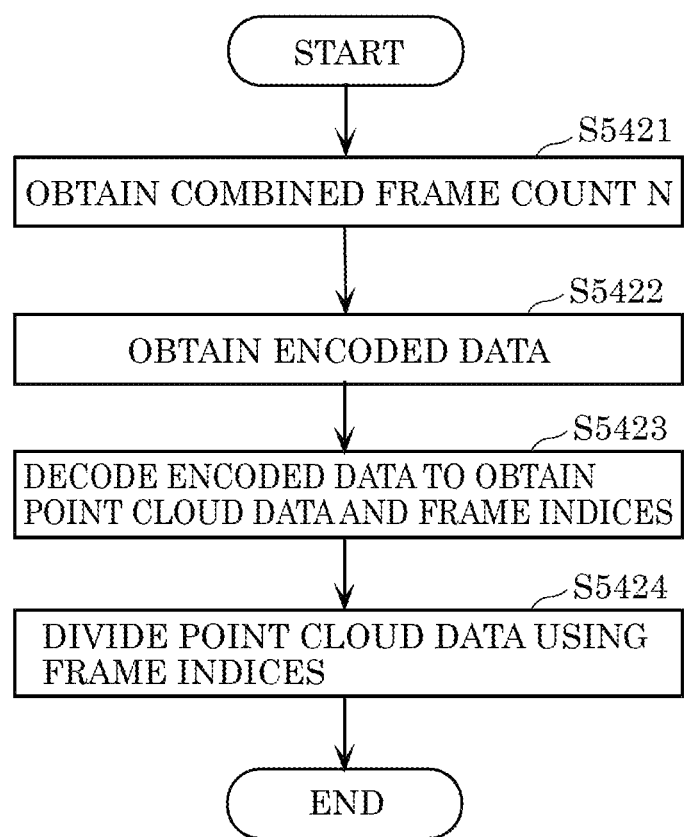
FIG. 40 is a flowchart of a three-dimensional data decoding process according to Embodiment 5.

Next, a flow of a three-dimensional data decoding process according to this embodiment will be described. FIG. 40 is a flowchart of the three-dimensional data decoding process.

First, the three-dimensional data decoding device obtains the combined frame count N from a bitstream (S5421). The three-dimensional data decoding device then obtains encoded data from the bitstream (S5422). The three-dimensional data decoding device decodes the encoded data to obtain point cloud data and frame indices (S5423). Finally, the three-dimensional data decoding device divides the decoded point cloud data using the frame indices (S5424).

Figure 41:
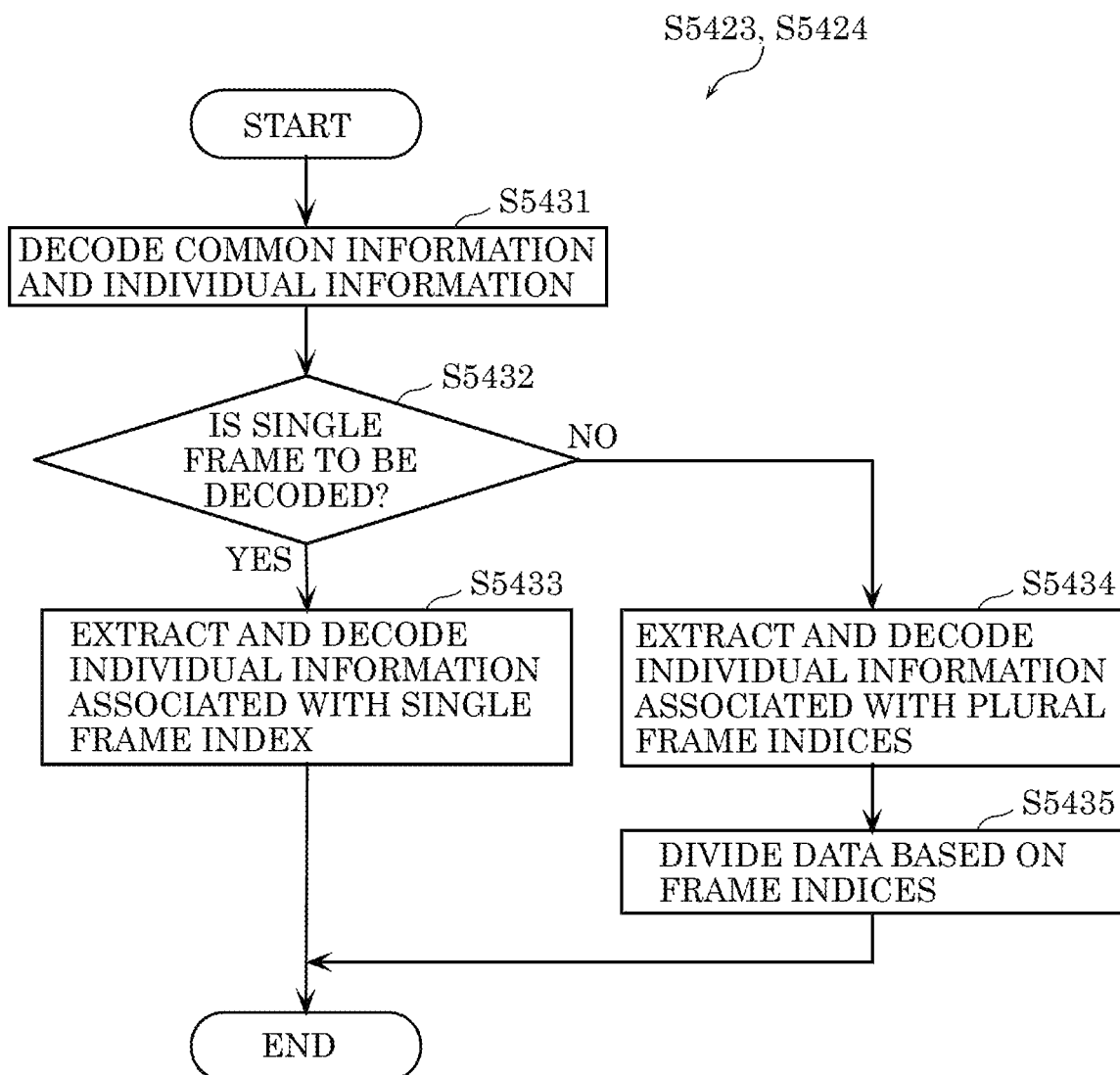
FIG. 41 is a flowchart of a decoding and dividing process according to Embodiment 5.

FIG. 41 is a flowchart of the decoding and dividing process (S5423 and S5424). First, the three-dimensional data decoding device decodes the encoded data (bitstream) into common information and individual information (that is, obtains common information and individual information from the encoded data) (S5431).

The three-dimensional data decoding device then determines whether to decode a single frame or to decode a plurality of frames (S5432). For example, whether to decode a single frame or to decode a plurality of frames may be externally specified. Here, the plurality of frames may be all the frames combined or some of the frames combined. For example, the three-dimensional data decoding device may determine to decode a particular frame required by an application, and not to decode the frames that are not required. Alternatively, when real-time decoding is required, the three-dimensional data decoding device may determine to decode a single frame of the plurality of frames combined.

When decoding a single frame (if Yes in S5432), the three-dimensional data decoding device extracts individual information associated with the frame index of the specified single frame from the decoded individual information, and decodes the extracted individual information to reproduce point cloud data of the specified frame corresponding to the frame index (S5433).

On the other hand, when decoding a plurality of frames (if No in S5432), the three-dimensional data decoding device extracts individual information associated with the frame indices of the specified plurality of frames (or all the frames), and decodes the extracted individual information to reproduce point cloud data of the specified plurality of frames (S5434). The three-dimensional data decoding device then divides the decoded point cloud data (individual information) based on the frame indices (S5435). That is, the three-dimensional data decoding device divides the decoded point cloud data into the plurality of frames.

Note that the three-dimensional data decoding device may collectively decode data of all the frames combined and then divide the decoded data into frames, or collectively decode data of an arbitrary part of the frames combined and divide the decoded data into frames. Furthermore, the three-dimensional data decoding device may separately decode data of a previously determined unit frame composed of a plurality of frames.

Figure 42:
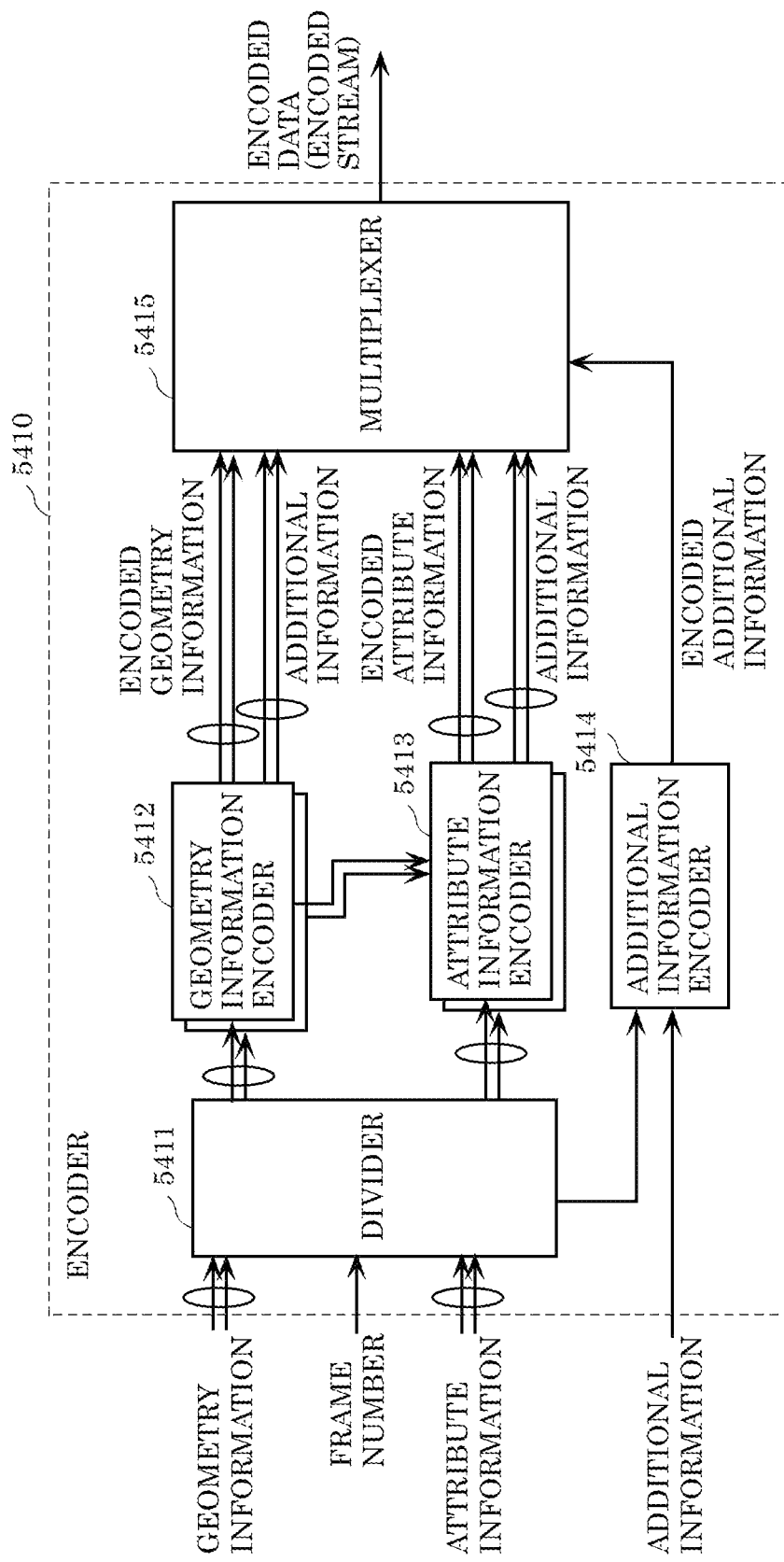
FIG. 42 is a block diagram showing an encoder according to Embodiment 5.

In the following, a configuration of the three-dimensional data encoding device according to this embodiment will be described. FIG. 42 is a block diagram showing a configuration of encoder 5410 included in the three-dimensional data encoding device according to this embodiment. Encoder 5410 generates encoded data (encoded stream) by encoding point cloud data (point cloud). Encoder 5410 includes divider 5411, a plurality of geometry information encoders 5412, a plurality of attribute information encoders 5413, additional information encoder 5414, and multiplexer 5415.

Divider 5411 generates a plurality of pieces of divided data of a plurality of frames by dividing point cloud data of a plurality of frames. Specifically, divider 5411 generates a plurality of pieces of divided data by dividing a space of point cloud data of each frame into a plurality of subspaces. Here, a subspace is a tile, a slice, or a combination of a tile and a slice. More specifically, point cloud data includes geometry information, attribute information (color, reflectance or the like), and additional information. A frame number is also input to divider 5411. Divider 5411 divides geometry information of each frame into a plurality of pieces of divided geometry information, and divides attribute information of each frame into a plurality of pieces of divided attribute information. Divider 5411 also generates additional information concerning the division.

For example, divider 5411 divides a point cloud into tiles. Divider 5411 then divides the resulting tiles into slices.

The plurality of geometry information encoders 5412 generates a plurality of pieces of encoded geometry information by encoding a plurality of pieces of divided geometry information. For example, geometry information encoder 5412 encodes divided geometry information using an N-ary tree, such as an octree. Specifically, in the case of an octree, a target space is divided into eight nodes (subspaces), and 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in a predetermined node becomes equal to or less than a threshold. For example, the plurality of geometry information encoders 5412 process the plurality of pieces of divided geometry information in parallel.

Attribute information encoder 4632 generates encoded attribute information, which is encoded data, by encoding attribute information using configuration information generated by geometry information encoder 4631. For example, attribute information encoder 4632 determines a reference point (reference node) that is to be referred to in encoding a target point (target node) to be processed based on the octree structure generated by geometry information encoder 4631. For example, attribute information encoder 4632 refers to a node whose parent node in the octree is the same as the parent node of the target node, of peripheral nodes or neighboring nodes. Note that the method of determining a reference relationship is not limited to this method.

The process of encoding geometry information or attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Attribute information encoders 5413 generate pieces of encoded attribute information by encoding pieces of divided attribute information. For example, attribute information encoders 5413 process pieces of divided geometry information in parallel.

Additional information encoder 5414 generates encoded additional information by encoding additional information included in point cloud data and additional information regarding data division generated at the time of dividing by divider 5411.

Multiplexer 5415 generates encoded data (encoded stream) by multiplexing pieces of encoded geometry information, pieces of encoded attribute information, and encoded additional information, and transmits the generated encoded data. The encoded additional information is also used at the time of decoding.

Figure 43:
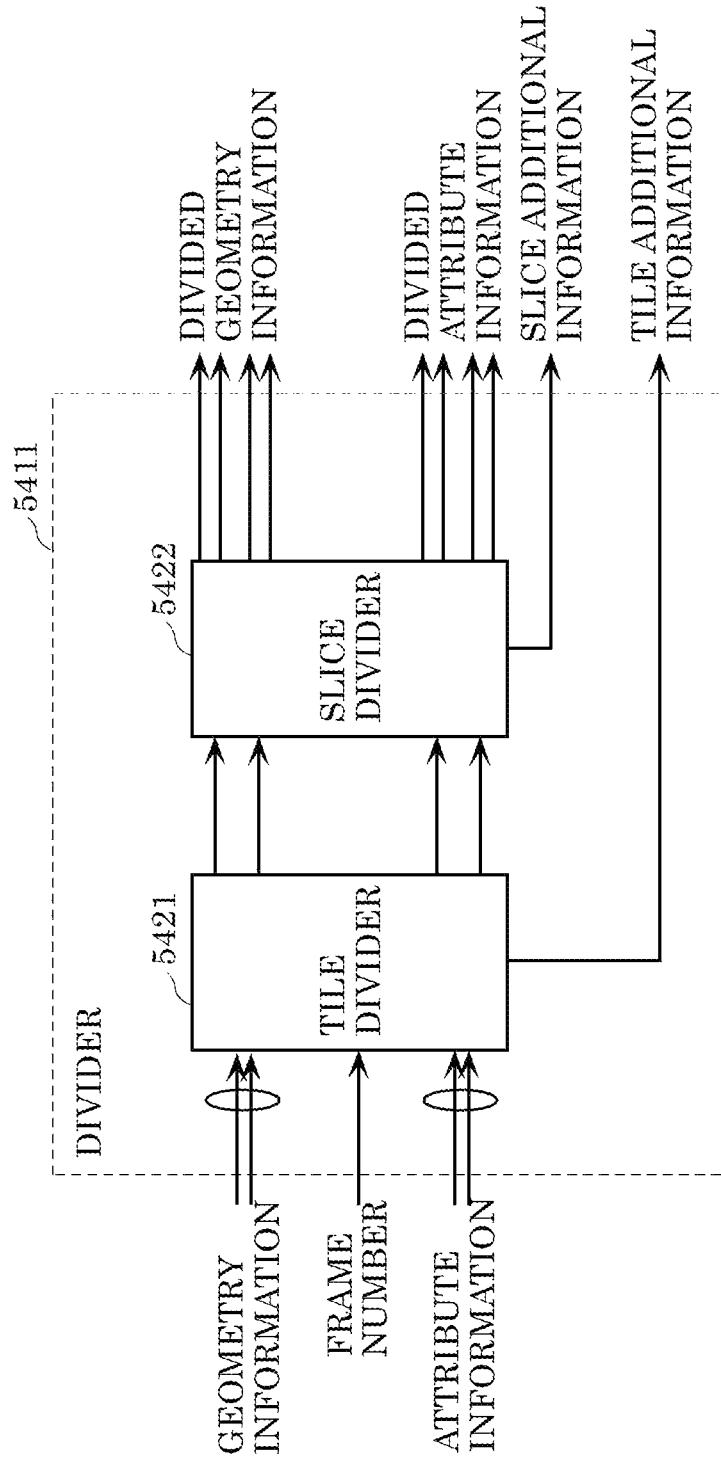
FIG. 43 is a block diagram showing a divider according to Embodiment 5.

FIG. 43 is a block diagram showing divider 5411. Divider 5411 includes tile divider 5421 and slice divider 5422.

Tile divider 5421 generates a plurality of pieces of tile geometry information by dividing geometry information (position (geometry)) of each of a plurality of frames into tiles. Tile divider 5421 also generates a plurality of pieces of tile attribute information by dividing attribute information (attribute) of a plurality of frames into tiles. Tile divider 5421 outputs tile additional information (tile metadata) including information concerning the tile division and information generated in the tile division.

Slice divider 5422 generates a plurality of pieces of divided geometry information (a plurality of pieces of slice geometry information) by dividing a plurality of pieces of tile geometry information into slices. Slice divider 5422 also generates a plurality of pieces of divided attribute information (a plurality of pieces of slice attribute information) by dividing a plurality of pieces of tile attribute information into slices. Slice divider 5422 outputs slice additional information (slice metadata) including information concerning the slice division and information generated in the slice division.

In the dividing process, divider 5411 uses a frame number (frame index) to indicate coordinates of an origin, attribute information or the like.

Figure 44:
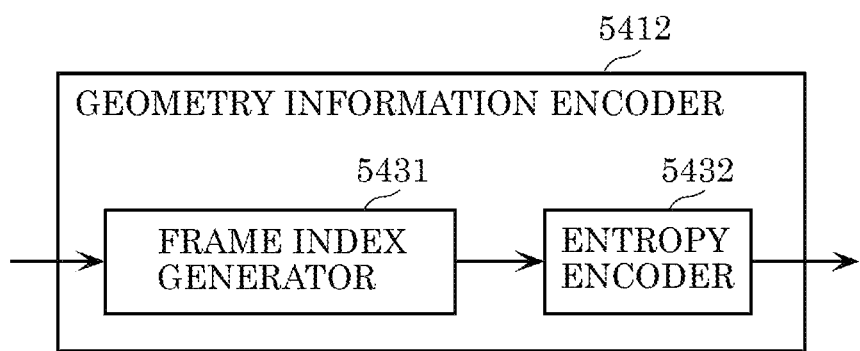
FIG. 44 is a block diagram showing a geometry information encoder according to Embodiment 5.

FIG. 44 is a block diagram showing geometry information encoder 5412. Geometry information encoder 5412 includes frame index generator 5431 and entropy encoder 5432.

Frame index generator 5431 determines a value of a frame index based on a frame number, and adds the determined frame index to geometry information. Entropy encoder 5432 generates encoded geometry information by entropy-encoding divided geometry information with a frame index added thereto.

Figure 45:
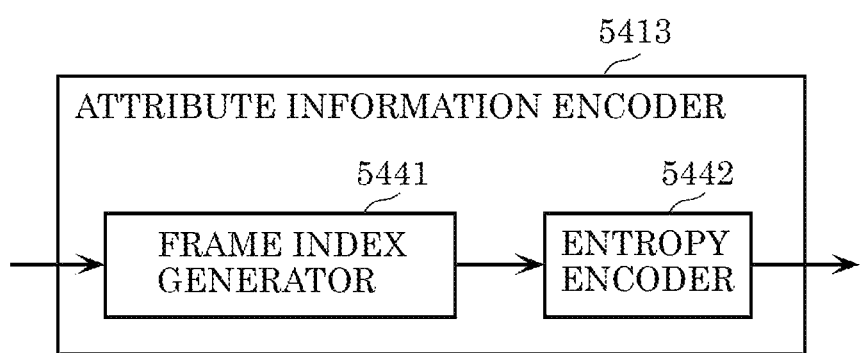
FIG. 45 is a block diagram showing an attribute information encoder according to Embodiment 5.

FIG. 45 is a block diagram showing attribute information encoder 5413. Attribute information encoder 5413 includes frame index generator 5441 and entropy encoder 5442.

Frame index generator 5441 determines a value of a frame index based on a frame number, and adds the determined frame index to attribute information. Entropy encoder 5442 generates encoded attribute information by entropy-encoding divided attribute information with a frame index added thereto.

Figure 46:
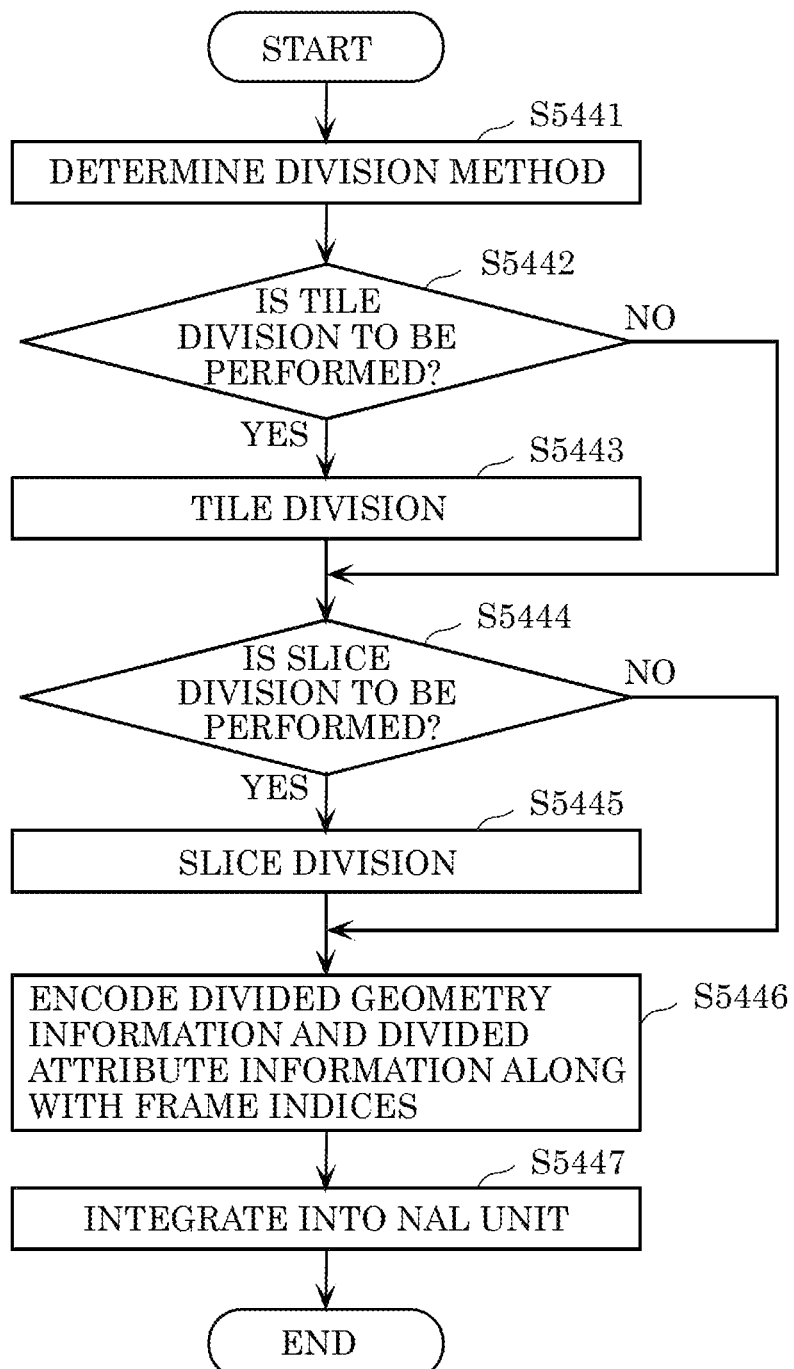
FIG. 46 is a flowchart of a process of encoding point cloud data according to Embodiment 5.

The following describes procedures of a point cloud data encoding process and a point cloud data decoding process according to the present embodiment. FIG. 46 is a flowchart of a point cloud data encoding process according to the present embodiment.

First, the three-dimensional data encoding device determines a division method to be used (S5441). Examples of the division method include tile division and slice division. A division method may include a division number, a division type, etc. when tile division or slice division is performed.

When tile division is performed (YES in S5442), the three-dimensional data encoding device generates pieces of tile geometry information and pieces of tile attribute information by dividing geometry information and attribute information collectively (S5443). Besides, the three-dimensional data encoding device generates tile additional information regarding the tile division.

When slice division is performed (YES in S5444), the three-dimensional data encoding device generates pieces of divided geometry information and pieces of divided attribute information by dividing the pieces of tile geometry information and the pieces of tile attribute information (or the geometry information and the attribute information) separately (S5445). Also, the three-dimensional data encoding device generates geometry slice additional information and attribute slice additional information regarding the slice division.

Next, the three-dimensional data encoding device generates pieces of encoded geometry information and pieces of encoded attribute information by respectively encoding the pieces of divided geometry information and the pieces of divided attribute information as frame indexes (S5446). In addition, the three-dimensional data encoding device generates dependency relationship information.

Finally, the three-dimensional data encoding device generates encoded data (an encoded stream) by storing in NAL units (multiplexing) the pieces of encoded geometry information, the pieces of encoded attribute information, and additional information (S5447). Additionally, the three-dimensional data encoding device transmits the generated encoded data.

Figure 47:
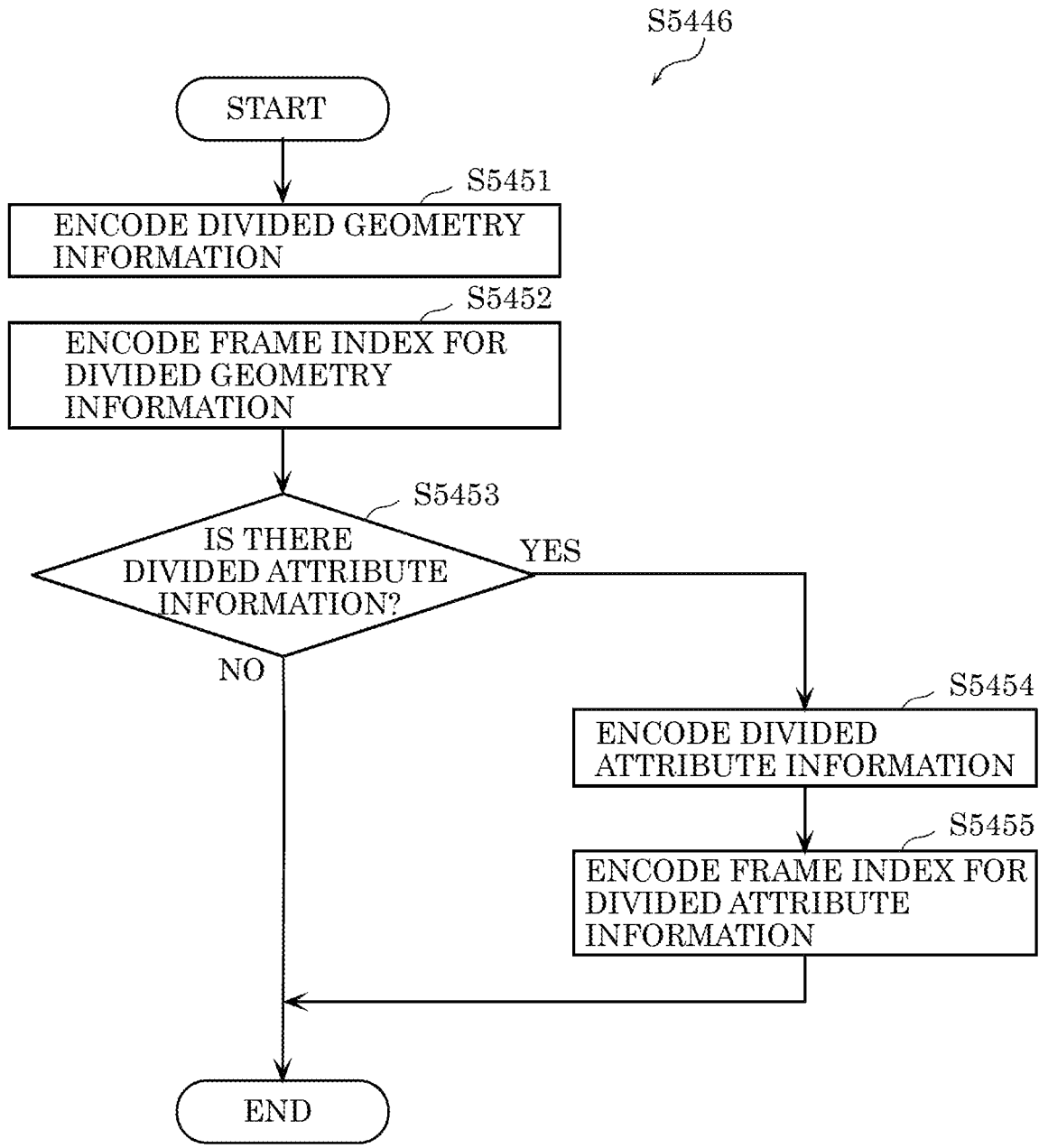
FIG. 47 is a flowchart of an encoding process according to Embodiment 5.

FIG. 47 is a flowchart of the encoding process (S5446). First, the three-dimensional data encoding device encodes divided geometry information (S5451). The three-dimensional data encoding device then encodes a frame index for the divided geometry information (S5452).

When there is divided attribute information (if Yes in S5453), the three-dimensional data encoding device encodes the divided attribute information (S5454), and encodes a frame index for the divided attribute information (S5455). On the other hand, when there is no divided attribute information (if No in S5453), the three-dimensional data encoding device does not perform encoding of any divided attribute information and encoding of a frame index for any divided attribute information. Note that the frame index may be stored in any one or both of the divided geometry information and the divided attribute information.

Note that the three-dimensional data encoding device may encode attribute information using a frame index or without using a frame index. That is, the three-dimensional data encoding device may identify a frame to which each point belongs using a frame index and perform encoding on a frame basis, or may encode the points belonging to all the frames without identifying the frames.

Figure 48:
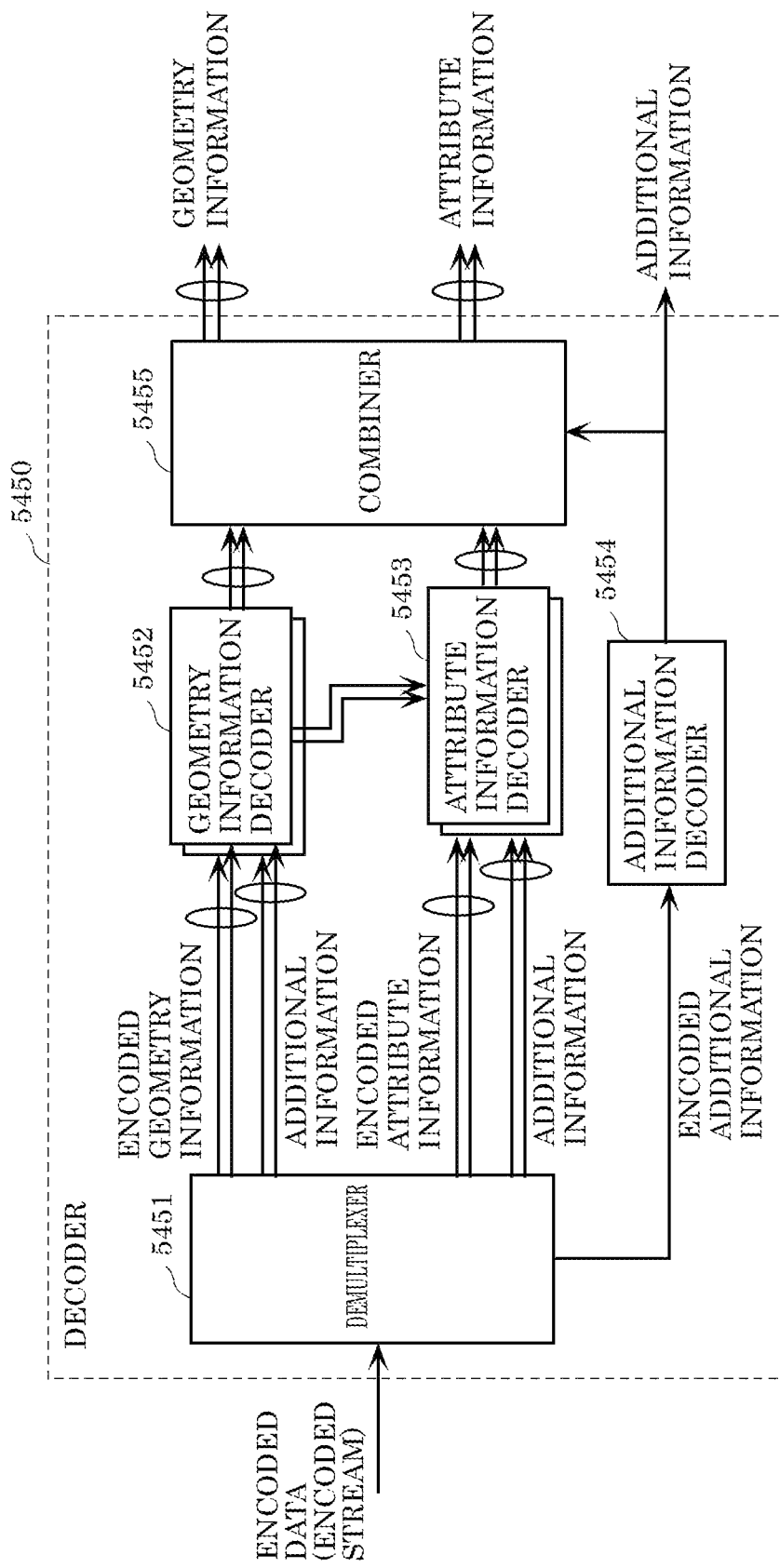
FIG. 48 is a block diagram showing a decoder according to Embodiment 5.

In the following, a configuration of the three-dimensional data decoding device according to this embodiment will be described. FIG. 48 is a block diagram showing a configuration of decoder 5450. Decoder 5450 reproduces point cloud data by decoding encoded data (encoded stream) generated by encoding the point cloud data. Decoder 5450 includes demultiplexer 5451, a plurality of geometry information decoders 5452, a plurality of attribute information decoders 5453, additional information decoder 5454, and combiner 5455.

Demultiplexer 5451 generates a plurality of pieces of encoded geometry information, a plurality of pieces of encoded attribute information, and encoded additional information by demultiplexing encoded data (encoded stream).

The plurality of geometry information decoders 5452 generate a plurality of pieces of divided geometry information by decoding a plurality of pieces of encoded geometry information. For example, the plurality of geometry information decoders 5452 process a plurality of pieces of encoded geometry information in parallel.

The plurality of attribute information decoders 5453 generate a plurality of pieces of divided attribute information by decoding a plurality of pieces of encoded attribute information. For example, the plurality of attribute information decoders 5453 process a plurality of pieces of encoded attribute information in parallel.

The plurality of additional information decoders 5454 generate additional information by decoding encoded additional information.

Combiner 5455 generates geometry information by combining a plurality of pieces of divided geometry information using additional information. Combiner 5455 generates attribute information by combining a plurality of pieces of divided attribute information using additional information. Combiner 5455 also divides geometry information and attribute information into geometry information of a plurality of frames and attribute information of a plurality of frames using frame indices.

Figure 49:
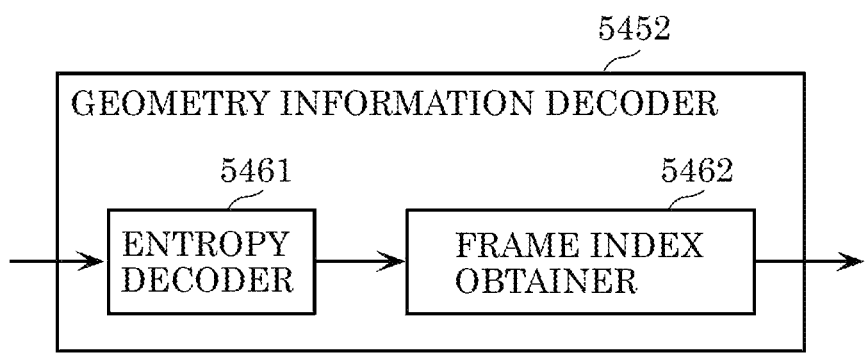
FIG. 49 is a block diagram showing a geometry information decoder according to Embodiment 5.

FIG. 49 is a block diagram showing geometry information decoder 5452. Geometry information decoder 5452 includes entropy decoder 5461 and frame index obtainer 5462. Entropy decoder 5461 generates divided geometry information by entropy-decoding encoded geometry information. Frame index obtainer 5462 obtains a frame index from divided geometry information.

Figure 50:
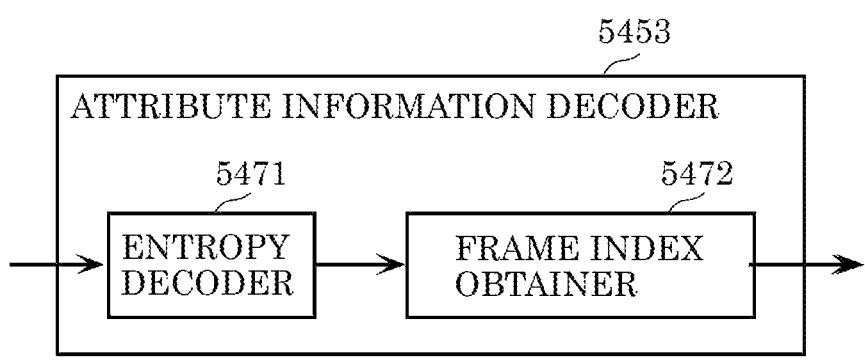
FIG. 50 is a block diagram showing an attribute information decoder according to Embodiment 5.

FIG. 50 is a block diagram showing attribute information decoder 5453. Attribute information decoder 5453 includes entropy decoder 5471 and frame index obtainer 5472. Entropy decoder 5471 generates divided attribute information by entropy-decoding encoded attribute information. Frame index obtainer 5472 obtains a frame index from divided attribute information.

Figure 51:
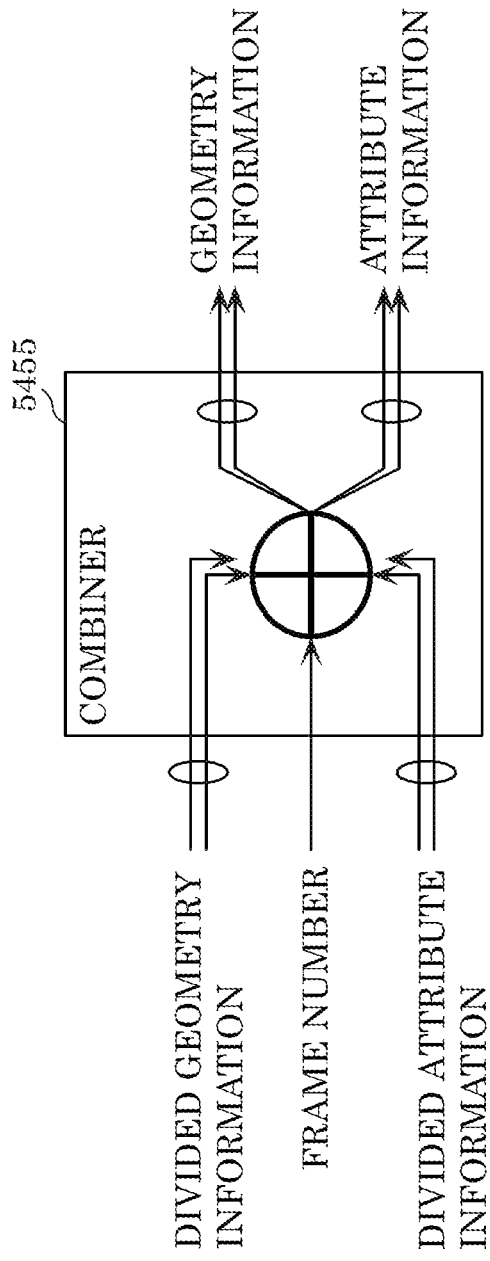
FIG. 51 is a block diagram showing a combiner according to Embodiment 5.

FIG. 51 is a diagram showing a configuration of combiner 5455. Combiner 5455 generates geometry information by combining a plurality of pieces of divided geometry information. Combiner 5455 generates attribute information by combining a plurality of pieces of divided attribute information. Combiner 5455 also divides geometry information and attribute information into geometry information of a plurality of frames and attribute information of a plurality of frames using frame indices.

Figure 52:
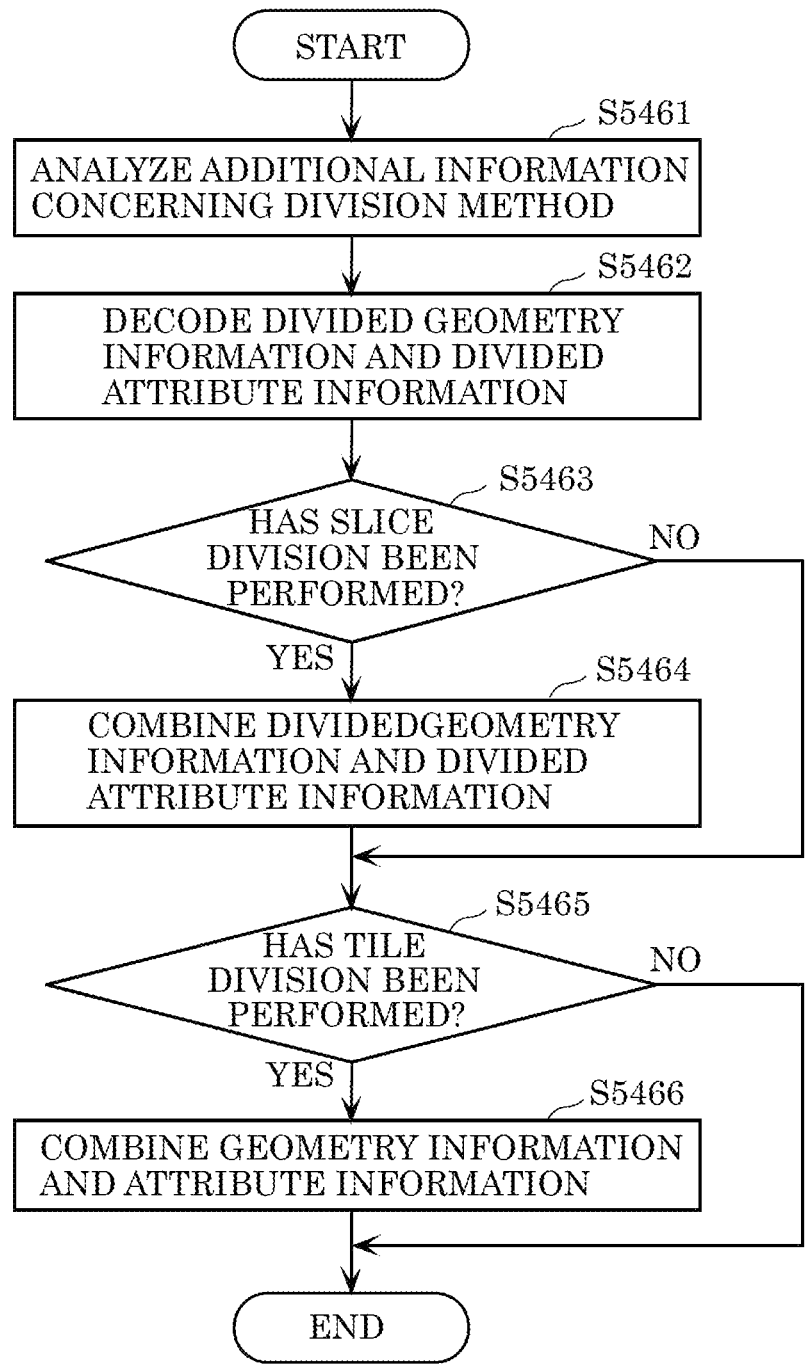
FIG. 52 is a flowchart of a process of decoding point cloud data according to Embodiment 5.

FIG. 52 is a flowchart of a point cloud data decoding process according to the present embodiment. First, the three-dimensional data decoding device determines a division method by analyzing additional information (slice additional information and tile additional information) regarding a division method included in encoded data (an encoded stream) (S5461). Examples of the division method include tile division and slice division. A division method may include a division number, a division type, etc. when tile division or slice division is performed.

Next, the three-dimensional data decoding device generates divided geometry information and divided attribute information by decoding pieces of encoded geometry information and pieces of encoded attribute information included in the encoded data, using dependency relationship information included in the encoded data (S5462).

When the additional information indicates that slice division has been performed (YES in S5463), the three-dimensional data decoding device generates pieces of tile geometry information and pieces of tile attribute information by combining pieces of divided geometry information and combining pieces of divided attribute information, based on the slice additional information (S5464). Here, the pieces of divided geometry information, the pieces of divided attribute information, the pieces of tile geometry information, and the pieces of tile attribute information include frame indexes.

When the additional information indicates that tile division has been performed (YES in S5465), the three-dimensional data decoding device generates geometry information and attribute information by combining the pieces of tile geometry information (the pieces of divided geometry information) and combining the pieces of tile attribute information (the pieces of divided attribute information), based on tile additional information (S5466). Here, the pieces of tile geometry information, the pieces of tile attribute information, the geometry information, and the attribute information include frame indexes.

Figure 53:
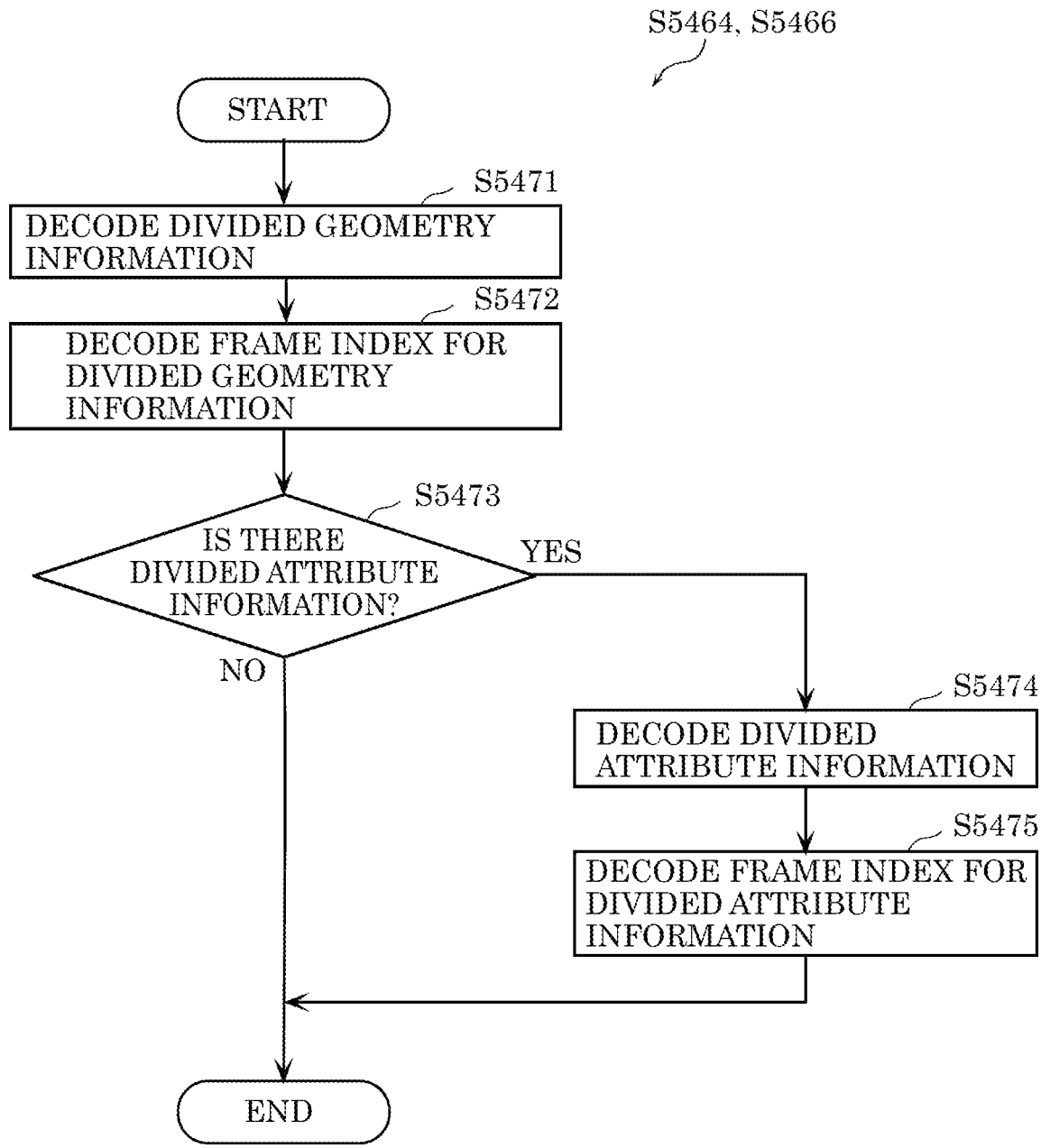
FIG. 53 is a flowchart of a decoding process according to Embodiment 5.

FIG. 53 is a flowchart of the decoding process (S5464 and S5466). First, the three-dimensional data decoding device decodes divided geometry information (slice geometry information) (S5471). The three-dimensional data decoding device then decodes a frame index for the divided geometry information (S5472).

When there is divided attribute information (if Yes in S5473), the three-dimensional data decoding device decodes the divided attribute information (S5474), and decodes a frame index for the divided attribute information (S475). On the other hand, when there is no divided attribute information (if No in S5473), the three-dimensional data decoding device does not perform decoding of any divided attribute information and decoding of a frame index for any divided attribute information.

Note that the three-dimensional data decoding device may decode attribute information using a frame index or without using a frame index.

Figure 54:
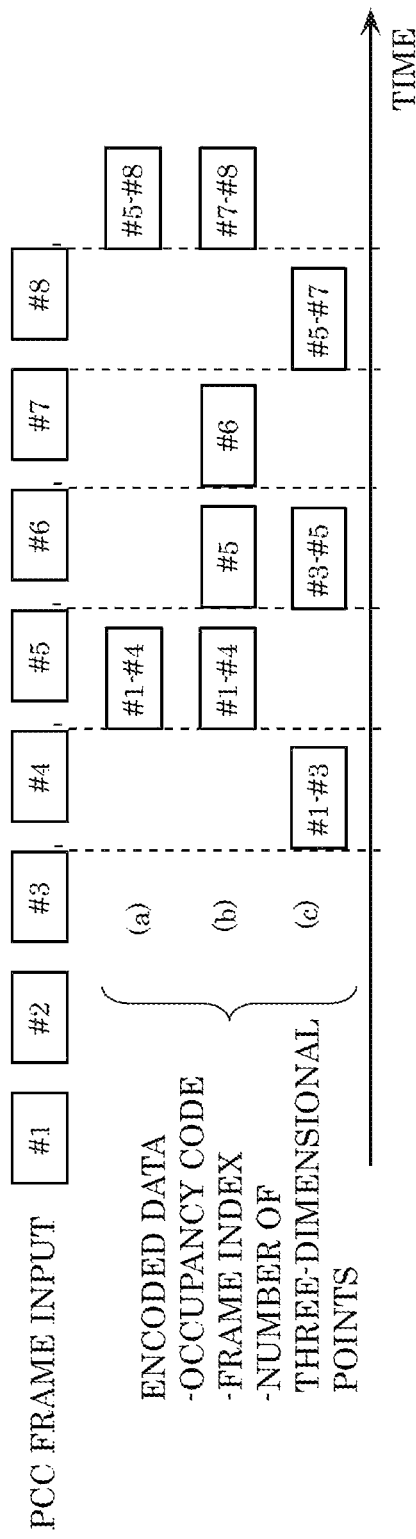
FIG. 54 is a diagram showing an example of pattern of frame combining according to Embodiment 5.

In the following, a unit of encoding in frame combining will be described. FIG. 54 is a diagram showing an example of a pattern of frame combining. The example in this drawing is an example in which PCC frames are a time series, and data is generated and encoded in real time.

Part (a) of FIG. 54 shows a case where four frames are always combined. The three-dimensional data encoding device waits until data of four frames is generated, and then generates encoded data.

Part (b) of FIG. 54 shows a case where the number of frames to be combined adaptively varies. For example, the three-dimensional data encoding device changes the number of frames to be combined in order to adjust the code amount of encoded data in a rate control.

Note that, if frame combining can be useless, the three-dimensional data encoding device may not combine frames. The three-dimensional data encoding device may also determine whether to combine frames or not.

Part (c) of FIG. 54 shows an example of a case where a plurality of frames combined partially overlap with a plurality of frames to be combined next. This example is useful when real-time processing or low delay is required, such as when each piece of data is transmitted as soon as the data is encoded.

Figure 55:
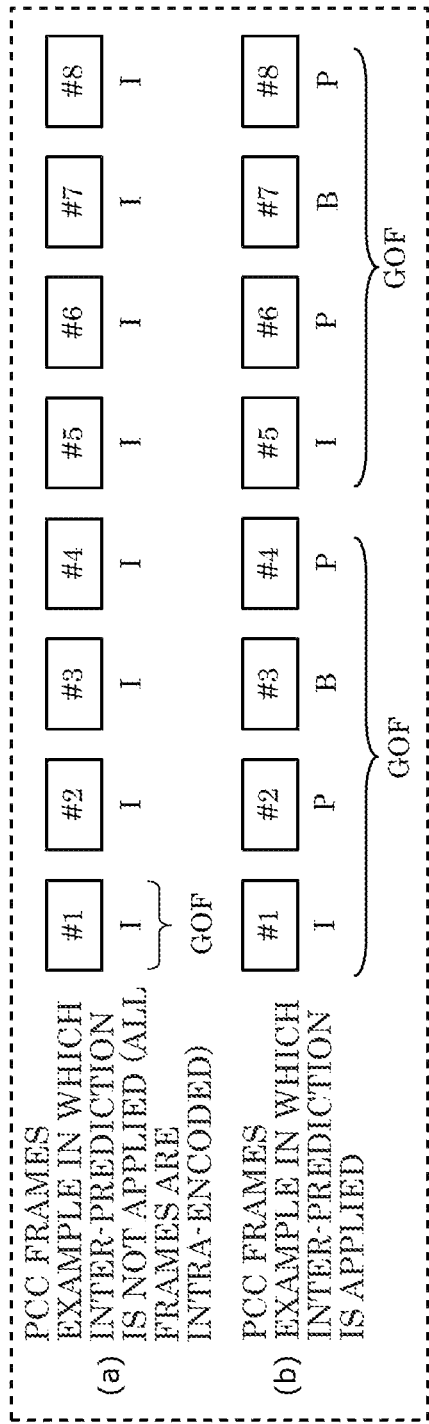
FIG. 55 is a diagram showing a configuration example of PCC frames according to Embodiment 5.

FIG. 55 is a diagram showing a configuration example of PCC frames. The three-dimensional data encoding device may configure frames to be combined in such a manner that the frames include at least a data unit that can be singly decoded. For example, when all the PCC frames are intra-encoded, and the PCC frames can be singly decoded as shown in part (a) of FIG. 55, any of the patterns described above can be applied.

When a random access unit, such as group of frames (GOF), is set, such as when inter-prediction is applied, for example, as shown in part (b) of FIG. 55, the three-dimensional data encoding device may combine data based on the GOF unit as a minimum unit.

Note that the three-dimensional data encoding device may collectively encode common information and individual information or separately encode common information and individual information. Furthermore, the three-dimensional data encoding device may use a common data structure or different data structures for common information and individual information.

The three-dimensional data encoding device may compare occupancy codes for a plurality of frames after an occupancy code is generated for each frame. For example, the three-dimensional data encoding device may determine whether there is a large common part between occupancy codes for a plurality of frames based on a predetermined criterion, and generate common information if there is a large common part. Alternatively, based on whether there is a large common part between occupancy codes, the three-dimensional data encoding device may determine whether to combine frames, which frames are to be combined, or the number of frames to be combined.

Figures 56, 57, 58:
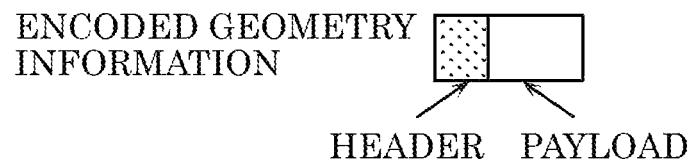
FIG. 56 is a diagram showing a configuration of encoded geometry information according to Embodiment 5.
FIG. 57 is a diagram showing a syntax example of a header of encoded geometry information according to Embodiment 5.
FIG. 58 is a diagram showing a syntax example of a payload of encoded geometry information according to Embodiment 5.

Next, a configuration of encoded geometry information will be described. FIG. 56 is a diagram showing a configuration of encoded geometry information. Encoded geometry information includes a header and a payload.

FIG. 57 is a diagram showing a syntax example of a header (Geometry_header) of encoded geometry information. The header of encoded geometry information includes a GPS index (gps_idx), offset information (offset), other information (other_geometry_information), a frame combining flag (combine_frame_flag), and a combined frame count (number_of_combine_frame).

The GPS index indicates an identifier (ID) of a parameter set (GPS) associated with encoded geometry information. GPS is a parameter set of encoded geometry information of one frame or a plurality of frames. Note that, when there is a parameter set for each frame, the header may indicate identifiers of a plurality of parameter sets.

The offset information indicates an offset position for obtaining combined data. The other information indicates other information concerning geometry information (a difference value of a quantization parameter (QPdelta), for example). The frame combining flag indicates whether frame combining has been performed for encoded data or not. The combined frame count indicates the number of frames combined.

Note that part or all of the information described above may be described in SPS or GPS. Note that SPS means a parameter set based on a sequence (a plurality of frames) as a unit, and is a parameter set commonly used for encoded geometry information and encoded attribute information.

FIG. 58 is a diagram showing a syntax example of a payload (Geometry_data) of encoded geometry information. The payload of encoded geometry information includes common information and leaf node information.

Common information is data of one or more frames combined, and includes an occupancy code (occupancy_Code) or the like.

Leaf node information (combine_information) is information on each leaf node. Leaf node information may be indicated for each frame as a loop of the number of frames.

Figures 59, 60, 61:
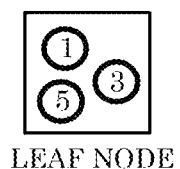
FIG. 59 is a diagram showing an example of leaf node information according to Embodiment 5.
FIG. 60 is a diagram showing an example of the leaf node information according to Embodiment 5.
FIG. 61 is a diagram showing an example of bit map information according to Embodiment 5.

As a method of indicating a frame index of a point included in a lead node, any of method 1 and method 2 can be used. FIG. 59 is a diagram showing an example of the leaf node information in the case of method 1. The leaf node information shown in FIG. 59 includes the three-dimensional point count (NumberOfPoints) that indicates the number of points included in a node, and a frame index (FrameIndex) for each point.

FIG. 60 is a diagram showing an example of the leaf node information in the case of method 2. In the example shown in FIG. 60, the leaf node information includes bit map information (bitmapIsFramePointsFlag) that indicates frame indices of a plurality of points with a bit map. FIG. 61 is a diagram showing an example of the bit map information. In this example, the bit map indicates that the lead node includes three-dimensional points of frame indices 1, 3, and 5.

Note that, when the quantization resolution is low, there may be duplicated points in the same frame. In that case, the three-dimensional point count (NumberOfPoints) may be shared, and the number of three-dimensional points in each frame and the total number of three-dimensional points in a plurality of frames may be indicated.

When lossy compression is used, the three-dimensional data encoding device may delete a duplicated point to reduce the information amount. The three-dimensional data encoding device may delete a duplicated point before frame combining or after frame combining.

Figures 62, 63, 64:
FIG. 62 is a diagram showing a configuration of encoded attribute information according to Embodiment 5.
FIG. 63 is a diagram showing a syntax example of a header of encoded attribute information according to Embodiment 5.
FIG. 64 is a diagram showing a syntax example of a payload of encoded attribute information according to Embodiment 5.

Next, a configuration of encoded attribute information will be described. FIG. 62 is a diagram showing a configuration of encoded attribute information. The encoded attribute information includes a header and a payload.

FIG. 63 is a diagram showing a syntax example of a header (Attribute_header) of encoded attribute information. The header of the encoded attribute information includes an APS index (aps_idx), offset information (offset), other information (other_attribute_information), a frame combining flag (combine_frame_flag), and a combined frame count (number_of_combine_frame).

The APS index indicates an identifier (ID) of a parameter set (APS) associated with encoded attribute information. APS is a parameter set of encoded attribute information of one frame or a plurality of frames. Note that, when there is a parameter set for each frame, the header may indicate identifiers of a plurality of parameter sets.

The offset information indicates an offset position for obtaining combined data. The other information indicates other information concerning attribute information (a difference value of a quantization parameter (QPdelta), for example). The frame combining flag indicates whether frame combining has been performed for encoded data or not. The combined frame count indicates the number of frames combined.

Note that all or part of the information described above may be described in SPS or APS.

FIG. 64 is a diagram showing a syntax example of a payload (Attribute_data) of encoded attribute information. The payload of encoded attribute information includes leaf node information (combine_information). For example, a configuration of the leaf node information is the same as that of the leaf node information included in the payload of the encoded geometry information. That is, the leaf node information (frame index) may be included in the attribute information.

The leaf node information may be stored in one of the encoded geometry information and the encoded attribute information and not included in the other. In that case, the leaf node information (frame index) stored in one of the encoded geometry information and the encoded attribute information is referred to when decoding the other information. Furthermore, information indicating a reference destination may be included in the encoded geometry information or the encoded attribute information.

Figure 65:
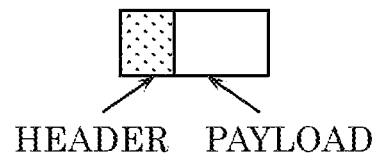
FIG. 65 is a diagram showing a configuration of encoded data according to Embodiment 5.

Next, an example of the order of transmission of encoded data and an example of the order of decoding of encoded data will be described. FIG. 65 is a diagram showing a configuration of encoded data. The encoded data includes a header and a payload.

Figure 66:
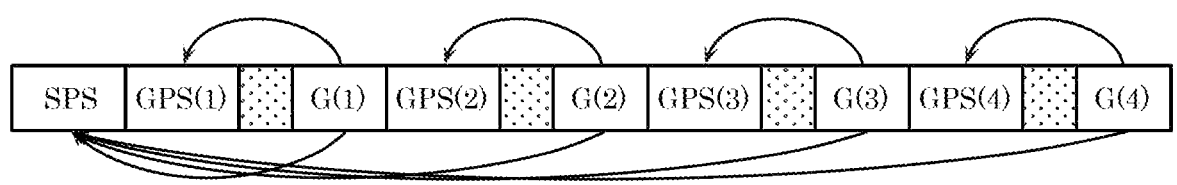
FIG. 66 is a diagram showing an order of transmission and a data reference relationship according to Embodiment 5.
Figure 67:
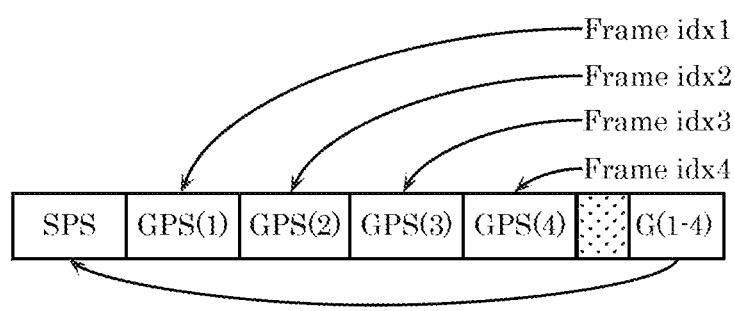
FIG. 67 is a diagram showing an order of transmission and a data reference relationship according to Embodiment 5.
Figure 68:
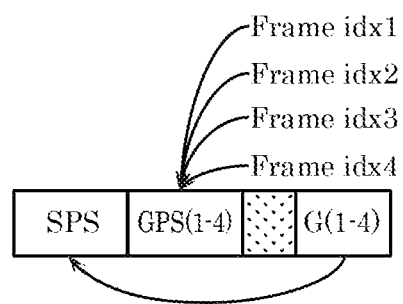
FIG. 68 is a diagram showing an order of transmission and a data reference relationship according to Embodiment 5.

FIGS. 66 to 68 are diagrams showing an order of data transmission and a data reference relationship. In these drawings, G(1) or the like denotes encoded geometry information, GPS(1) or the like denotes a parameter set for encoded geometry information, and SPS denotes a parameter set for a sequence (a plurality of frames). A numeral in parentheses indicates a value of a frame index. Note that the three-dimensional data encoding device may transmit data in an order of decoding.

FIG. 66 is a diagram showing an example of the order of transmission in a case where frame combining is not performed. FIG. 67 is a diagram showing an example of a case where frame combining is performed and metadata (a parameter set) is added to each PCC frame. FIG. 68 is a diagram showing an example of a case where frame combining is performed and metadata (a parameter set) is added on a basis of frames combined.

In the header of data of frames combined, an identifier of metadata of a reference destination is stored, in order to obtain metadata of the frames. As shown in FIG. 68, metadata of a plurality of frames can be brought together. Any parameters common to the plurality of frames combined can be brought together as one parameter. Parameters that are not common to frames indicate values for respective frames.

Information on each frame (a parameter that is not common to frames) is a timestamp that indicates a time point of generation of frame data, a time point of encoding of frame data, or a time point of decoding of frame data, for example. Information on each frame may include information from a sensor that has obtained the frame data (such as sensor speed, sensor acceleration, sensor position information, sensor orientation, or other sensor information).

Figure 69:
FIG. 69 is a diagram showing an example in which part of frames is decoded according to Embodiment 5.

FIG. 69 is a diagram showing an example in which part of the frames is decoded in the example shown in FIG. 67. As shown in FIG. 69, if there is no dependency between frames in the data of the frames combined, the three-dimensional data decoding device can separately decode each piece of data.

When point cloud data has attribute information, the three-dimensional data encoding device can combine attribute information of frames. Attribute information is encoded and decoded by referring to geometry information. The geometry information referred to may be geometry information before frame combining or geometry information after frame combining. The combined frame count for geometry information and the combined frame count for attribute information may be common (the same) or independent (different).

Figure 70:
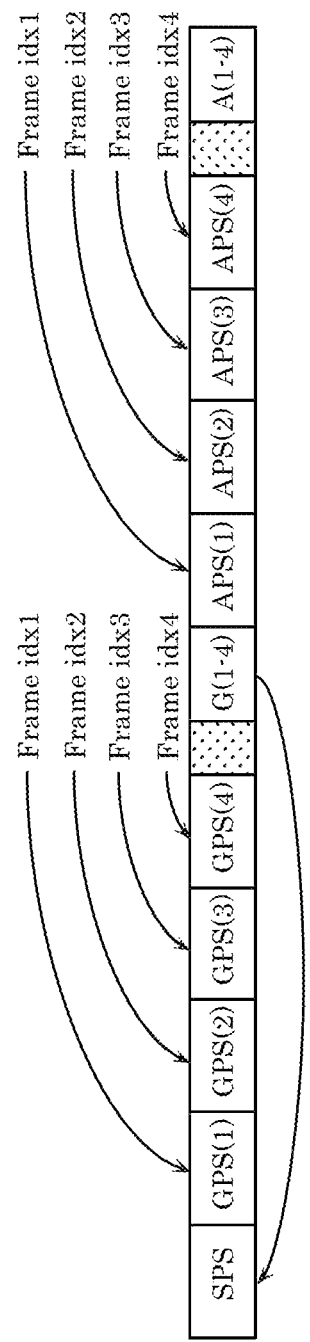
FIG. 70 is a diagram showing an order of transmission and a data reference relationship according to Embodiment 5.
Figure 71:
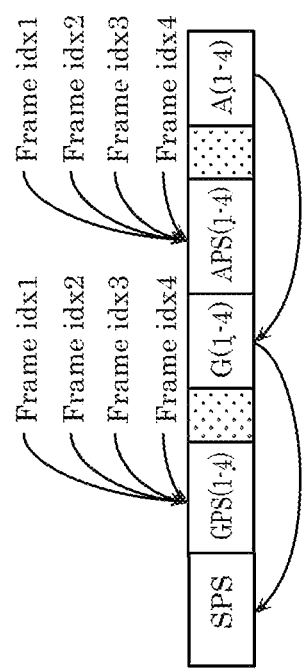
FIG. 71 is a diagram showing an order of transmission and a data reference relationship according to Embodiment 5.

FIGS. 70 to 73 are diagrams showing an order of data transmission and a data reference relationship. FIGS. 70 and 71 show an example in which geometry information of four frames and attribute information of four frames are combined. In FIG. 70, metadata (a parameter set) is added to each PCC frame. In FIG. 71, metadata (a parameter set) is added on a basis of frames combined. In these drawings, A(1) or the like denotes encoded attribute information, APS(1) or the like denotes a parameter set for encoded attribute information, and APS(1) or the like denotes a parameter set for encoded attribute information. A numeral in parentheses indicates a value of a frame index.

Figure 72:
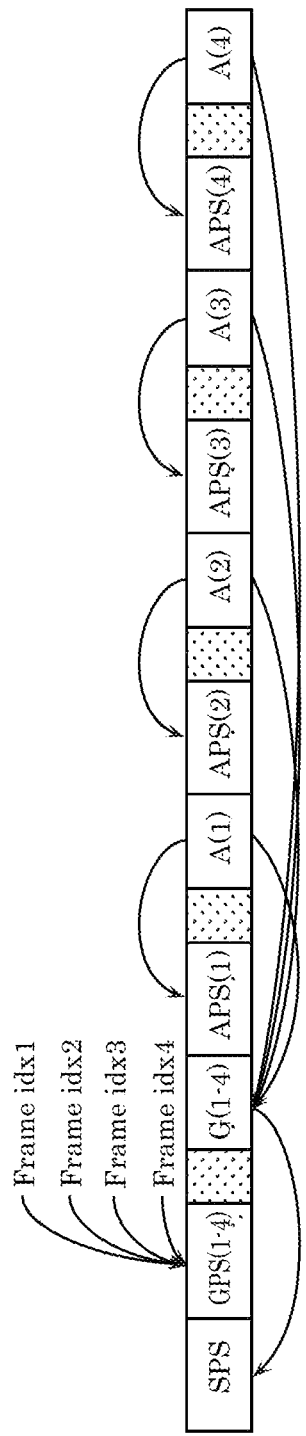
FIG. 72 is a diagram showing an order of transmission and a data reference relationship according to Embodiment 5.

FIG. 72 shows an example in which geometry information of four frames are combined, and attribute information are not combined. As shown in FIG. 72, geometry information of frames may be combined, and attribute information of frames may not be combined.

Figure 73:
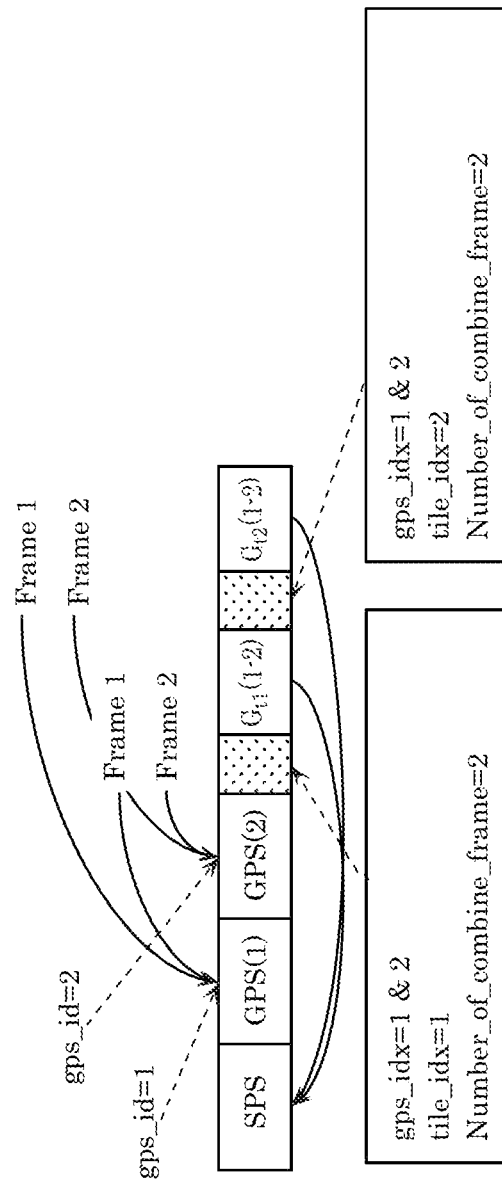
FIG. 73 is a diagram showing an order of transmission and a data reference relationship according to Embodiment 5.

FIG. 73 shows an example in which frame combining and tile division are combined. When tile division is performed as shown in FIG. 73, the header of each piece of tile geometry information includes information such as a GPS index (gps_idx) and a combined frame count (number_of_combine_frame). The header of each piece of tile geometry information also includes a tile index (tile_idx) for identifying a tile.

Figure 74:
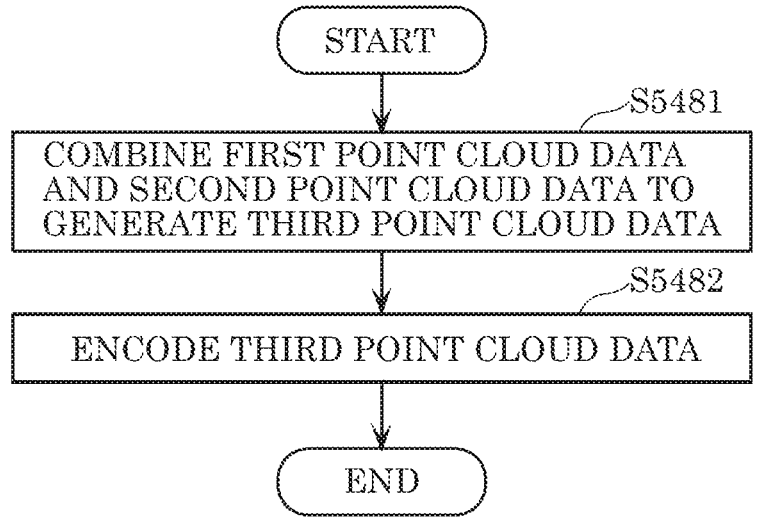
FIG. 74 is a flowchart of an encoding process according to Embodiment 5.

As described above, the three-dimensional data encoding device according to this embodiment performs the process shown in FIG. 74. First, the three-dimensional data encoding device combines first point cloud data and second point cloud data to generate third point cloud data (S5481). The three-dimensional data encoding device then encodes the third point cloud data to generate encoded data (S5482). The encoded data includes identification information (a frame index, for example) that indicates whether each of the plurality of three-dimensional points included in the third point cloud data belongs to the first point cloud data or the second point cloud data.

With such a configuration, the three-dimensional data encoding device collectively encodes a plurality of pieces of point cloud data, so that the coding efficiency can be improved.

For example, the first point cloud data and the second point cloud data are point cloud data (PCC frames, for example) associated with different time points. For example, the first point cloud data and the second point cloud data are point cloud data (PCC frames, for example) on the same object associated with different time points.

The encoded data includes geometry information and attribute information on each of the plurality of three-dimensional points included in the third point cloud data, and the identification information is included in the attribute information.

For example, the encoded data includes geometry information (an occupancy code, for example) that represents the position of each of the plurality of three-dimensional points included in the third point cloud data using an N-ary tree (N represents an integer equal to or greater than 2).

For example, the three-dimensional data encoding device includes a processor and memory, and the processor performs the process described above using the memory.

Figure 75:
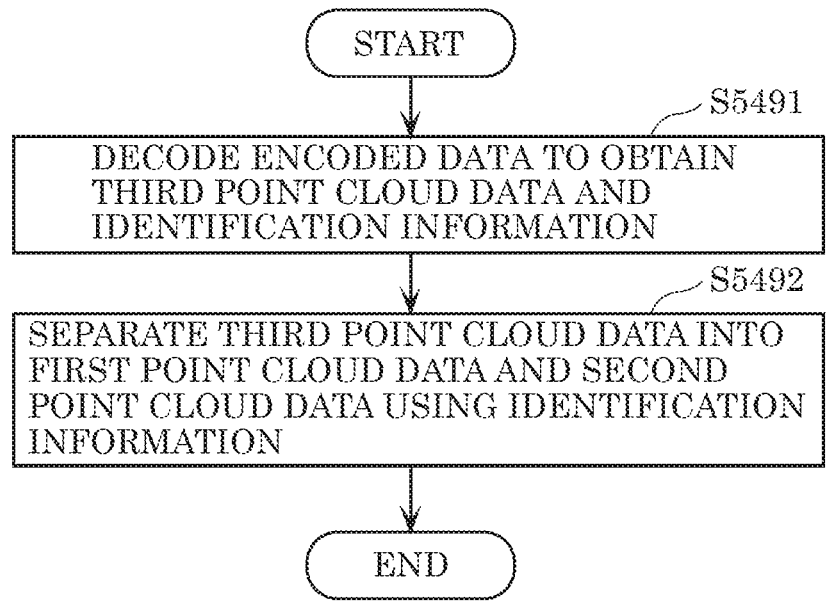
FIG. 75 is a flowchart of a decoding process according to Embodiment 5.

The three-dimensional data decoding device according to this embodiment performs the process shown in FIG. 75. First, the three-dimensional data decoding device decodes encoded data to obtain third point cloud data generated by combining first point cloud data and second point cloud data, and identification information that indicates whether each of a plurality of three-dimensional points included in the third point cloud data belongs to the first point cloud data or the second point cloud data (S5491). The three-dimensional data decoding device then separates the third point cloud data into the first point cloud data and the second point cloud data using the identification information (S5492).

With such a configuration, the three-dimensional data decoding device can decode data encoded with an improved coding efficiency by collectively encoding a plurality of pieces of point cloud data.

For example, the first point cloud data and the second point cloud data are point cloud data (PCC frames, for example) associated with different time points. For example, the first point cloud data and the second point cloud data are point cloud data (PCC frames, for example) on the same object associated with different time points.

The encoded data includes geometry information and attribute information on each of the plurality of three-dimensional points included in the third point cloud data, and the identification information is included in the attribute information.

For example, the encoded data includes geometry information (an occupancy code, for example) that represents the position of each of the plurality of three-dimensional points included in the third point cloud data using an N-ary tree (N represents an integer equal to or greater than 2).

For example, the three-dimensional data decoding device includes a processor and memory, and the processor performs the process described above using the memory.

Embodiment 6

Information on a three-dimensional point cloud includes geometry information (geometry) and attribute information (attribute). The geometry information includes coordinates (x coordinate, y coordinate, and z coordinate) with respect to a point. When encoding the geometry information, the coordinates of each three-dimensional point are not directly encoded, but the position of each three-dimensional point is represented in the form of an octree, and the information on the octree is encoded in order to reduce the code amount.

On the other hand, the attribute information includes color information (such as RGB or YUV) on each three-dimensional point or information that indicates the reflectance of each three-dimensional point and the normal vector of each three-dimensional point, for example. For example, the three-dimensional data encoding device may encode the attribute information in an encoding method different from that for the geometry information.

In this embodiment, a method of encoding attribute information in a case where geometry information is encoded by combining a plurality of pieces of point cloud data of a plurality of frames. Note that this embodiment will be described using an integer value as a value of the attribute information. For example, if each color component of color information RGB or YUV as an 8-bit precision, each color component assumes an integer value from 0 to 255. If the value of the reflectance has a 10-bit precision, the value of the reflectance assumes an integer value from 0 to 1023. Note that, when the bit precision of the attribute information is a decimal precision, the three-dimensional data encoding device may round the value after multiplying the value by a scale value in order that the value of the attribute information is an integer value. Note that the three-dimensional data encoding device may add the scale value to the header of the bitstream or the like.

As a method of encoding attribute information in a case where each piece of geometry information on a three-dimensional point cloud is encoded by combining point cloud data of a plurality of frames, for example, attribute information associated with each piece of geometry information can be encoded by using the combined geometry information. Here, the combined geometry information may include the geometry information on the three-dimensional point cloud and a frame index (frame_index) of a frame to which the three-dimensional point cloud belongs. When encoding attribute information on a first three-dimensional point of the three-dimensional point cloud, not only the geometry information or attribute information on a three-dimensional point cloud included in the frame to which the first three-dimensional point belongs but also the geometry information or attribute information of a three-dimensional point cloud included in a frame different from the frame to which the first three-dimensional point belongs may be used.

Each of a plurality of frames includes point cloud data. Of the plurality of frames, first point cloud data belonging to a first frame and second point cloud data belonging to a second frame are point cloud data associated with different time points. The first point cloud data and the second point cloud data are point cloud data on the same object associated with different time points, for example. The first point cloud data includes a frame index that indicates that a three-dimensional point cloud included in the first point cloud data belongs to the first point cloud data. The second point cloud data includes a frame index that indicates that a three-dimensional point cloud included in the second point cloud data belongs to the second point cloud data. The frame index is identification information that indicates to which point cloud data a three-dimensional point cloud included in a combined point cloud data formed by combining a plurality of pieces of point cloud data belonging to different frames belongs. Note that a three-dimensional point cloud is referred to also as a plurality of three-dimensional points.

As a method of encoding attribute information on a three-dimensional point, a predicted value of attribute information on a three-dimensional point can be calculated, and a difference (prediction residual) between the value of the original attribute information and the predicted value can be encoded. For example, provided that the value of attribute information on a three-dimensional point p is Ap, and the predicted value is Pp, the three-dimensional data encoding device encodes an absolute difference value Diffp=|Ap−Pp|. In this case, if the predicted value Pp can be generated with high precision, the absolute difference value Diffp is small. Therefore, for example, if the absolute difference value Diffp is entropy-encoded using an encoding table in which the number of bits that occur decreases with the value, the code amount can be reduced.

As a method of generating a predicted value of attribute information, attribute information on a reference three-dimensional point, which is another three-dimensional point in the periphery of a target three-dimensional point to be encoded, can be used. That is, the three-dimensional data encoding device can encode attribute information on a first three-dimensional point using attribute information on a peripheral three-dimensional point. Here, the other peripheral three-dimensional point in the periphery of the three-dimensional point to be encoded may exist in the frame to which the target three-dimensional point to be encoded belongs or in a frame different from the frame to which the target three-dimensional point to be encoded belongs. That is, the attribute information on the target three-dimensional point may include a first frame index that indicates that the target three-dimensional point belongs to first point cloud data and a second frame index that indicates that the peripheral three-dimensional point belongs to second point cloud data. In this way, by referring to attribute information on a three-dimensional point in a frame different from the frame to which the three-dimensional point to be encoded belongs, a precise predicted value Pp can be generated, and the coding efficiency can be improved.

Here, the reference three-dimensional point is a three-dimensional point that exists within a predetermined distance from the target three-dimensional point. For example, provided that there are a target three-dimensional point p=(x1, y1, z1) and a three-dimensional point q=(x2, y2, z2), the three-dimensional data encoding device calculates a Euclidean distance d(p, q) between the three-dimensional point p and the three-dimensional point q according to formula H1.

[Math. 1]

$$d(p,q) = \sqrt{(x1-y1)^2 + (x2-y2)^2 + (x3-y3)^2} \quad \text{(formula H1)}$$

If the Euclidean distance d(p, q) is smaller than a predetermined threshold THd, the three-dimensional data encoding device determines that the position of the three-dimensional point q is close to the position of the target three-dimensional point p, and determines to use the value of the attribute information on the three-dimensional point q to generate a predicted value of the attribute information on the target three-dimensional point p. Note that the distance can be calculated in a different manner, and calculation method can be another method, and a Mahalanobis' distance or the like can also be used, for example. The three-dimensional data encoding device may determine not to use a three-dimensional point outside a predetermined distance from the target three-dimensional point for the prediction processing. For example, if there is a three-dimensional point r, and the distance d(p, r) between the target three-dimensional point p and the three-dimensional point r is equal to or greater than the threshold THd, the three-dimensional data encoding device may determine not to use the three-dimensional point r for the prediction. Note that the three-dimensional data encoding device may add information indicating the threshold THd to the header of the bitstream or the like. Note that, when each piece of geometry information on the three-dimensional point cloud is encoded by combining point cloud data of a plurality of frames, the three-dimensional data encoding device may calculate the distances between the three-dimensional points from the combined three-dimensional point cloud. That is, the three-dimensional data encoding device may calculate the distance between two three-dimensional points belonging to different frames or calculate the distance between two three-dimensional points belonging to the same frame.

Figure 76:
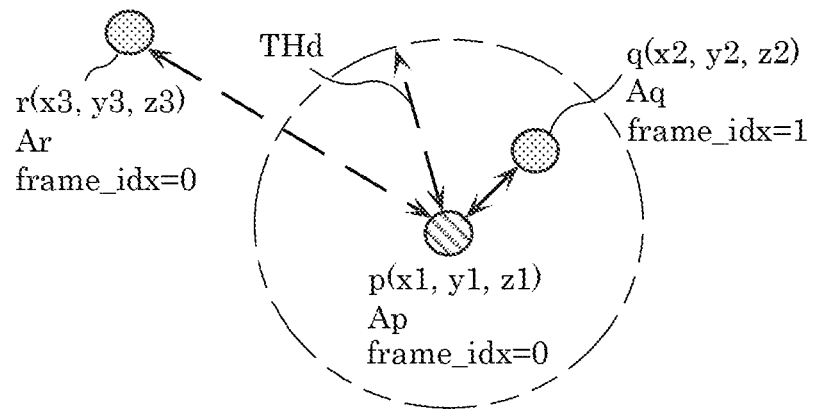
FIG. 76 is a diagram showing an example of three-dimensional points according to Embodiment 6.

FIG. 76 is a diagram showing an example of three-dimensional points. In this example, the distance d(p, q) between the target three-dimensional point p and the three-dimensional point q is smaller than the threshold THd. Therefore, the three-dimensional data encoding device determines that the three-dimensional point q is a reference three-dimensional point for the target three-dimensional point p, and determines to use the value of attribute information Aq on the three-dimensional point q for generation of the predicted value Pp of attribute information Ap on the target three-dimensional point p.

On the other hand, the distance d(p, r) between the target three-dimensional point p and the three-dimensional point r is equal to or greater than the threshold THd. Therefore, the three-dimensional data encoding device determines that the three-dimensional point r is not a reference three-dimensional point for the target three-dimensional point p, and determines not to use the value of attribute information Ar on the three-dimensional point r for generation of the predicted value Pp of the attribute information Ap on the target three-dimensional point p.

Here, the three-dimensional point p belongs to a frame indicated by a frame index 0 (frame_idx=0), the three-dimensional point q belongs to a frame indicated by a frame index 1 (frame_idx=1), and the three-dimensional point r belongs to the frame indicated by the frame index 0 (frame_idx=0). The three-dimensional data encoding device may calculate the distance between the three-dimensional point p and the three-dimensional point r, which are indicated to belong to the same frame by the frame index, or calculate the distance between the three-dimensional point p and the three-dimensional point q, which are indicated to belong to different frames by the frame indices.

When encoding the attribute information on the target three-dimensional point using a predicted value, the three-dimensional data encoding device uses a three-dimensional point whose attribute information has already been encoded and decoded as a reference three-dimensional point. Similarly, when decoding the attribute information on the target three-dimensional point to be decoded using a predicted value, the three-dimensional data decoding device uses a three-dimensional point whose attribute information has already been decoded as a reference three-dimensional point. In this way, the same predicted value can be generated in the encoding and the decoding, so that the bitstream for the three-dimensional point generated in the encoding can be decoded on the decoder side.

Note that, although the other peripheral three-dimensional point in the periphery of the target three-dimensional point to be encoded has been described as existing in the frame to which the target three-dimensional point to be encoded belongs or in a frame different from the frame to which the target three-dimensional point to be encoded belongs, the present invention is not limited thereto. For example, a three-dimensional point that exists in a frame different from the frame to which the target three-dimensional point to be encoded belongs may be determined not to exist in the periphery of the target three-dimensional point to be encoded and not be used for generation of a predicted value. In this way, when the attribute information on the three-dimensional points in a plurality of frames to be combined significantly differ from each other, for example, the three-dimensional data encoding device can encode the geometry information using frame combining, and predictively encode the attribute information using the attribute information on another peripheral three-dimensional point in the same frame, thereby improving the coding efficiency. Note that three-dimensional data encoding device may add, to the header of the encoded data, information that indicates whether to encode the attribute information on the target three-dimensional point using the attribute information on peripheral three-dimensional points in the same frame as that of the target three-dimensional point or to encode the attribute information on the target three-dimensional point using the attribute information on peripheral three-dimensional points in the same frame as that of the target three-dimensional point and a different frame than that of the target three-dimensional point, and determine which encoding manner to use when performing the encoding using frame combining. In this way, when decoding the data encoded using frame combining, the three-dimensional data decoding device can decode the header to determine whether to decode the attribute information on the target three-dimensional point using the attribute information on peripheral three-dimensional points in the same frame or to decode the attribute information on the target three-dimensional point using the attribute information on peripheral three-dimensional point in the same frame as that of the target three-dimensional point and a different frame than that of the target three-dimensional point, can determine which decoding manner to use, and therefore can properly decode the bitstream.

Figure 77:
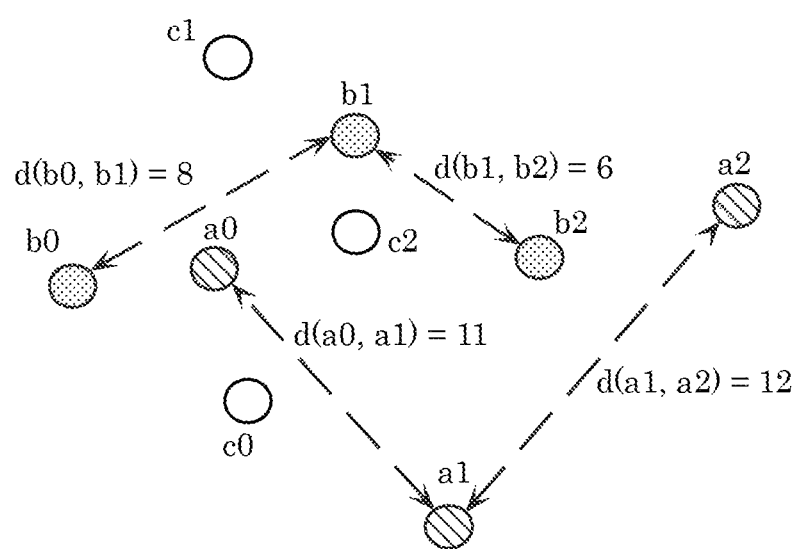
FIG. 77 is a diagram showing an example of setting of LoDs according to Embodiment 6.

When encoding attribute information on three-dimensional points after a plurality of frames are combined, the three-dimensional points belonging to the same frame or different frames can be classified into a plurality of levels using geometry information on the three-dimensional points before the attribute information on the three-dimensional points is encoded. Here, each level in the classification is referred to as a level of detail (LoD). A method of generating LoDs will be described with reference to FIG. 77.

First, the three-dimensional data encoding device selects initial point a0 from a three-dimensional point cloud combined, and assigns initial point a0 to LoD0. The three-dimensional data encoding device then extracts point a1 the distance of which from point a0 is greater than a threshold Thres_LoD[0] of LoD0, and assigns point a1 to LoD0. The three-dimensional data encoding device then extracts point a2 the distance of which from point a1 is greater than the threshold Thres_LoD[0] of LoD0, and assigns point a2 to LoD0. In this way, the three-dimensional data encoding device configures LoD0 in such a manner that the distances between the points in LoD0 are greater than the threshold Thres_LoD[0]. Note that the three-dimensional data encoding device may calculate the distance between two three-dimensional points in the same process regardless of whether the points belong to the same frame or different frames. For example, point a0 and point a1 may belong to the same frame or to different frames. Therefore, the distance between point a0 and point a1 is calculated in the same process, whether the points belong to the same frame or to different frames.

The three-dimensional data encoding device then selects point b0 yet to be assigned to any LoD, and assigns point b0 to LoD1. The three-dimensional data encoding device then extracts point b1 yet to be assigned to any LoD the distance of which from point b0 is greater than a threshold Thres_LoD[1] of LoD1, and assigns point b1 to LoD1. The three-dimensional data encoding device then extracts point b2 yet to be assigned to any LoD the distance of which from point b1 is greater than the threshold Thres_LoD[1] of LoD1, and assigns point b2 to LoD1. In this way, the three-dimensional data encoding device configures LoD1 in such a manner that the distances between the points in LoD1 are greater than the threshold Thres_LoD[1].

The three-dimensional data encoding device then selects point c0 yet to be assigned to any LoD, and assigns point c0 to LoD2. The three-dimensional data encoding device then extracts point c1 yet to be assigned to any LoD the distance of which from point c0 is greater than a threshold Thres_LoD[2] of LoD2, and assigns point c1 to LoD2. The three-dimensional data encoding device then extracts point c2 yet to be assigned to any LoD the distance of which from point c1 is greater than the threshold Thres_LoD[2] of LoD2, and assigns point c2 to LoD2. In this way, the three-dimensional data encoding device configures LoD2 in such a manner that the distances between the points in LoD2 are greater than the threshold Thres_LoD[2]. For example, the threshold Thres_LoD[0] of LoD0, the threshold Thres_LoD[1], and the threshold Thres_LoD[2] are set as shown in FIG. 78.

The three-dimensional data encoding device may add information indicating the threshold of each LoD to the header of the bitstream or the like. For example, in the example shown in FIG. 78, the three-dimensional data encoding device may add the thresholds Thres_LoD[0], Thres_LoD[1], and Thres_LoD[2] to the header.

The three-dimensional data encoding device may assign all the three-dimensional points yet to be assigned to any LoD to the lowest LoD. In this case, since the three-dimensional data encoding device does not add the threshold of the lowest LoD to the header, the three-dimensional data encoding device can reduce the code amount of the header. For example, in the example shown in FIG. 78, the three-dimensional data encoding device adds the thresholds Thres_LoD[0] and Thres_LoD[1] to the header but does not add the threshold Thres_LoD[2] to the header. In this case, the three-dimensional data decoding device can estimate the value of Thres_LoD[2] to be 0. The three-dimensional data encoding device may add the number of LoDs to the header. In this case, the three-dimensional data decoding device determines the lowest LoD from the number of LoDs.

Figure 78:
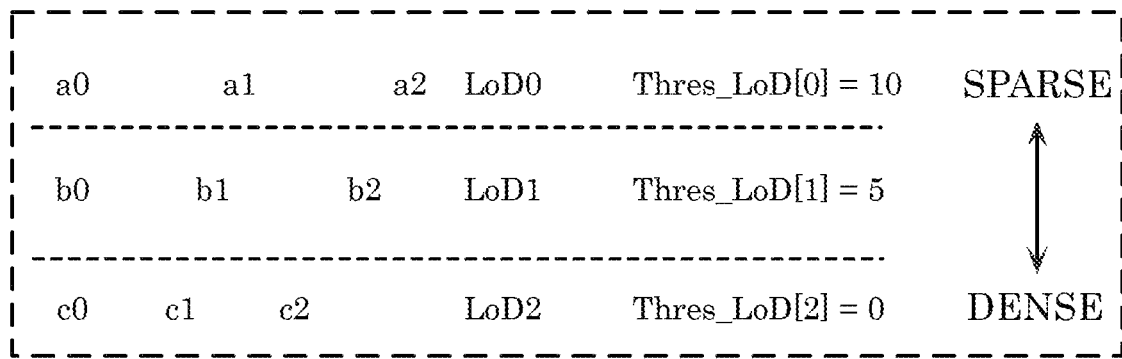
FIG. 78 is a diagram showing an example of thresholds used for setting of LoDs according to Embodiment 6.

If the thresholds of the LoDs are set in such a manner that the higher the level, the greater the threshold is as shown in FIG. 78, higher levels (levels closer to LoD0) include sparser point clouds (sparse) in which the three-dimensional points are at greater distances, and lower levels include denser point clouds (dense) in which the three-dimensional points are at smaller distances. In the example shown in FIG. 78, LoD0 is the lowest level.

The method of selecting the initial three-dimensional point for setting each LoD can depend on the order of encoding in the encoding of geometry information. For example, the three-dimensional data encoding device may select the three-dimensional point that has been encoded first in the encoding of the geometry information as initial point a0 of LoD0, and selects points a1 and a2 with respect to initial point a0 to form LoD0. The three-dimensional data encoding device may then select, as initial point b0 of LoD1, the three-dimensional point the geometry information on which has been encoded first in the three-dimensional points that do not belong to LoD0. That is, as initial point n0 of LoDn, the three-dimensional data encoding device can select the three-dimensional point the geometry information on which has been encoded first in the three-dimensional points that do not belong to the levels (LoD0 to LoDn−1) higher than LoDn. In this case, if the three-dimensional data decoding device uses a similar initial point selection method in the decoding, the three-dimensional data decoding device can construct the same LoDs as those constructed in the encoding, and therefore can properly decode the bitstream. Specifically, the three-dimensional data decoding device selects, as initial point n0 of LoDn, the three-dimensional point the geometry information on which has been encoded first in the three-dimensional points that do not belong to the levels higher than LoDn.

In the following, a method of generating a predicted value of attribute information of a three-dimensional point using information on LoDs will be described. For example, when starting the encoding from the three-dimensional points included in LoD0, the three-dimensional data encoding device generates a target three-dimensional point included in LoD1 using encoded and then decoded (also referred to simply as "encoded" hereinafter) attribute information included in LoD0 and LoD1. That is, the three-dimensional data encoding device generates a predicted value of attribute information on a three-dimensional point included in LoDn using encoded attribute information included in LoDn' (n'<=n). That is, the three-dimensional data encoding device does not use the attribute information on the three-dimensional points included in the levels lower than LoDn for calculating a predicted value of attribute information on a three-dimensional point included in LoDn.

For example, the three-dimensional data encoding device generates a predicted value of attribute information on a three-dimensional point by calculating an average of attribute values of N or less three-dimensional points of the encoded three-dimensional points in the periphery of the target three-dimensional point to be encoded. The three-dimensional data encoding device may add the value of N to the header of the bitstream or the like. Note that the three-dimensional data encoding device may set a different value of N for each three-dimensional point and add the value of N for each three-dimensional point. In that case, since an appropriate value of N can be selected for each three-dimensional point, the precision of the predicted value can be improved. Therefore, the prediction residual can be reduced. The three-dimensional data encoding device may add a value of N to the header of the bitstream and fix the value of N in the bitstream. In that case, the value of N does not need to be encoded or decoded for each three-dimensional point, so that the processing amount can be reduced. The three-dimensional data encoding device may separately encode the value of N for each LoD. In that case, since an appropriate value of N is selected for each LoD, the coding efficiency can be improved.

Alternatively, the three-dimensional data encoding device may calculate a predicted value of attribute information on a three-dimensional point as a weighted average value of attribute information on N encoded three-dimensional points in the periphery. For example, the three-dimensional data encoding device calculates a weight using distance information on the distance between the target three-dimensional point and each of the N three-dimensional points in the periphery.

When separately encoding the value of N for each LoD, for example, the three-dimensional data encoding device sets the value of N to be greater in higher LoDs and to be smaller in lower LoDs. In a higher LoD, the distances between the three-dimensional points belonging to the LoD are greater, so that the prediction precision may be able to be improved by setting the value of N to be greater and selecting and averaging a plurality of peripheral three-dimensional points. In a lower LoD, the distances between the three-dimensional points belonging to the LoD are smaller, so that the prediction can be efficiently performed while reducing the processing amount of the averaging by setting the value of N is set to be smaller.

Figure 79:
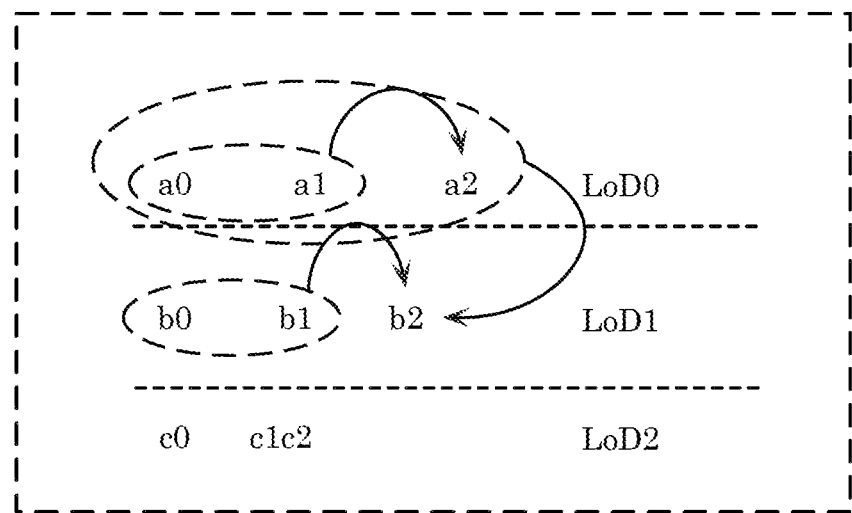
FIG. 79 is a diagram showing an example of attribute information used for generation of a predicted value according to Embodiment 6.

FIG. 79 is a diagram showing an example of attribute information used for generation of a predicted value. As described above, a predicted value of point P included in LoDN is generated using encoded peripheral point P' included in LoDN' (N'<=N). Here, peripheral point P' is selected based on the distance from point P. For example, a predicted value of attribute information on point b2 shown in FIG. 79 is generated using attribute information on points a0, a1, a2, b0, and b1.

The peripheral points selected vary with the value of N described above. For example, in a case where N=5, points a0, a1, a2, b0, and b1 are selected as peripheral points of point b2. In a case where N=4, points a0, a1, a2, and b1 are selected based on the distance information.

The predicted value is calculated by distance-dependent weighted averaging. For example, in the example shown in FIG. 79, predicted value a2p of point a2 is calculated by weighted averaging of attribute information on points a0 and a1 as shown by formulas H2 and H3. Note that $A_i$ denotes a value of attribute information on point ai.

[Math. 2]

$$a2p = \sum_{i=0}^{1} w_i \times A_i \quad \text{(formula H2)}$$

$$w_i = \frac{\frac{1}{d(a2, ai)}}{\sum_{j=0}^{1} \frac{1}{d(a2, aj)}} \quad \text{(formula H3)}$$

Predicted value b2p of point b2 is calculated by weighted averaging of attribute information on points a0, a1, a2, b0, and b1 as shown by formulas H4 to H6. Note that $B_i$ denotes a value of attribute information on point bi.

[Math. 3]

$$b2p = \sum_{i=0}^{2} wa_i \times A_i + \sum_{i=0}^{1} wb_i \times B_i \quad \text{(formula H4)}$$

$$wa_i = \frac{\frac{1}{d(b2, ai)}}{\sum_{j=0}^{2} \frac{1}{d(b2, aj)} + \sum_{j=0}^{1} \frac{1}{d(b2, bj)}} \quad \text{(formula H5)}$$

$$wb_i = \frac{\frac{1}{d(b2, bi)}}{\sum_{j=0}^{2} \frac{1}{d(b2, aj)} + \sum_{j=0}^{1} \frac{1}{d(b2, bj)}} \quad \text{(formula H6)}$$

The three-dimensional data encoding device may calculate a difference value (prediction residual) between the value of attribute information on a three-dimensional point and a predicted value generated from a peripheral point, and quantize the calculated prediction residual. For example, the three-dimensional data encoding device performs quantization by dividing the prediction residual by a quantization scale (referred to also as a quantization step). In this case, the smaller the quantization scale, the smaller the error (quantization error) that can be caused by the quantization is. To the contrary, the greater the quantization scale, the greater the quantization error is.

Note that the three-dimensional data encoding device can use a different quantization scale for each LoD. For example, the three-dimensional data encoding device sets the quantization scale to be smaller in higher levels and greater in lower levels. The value of attribute information on a three-dimensional point belonging to a higher level can be used as a predicted value of the attribute information on a three-dimensional point belonging to a lower level, so that by setting the quantization scale to be smaller in the higher level, the quantization error that can occur in the higher level can be reduced to increase the precision of the predicted value, thereby improving the coding efficiency. Note that the three-dimensional data encoding device may add the quantization scale used for each LoD to the header or the like. In that case, the three-dimensional data decoding device can correctly decode the quantization scale and therefore can properly decode the bitstream.

The three-dimensional data encoding device may convert a signed integer value (signed quantized value), which is a quantized prediction residual, into an unsigned integer value (unsigned quantized value). In that case, when entropy-encoding the prediction residual, occurrence of a negative integer does not need to be considered. Note that the three-dimensional data encoding device does not have to convert a signed integer value into an unsigned integer value, and may separately entropy-encode a sign bit, for example.

The prediction residual is calculated by subtracting the predicted value from the original value. For example, prediction residual a2r of point a2 is calculated by subtracting predicted value a2p of point a2 from value $A_2$ of the attribute information on point a2 as shown by formula H7. Prediction residual b2r of point b2 is calculated by subtracting predicted value b2p of point b2 from value $B_2$ of the attribute information on point b2 as shown by formula H8.

$$a2r = A_2 - a2p \quad \text{(formula H7)}$$

$$b2r = B_2 - b2p \quad \text{(formula H8)}$$

The prediction residual is quantized by division by the quantization step (QS). For example, quantized value a2q of point a2 is calculated according to formula H9. Quantized value b2q of point b2 is calculated according to formula H10. Here, QS_LoD0 denotes QS for LoD0, and QS_LoD1 denotes QS for LoD1. That is, a different QS can be used for each LoD.

$$a2q = a2r/QS\_LoD0 \quad \text{(formula H9)}$$

$$b2q = b2r/QS\_LoD1 \quad \text{(formula H10)}$$

The three-dimensional data encoding device converts the signed integer value described above, which is a quantized value, into an unsigned integer value as described below. When signed integer value a2q is smaller than 0, the three-dimensional data encoding device sets unsigned integer value a2u at −1−(2×a2q). When signed integer value a2q is equal to or greater than 0, the three-dimensional data encoding device sets unsigned integer value a2u at 2×a2q.

Similarly, when signed integer value b2q is smaller than 0, the three-dimensional data encoding device sets unsigned integer value b2u at −1−(2×b2q). When signed integer value b2q is equal to or greater than 0, the three-dimensional data encoding device sets unsigned integer value b2u at 2×b2q.

The three-dimensional data encoding device may encode the quantized prediction residual (unsigned integer value) by entropy encoding. For example, the unsigned integer value may be binarized, and then a binary arithmetic encoding may be applied.

Note that, in that case, the three-dimensional data encoding device can use a different binarization method depending on the value of the prediction residual. For example, when prediction residual pu is smaller than threshold R_TH, the three-dimensional data encoding device binarizes prediction residual pu with a fixed number of bits required for representing threshold R_TH. When prediction residual pu is equal to or greater than threshold R_TH, the three-dimensional data encoding device binarizes binarized data of threshold R_TH and the value of (pu−R_TH) using exponential Golomb coding or the like.

For example, when threshold R_TH is 63, and prediction residual pu is smaller than 63, the three-dimensional data encoding device binarizes prediction residual pu with 6 bits. When prediction residual pu is equal to or greater than 63, the three-dimensional data encoding device performs arithmetic encoding by binarizing binary data (111111) of threshold R_TH and the value of (pu−63) using exponential Golomb coding.

In a more specific example, when prediction residual pu is 32, the three-dimensional data encoding device generates 6-bit binary data (100000) and arithmetically encodes the bit sequence. When prediction residual pu is 66, the three-dimensional data encoding device generates binary data (11111) of threshold R_TH and a bit sequence (00100) that represents a value of 3 (66−63) with an exponential Golomb code, and arithmetically encodes the bit sequence (111111+00100).

As described above, by using a different binarization method depending on the magnitude of the prediction residual, the three-dimensional data encoding device can perform the encoding while reducing an abrupt increase of the number of binary bits when the prediction residual increases. Note that the three-dimensional data encoding device may add threshold R_TH to the header of the bitstream or the like.

For example, when the encoding is performed at a high bit rate, that is, when the quantization scale is low, there is a possibility that the quantization error is small, and the prediction precision is high, and as a result, the prediction residual is not large. In this case, the three-dimensional data encoding device sets threshold R_TH to be high. In this case, the possibility of encoding binary data of threshold R_TH is low, and the coding efficiency is improved. To the contrary, when the encoding is performed at a low bit rate, that is, when the quantization scale is high, there is a possibility that the quantization error is large, and the prediction precision is low, and as a result, the prediction residual is large. In this case, the three-dimensional data encoding device sets threshold R_TH to be low. In this case, an abrupt increase of the bit length of the binary data can be prevented.

The three-dimensional data encoding device may use a different threshold R_TH for each LoD, and add threshold R_TH for each LoD to the header or the like. That is, the three-dimensional data encoding device may use a different binarization method for each LoD. For example, in higher levels, the distances between the three-dimensional points are greater, so that the prediction precision can be lower, and as a result, the prediction residual can be larger. The three-dimensional data encoding device prevents an abrupt increase of the bit length of the binarized data by setting threshold R_TH to be lower for higher levels. In lower levels, the distances between the three-dimensional points are smaller, so that the prediction precision can be higher, and as a result, the prediction residual can be smaller. The three-dimensional data encoding device improves the coding efficiency by setting threshold R_TH to be higher for lower levels.

FIG. 80 is a diagram showing an example of exponential Golomb coding and shows a relationship between values yet to be binarized (multiple values) and bits binarized (codes). "0" and "1" in FIG. 80 may be inverted.

The three-dimensional data encoding device applies an arithmetic encoding to the binarized data of the prediction residual. In this way, the coding efficiency can be improved. When applying an arithmetic encoding, the tendency of the probability of occurrence of 0 and 1 for each bit can differ between an n-bit code, which is a part of the binarized data that has been binarized with n bits, and a remaining code, which is a part of the binarized data that has been binarized using the exponential Golomb coding. Therefore, the three-dimensional data encoding device may apply the arithmetic encoding in different manners for the n-bit code and the remaining code.

For example, the three-dimensional data encoding device performs arithmetic encoding of the n-bit code using a different encoding table (probability table) for each bit. In this process, the three-dimensional data encoding device may use a different number of encoding tables for each bit. For example, the three-dimensional data encoding device performs arithmetic encoding of leading bit b0 of an n-bit code using one encoding table. The three-dimensional data encoding device uses two encoding tables for next bit b1. The three-dimensional data encoding device uses a different encoding table for the arithmetic encoding of bit b1 depending on the value of b0 (0 or 1). Similarly, the three-dimensional data encoding device uses four encoding tables for next bit b2. The three-dimensional data encoding device uses a different encoding table for the arithmetic encoding of bit b2 depending on the values of b0 to b1 (0 to 3).

As described above, the three-dimensional data encoding device uses $2^{n-1}$ encoding tables when arithmetically encoding each bit bn−1 of an n-bit code. The three-dimensional data encoding device uses a different encoding table depending on the value (occurrence pattern) of the bits preceding bit bn−1. In this way, the three-dimensional data encoding device can use an appropriate encoding table for each bit, so that the coding efficiency can be improved.

Note that the three-dimensional data encoding device may reduce the number of encoding tables used for each bit. For example, when arithmetically encoding each bit bn−1, the three-dimensional data encoding device may switch among $2^m$ encoding tables depending on the value (occurrence pattern) of m bits preceding bit bn−1(m≤n−1). In this way, the coding efficiency can be improved while reducing the number of encoding tables used for each bit. Note that the three-dimensional data encoding device may update the occurrence probability of 0 and 1 in each encoding table based on the value of binarized data that has actually occurred. The three-dimensional data encoding device may also fix the occurrence probability of 0 and 1 in encoding tables for some bits. In that case, the number of updates of the occurrence probability can be reduced, so that the processing amount can be reduced.

For example, in a case where the n-bit code is b0b1b2 . . . bn−1, the number of the encoding tables for b0 is 1 (CTb0). The number of the encoding tables for b1 is 2 (CTb10, CTb11). The encoding table to be used is changed depending on the value of b0 (0 to 1). The number of the encoding tables for b2 is 4 (CTb20, CTb21, CTb22, CTb23). The encoding table to be used is changed depending on the values of b0 and b1 (0 to 3). The number of the encoding tables for bn−1 is $2^{n-1}$ (CTbn0, CTbn1, . . . , CTbn($2^{n-1}$−1)). The encoding table to be used is changed depending on the value of b0b1 . . . bn−2 (0 to $2^{n-1}$−1).

Note that the three-dimensional data encoding device may apply an m-ary arithmetic coding (m=$2^n$) that sets a value from 0 to $2^n$−1 to the n-bit code without binarizing the n-bit code. When the three-dimensional data encoding device performs the m-ary arithmetic encoding of the n-bit code, the three-dimensional data decoding device can decode the n-bit code by using the m-ary arithmetic decoding.

FIG. 81 is a diagram for describing a process in a case where the remaining code is an exponential Golomb code. The remaining code, which is a part binarized with exponential Golomb coding, includes a prefix part and a suffix part as shown in FIG. 81. For example, the three-dimensional data encoding device uses different encoding tables for the prefix part and the suffix part. That is, the three-dimensional data encoding device arithmetically encodes each bit included in the prefix part using an encoding table for prefix, and arithmetically encodes each bit included in the suffix part using an encoding table for suffix.

Note that the three-dimensional data encoding device may update the occurrence probability of 0 and 1 in each encoding table based on the value of binarized data that has actually occurred. Alternatively, the three-dimensional data encoding device may fix the occurrence probability of 0 and 1 in either encoding table. In this way, the number of updates of the occurrence probability can be reduced, and therefore the processing amount can be reduced. For example, the three-dimensional data encoding device may update the occurrence probability for the prefix part but fix the occurrence probability for the suffix part.

Furthermore, the three-dimensional data encoding device decodes the quantized prediction residual by inverse quantization and reconstruction, and uses the decode value, which is the decoded prediction residual, for prediction of three-dimensional points following the three-dimensional point to be encoded. Specifically, the three-dimensional data encoding device calculates an inverse-quantized value by multiplying the quantized prediction residual (quantized value) by the quantization scale, and obtains a decoded value (reconstructed value) by adding the inverse-quantized value and the predicted value.

For example, inverse-quantized value a2iq of point a2 is calculated using quantized value a2q of point a2 according to formula H11. Inverse-quantized value b2iq of point b2 is calculated using quantized value b2q of point b2 according to formula H12. Here, QS_LoD0 is QS for LoD0, and QS_LoD1 is QS for LoD1. That is, a different QS can be used for each LoD.

$$a2iq=a2q\times QS\_LoD0 \qquad \text{(formula H11)}$$

$$b2iq=b2q\times QS\_LoD1 \qquad \text{(formula H12)}$$

For example, decoded value a2rec of point a2 is calculated by adding predicted value a2p of point a2 to inverse-quantized value a2iq of point a2 as shown by formula H13. Decoded value b2rec of point b2 is calculated by adding predicted value b2p of point b2 to inverse-quantized value b2iq of point b2 as shown by formula H14.

$$a2rec=a2iq+a2p \qquad \text{(formula H13)}$$

$$b2rec=b2iq+b2p \qquad \text{(formula H14)}$$

In the following, a syntax example of the bitstream according to this embodiment will be described. FIG. 82 is a diagram showing a syntax example of an attribute header (attribute_header) according to this embodiment. The attribute header is header information of attribute information. As shown in FIG. 82, the attribute header includes number-of-levels information (NumLoD), number-of-three-dimensional-points information (NumOfPoint[i]), a level threshold (Thres_Lod[i]), number-of-peripheral-points information (NumNeighborPoint[i]), a prediction threshold (THd[i]), a quantization scale (QS[i]), and a binarization threshold (R_TH[i]).

The number-of-levels information (NumLoD) indicates the number of LoDs used.

The number-of-three-dimensional-points information (NumOfPoint[i]) indicates the number of the three-dimensional points that belong to level i. Note that the three-dimensional data encoding device may add total-number-of-three-dimensional-points information (AllNumOfPoint) that indicates the total number of three-dimensional points to another header. In that case, the three-dimensional data encoding device does not need to add NumOfPoint[NumLoD−1] that indicates the number of the three-dimensional points that belong to the lowest level to the header. In that case, the three-dimensional data decoding device can calculate NumOfPoint[NumLoD−1] according to formula H15. In this way, the code amount of the header can be reduced.

[Math. 4]

$$NumOfPoint[NumLoD-1] = \\ AllNumOfPoint - \sum_{j=0}^{NumLoD-2} NumOfPoint[j] \quad \text{(formula H15)}$$

The level threshold (Thres_Lod[i]) is a threshold used for setting level i. The three-dimensional data encoding device and the three-dimensional data decoding device configure LoDi in such a manner that the distances between the points in the LoDi are greater than threshold Thres_Lod[i]. The three-dimensional data encoding device may not add the value of Thres_Lod[NumLoD−1] (the lowest level) to the header. In that case, the three-dimensional data decoding device estimates the value of Thres_Lod[NumLoD−1] to be 0. In this way, the code amount of the header can be reduced.

The number-of-peripheral-points information (NumNeighborPoint[i]) indicates an upper limit value of the number of the peripheral points used for generation of the predicted value for a three-dimensional point belonging to level i. When the number M of peripheral points is smaller than NumNeighborPoint[i] (M<NumNeighborPoint[i]), the three-dimensional data encoding device may calculate the predicted value using M peripheral points. When the value of NumNeighborPoint[i] does not have to be different between LoDs, the three-dimensional data encoding device may add one piece of number-of-peripheral-points information (NumNeighborPoint) used for all the LoDs to the header.

The prediction threshold (THd[i]) indicates an upper limit value of the distances between the target three-dimensional point to be encoded or decoded and the peripheral three-dimensional points used for prediction of the target three-dimensional point in level i. The three-dimensional data encoding device and the three-dimensional data decoding device do not use for prediction any three-dimensional point the distance of which from the target three-dimensional point is greater than THd[i]. Note that, when the value of THd[i] does not have to be different between LoDs, the three-dimensional data encoding device may add one prediction threshold (THd) used for all the LoDs to the header.

The quantization scale (QS[i]) indicates a quantization scale used for quantization and inverse quantization for level i.

The binarization threshold (R_TH[i]) is a threshold for switching the method of binarizing the prediction residual of a three-dimensional point belonging to level i. For example, the three-dimensional data encoding device binarizes prediction residual pu with a fixed number of bits when the prediction residual is smaller than threshold R_TH, and binarizes binarized data of threshold R_TH and the value of (pu−R_TH) with the exponential Golomb coding, when the prediction residual is equal to or larger than threshold R_TH. Note that, when the value of R_TH[i] does not have to be different between LoDs, the three-dimensional data encoding device may add one binarization threshold (R_TH) used for all the LoDs to the header.

Note that R_TH[i] may be the maximum value that can be represented with n bits. For example, R_TH is 63 in a case of 6 bits, and is 255 in a case of 8 bits. The three-dimensional data encoding device may encode the number of bits as the binarization threshold, instead of encoding the maximum value that can be represented with n bits. For example, the three-dimensional data encoding device may add the value of 6 to the header in a case where R_TH[i]=63, and add the value of 8 to the header in a case where R_TH[i]=255. The three-dimensional data encoding device may also define a minimum value (minimum number of bits) of the number of bits that represents R_TH[i], and add a relative number of bits with respect to the minimum value to the header. For example, the three-dimensional data encoding device may add the value of 0 to the header in a case where R_TH[i]=63 and the minimum number of bits is 6, and add the value of 2 to the header in a case where R_TH[i]=255 and the minimum number of bits is 6.

The three-dimensional data encoding device may entropy-encode at least one of NumLoD, Thres_Lod[i], NumNeighborPoint[i], THd[i], QS[i], and R_TH[i] and add the resulting code to the header. For example, the three-dimensional data encoding device may binarize and arithmetically encode each value. Furthermore, the three-dimensional data encoding device may encode each value with a fixed length in order to reduce the processing amount.

Furthermore, the three-dimensional data encoding device may not add at least one of NumLoD, Thres_Lod[i], NumNeighborPoint[i], THd[i] QS[i], and R_TH[i] to the header. For example, at least one of these values may be defined by profile, level or the like of a standard or the like. In this way, the bit amount of the header can be reduced.

FIG. 83 is a diagram showing a syntax example of attribute data (attribute_data) according to this embodiment. The attribute data includes encoded data of attribute information on a plurality of three-dimensional points. As shown in FIG. 83, the attribute data includes an n-bit code and a remaining code.

The n-bit code is encoded data of a prediction residual of a value of attribute information or a part thereof. The bit length of the n-bit code depends on the value of R_TH[i]. For example, the n-bit code is a 6-bit code in a case where the value indicated by R_TH[i] is 63, and the n-bit code is an 8-bit code in a case where the value indicated by R_TH[i] is 255.

The remaining code is a part of encoded data of a prediction residual of a value of attribute information that is encoded by exponential Golomb coding. The remaining code is encoded or decoded when the n-bit code is the same as R_TH[i]. The three-dimensional data decoding device decodes the prediction residual by summing the value of the n-bit code and the value of the remaining code. Note that, if the n-bit code is not the same as the value of R_TH[i], the remaining code does not have to be encoded or decoded.

Figure 84:
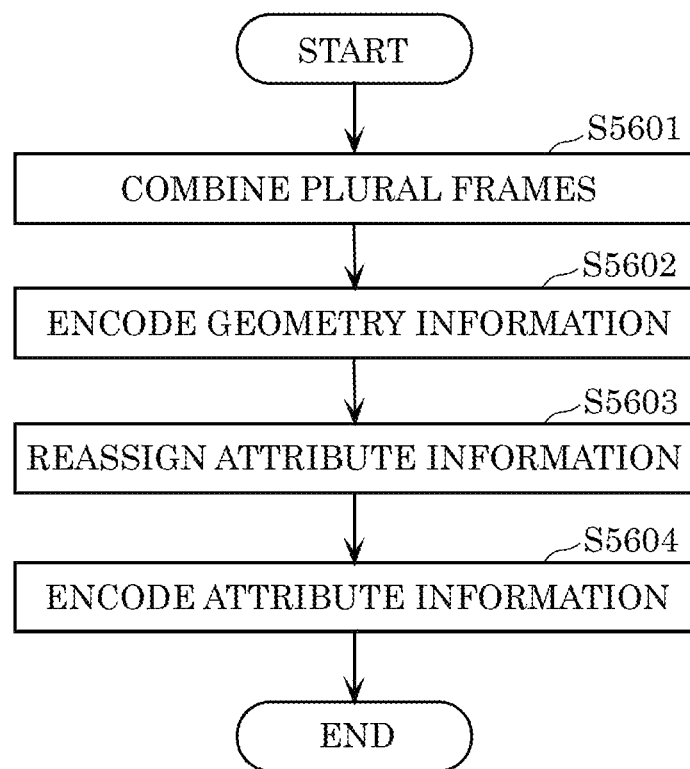
FIG. 84 is a flowchart of a three-dimensional data encoding process according to Embodiment 6.

In the following, a flow of a process performed by the three-dimensional data encoding device will be described. FIG. 84 is a flowchart of a three-dimensional data encoding process performed by the three-dimensional data encoding device.

First, the three-dimensional data encoding device combines a plurality of frames (S5601). For example, the three-dimensional data encoding device combines a plurality of three-dimensional point clouds belonging to a plurality of input frames into one three-dimensional point cloud. Note that, in the combining, the three-dimensional data encoding device adds, to each three-dimensional point cloud, a frame index that indicates a frame to which the three-dimensional point cloud belongs.

The three-dimensional data encoding device then encodes geometry information (geometry) on the combined frame (S5602). For example, the three-dimensional data encoding device performs the encoding using an octree representation.

After the encoding of the geometry information, if the position of a three-dimensional point is changed because of quantization or the like, the three-dimensional data encoding device reassigns the attribute information on the original three-dimensional point to the three-dimensional point changed in position (S5603). For example, the three-dimensional data encoding device performs the reassignment by interpolation of values of the attribute information according to the amount of change in position. For example, the three-dimensional data encoding device detects N three-dimensional points yet to be changed in position close to the three-dimensional position of the three-dimensional point changed in position, and takes a weighted average of the values of the attribute information on the N three-dimensional points. For example, in taking the weighted average, the three-dimensional data encoding device determines the weight based on the distance between the three-dimensional position of the three-dimensional point changed in position and each of the N three-dimensional points. The three-dimensional data encoding device determines the value obtained by the weighted averaging as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the reassigned attribute information (Attribute) (S5604). Here, for each of a plurality of three-dimensional points, the three-dimensional data encoding device encodes the frame index of the three-dimensional point as attribute information on the three-dimensional point. When the three-dimensional data encoding device encodes a plurality of kinds of attribute information, for example, the three-dimensional data encoding device may sequentially encode the plurality of kinds of attribute information. For example, when the three-dimensional data encoding device encodes color, reflectance, and frame index as attribute information, the three-dimensional data encoding device may generate a bitstream including the result of encoding of color followed by the result of encoding of reflectance followed by the result of encoding of frame index. Note that the order of a plurality of results of encoding of attribute information included in a bitstream is not limited to this order but can be any order. The three-dimensional data encoding device encodes frame index as attribute information in the same data format as the attribute information other than frame index, such as color and reflectance. Therefore, the encoded data includes frame index in the same data format as the attribute information other than frame index.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of kinds of attribute information in parallel, and integrate the results of the encoding into one bitstream. In this way, the three-dimensional data encoding device can encode a plurality of kinds of attribute information at a high speed.

Figure 85:
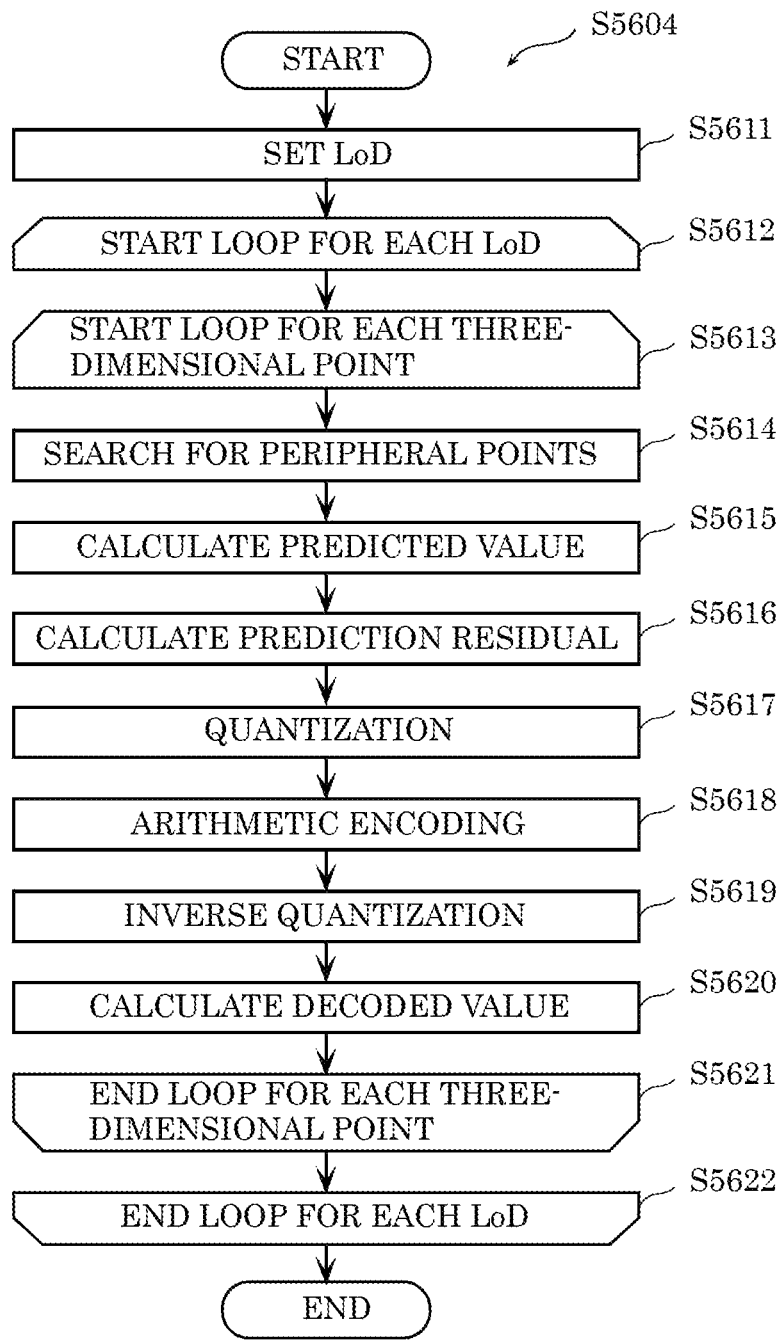
FIG. 85 is a flowchart of an attribute information encoding process according to Embodiment 6.

FIG. 85 is a flowchart of the attribute information encoding process (S5604). First, the three-dimensional data encoding device sets an LoD (S5611). That is, the three-dimensional data encoding device assigns each three-dimensional point to any of a plurality of LoDs.

The three-dimensional data encoding device then starts a loop on an LoD basis (S5612). That is, the three-dimensional data encoding device repeatedly performs the process from step S6613 to step S5621 for each LoD.

The three-dimensional data encoding device then starts a loop on a basis of a three-dimensional point (S5613). That is, the three-dimensional data encoding device repeatedly performs the process from step S5614 to step S5620 for each three-dimensional point.

First, the three-dimensional data encoding device searches for a plurality of peripheral points, which are three-dimensional points present in the periphery of the target three-dimensional point, that are to be used for calculation of a predicted value of the target three-dimensional point to be processed (S5614). The three-dimensional data encoding device then calculates weighted average of values of the attribute information on the plurality of peripheral points, and sets the obtained value as predicted value P (S5615). The three-dimensional data encoding device then calculates a prediction residual, which is the difference between the attribute information and the predicted value of the target three-dimensional point (S5616). The three-dimensional data encoding device then calculates a quantized value by quantizing the prediction residual (S5617). The three-dimensional data encoding device then arithmetically encodes the quantized value (S5618).

The three-dimensional data encoding device then calculates an inverse-quantized value by inverse-quantizing the quantized value (S5619). The three-dimensional data encoding device then generates a decoded value by adding the predicted value to the inverse-quantized value (S5620). The three-dimensional data encoding device then ends the loop on a basis of a three-dimensional point (S5621). The three-dimensional data encoding device also ends the loop on a LoD basis (S5622).

In the following, a three-dimensional data decoding process performed by the three-dimensional data decoding device for decoding a bitstream generated by the three-dimensional data encoding device described above will be described.

The three-dimensional data decoding device generates decoded binarized data by arithmetically decoding binarized data of attribute information in a bitstream generated by the three-dimensional data encoding device in a manner similar to that used in the three-dimensional data encoding device. Note that, if the arithmetic encoding is applied to the part (n-bit code) binarized with n bits and the part (remaining code) binarized by the exponential Golomb coding in different manners in the three-dimensional data encoding device, the three-dimensional data decoding device also performs the arithmetic decoding in the corresponding manners.

For example, the three-dimensional data decoding device performs the arithmetic decoding of the n-bit code using a different encoding table (decoding table) for each bit. In this process, the three-dimensional data decoding device may change the number of encoding tables used for each bit. For example, leading bit b0 of the n-bit code is arithmetically decoded using one encoding table. The three-dimensional data decoding device uses two encoding tables for next bit b1. Furthermore, the three-dimensional data decoding device changes the encoding table to be used for the arithmetic decoding of bit b1 depending on the value of b0 (0 or 1). Similarly, the three-dimensional data decoding device uses four encoding tables for next bit b2. The three-dimensional data decoding device also changes the encoding table to be used for the arithmetic decoding of bit b2 depending on the values of b0 and b1 (0 to 3).

As described above, when arithmetically decoding each bit bn−1 of the n-bit code, the three-dimensional data decoding device uses $2^{n-1}$ encoding tables. In addition, the three-dimensional data decoding device changes the encoding table to be used depending on the value of the bits preceding bit bn−1. In this way, the three-dimensional data decoding device can properly decode the bitstream encoded using an appropriate encoding table for each bit with an improved coding efficiency.

Note that the three-dimensional data decoding device may reduce the number of encoding tables used for each bit. For example, when arithmetically decoding each bit bn−1, the three-dimensional data decoding device may switch among $2^m$ encoding tables depending on the value (occurrence pattern) of m bits preceding bit bn−1 (m<n−1). In this way, the three-dimensional data decoding device can appropriately decode the bitstream encoded with an improved coding efficiency while reducing the number of encoding tables used for each bit. Note that the three-dimensional data decoding device may update the occurrence probability of 0 and 1 in each encoding table based on the value of binarized data that has actually occurred. The three-dimensional data decoding device may also fix the occurrence probability of 0 and 1 in encoding tables for some bits. In that case, the number of updates of the occurrence probability can be reduced, so that the processing amount can be reduced.

For example, in a case where the n-bit code is b0b1b2 . . . bn−1, the number of the encoding tables for b0 is 1 (CTb0). The number of the encoding tables for b1 is 2 (CTb10, CTb11). The encoding table is changed depending on the value of b0 (0 to 1). The number of the encoding tables for b2 is 4 (CTb20, CTb21, CTb22, CTb23). The encoding table is changed depending on the value of b0 and b1 (0 to 3). The number of the encoding tables for bn−1 is $2^{n-1}$ (CTbn0, CTbn1, . . . , CTbn($2^{n-1}$−1)). The encoding table is changed depending on the value of b0b1 . . . bn−2 (0 to $2^{n-1}$−1).

FIG. 86 is a diagram for describing a process in a case where the remaining code is an exponential Golomb code. The part (remaining code) binarized and encoded with the exponential Golomb coding by the three-dimensional data encoding device includes a prefix part and a suffix part as shown in FIG. 86. For example, the three-dimensional data decoding device uses different encoding tables for the prefix part and the suffix part. That is, the three-dimensional data decoding device arithmetically decodes each bit included in the prefix part using an encoding table for prefix, and arithmetically decodes each bit included in the suffix part using an encoding table for suffix.

Note that the three-dimensional data decoding device may update the occurrence probability of 0 and 1 in each encoding table based on the value of binarized data that has occurred in the decoding. Alternatively, the three-dimensional data decoding device may fix the occurrence probability of 0 and 1 in either encoding table. In this way, the number of updates of the occurrence probability can be reduced, and therefore the processing amount can be reduced. For example, the three-dimensional data decoding device may update the occurrence probability for the prefix part but fix the occurrence probability for the suffix part.

The three-dimensional data decoding device decodes the quantized prediction residual (unsigned integer value) by converting the binarized data of the arithmetically decoded prediction residual into multiple levels in a manner corresponding to the encoding method used in the three-dimensional data encoding device. The three-dimensional data decoding device first calculates the value of the decoded n-bit code by arithmetically decoding the binarized data of the n-bit code. The three-dimensional data decoding device then compares the value of the n-bit code and the value of R_TH.

When the value of the n-bit code and the value of R_TH agree with each other, the three-dimensional data decoding device determines that the next bit is a bit encoded with the exponential Golomb coding, and arithmetically decodes the remaining code, which is the binarized data encoded with the exponential Golomb coding. The three-dimensional data decoding device then calculates the value of the remaining code using a reverse reference table that indicates a relationship between a remaining code and a value thereof from the decoded remaining code. FIG. 87 is a diagram showing an example of a reverse reference table that indicates a relationship between remaining codes and values thereof. The three-dimensional data decoding device then obtains a multileveled quantized prediction residual by adding the obtained value of the remaining code to the value of R_TH.

On the other hand, when the value of the n-bit code and the value of R_TH do not agree with each other (the value of the n-bit code is smaller than the value of R_TH), the three-dimensional data decoding device determines the value of the n-bit to be a multileveled quantized prediction residual. In this way, the three-dimensional data decoding device can appropriately decode the bitstream generated by using a different binarization method depending on the value of the prediction residual in the three-dimensional data encoding device.

Note that, when threshold R_TH is added to the header of the bitstream or the like, the three-dimensional data decoding device may obtain the value of threshold R_TH by decoding the header, and switch the decoding method based on the value of the decoded threshold R_TH. When threshold R_TH for each LoD is added to the header or the like, the three-dimensional data decoding device switches the decoding method based on threshold R_TH decoded for each LoD.

For example, when threshold R_TH is 63, and the value of the decoded n-bit code is 63, the three-dimensional data decoding device obtains the value of the remaining code by decoding the remaining code with the exponential Golomb coding. For example, in the example shown in FIG. 87, the remaining code is 00100, and the value of the remaining code is 3. The three-dimensional data decoding device then obtains 66 as the value of the prediction residual by summing 63 as the value of threshold R_TH and 3 as the value of the remaining code.

When the value of the decoded n-bit code is 32, the three-dimensional data decoding device sets 32, the value of the n-bit code, as the value of the prediction residual.

The three-dimensional data decoding device also converts the decoded quantized prediction residual from an unsigned integer value into a signed integer value in a process that is inverse to the process in the three-dimensional data encoding device, for example. In this way, when entropy-encoding a prediction residual, the three-dimensional data decoding device can appropriately decode a generated bitstream without considering occurrence of a negative integer. Note that the three-dimensional data decoding device does not have to convert an unsigned integer value into a signed integer value. For example, when decoding a bitstream generated by separately entropy-encoding a sign bit, the three-dimensional data decoding device may decode the sign bit.

The three-dimensional data decoding device generates a decoded value by decoding the quantized prediction residual converted into a signed integer value by inverse quantization and reconstruction. The three-dimensional data decoding device uses the generated decoded value for prediction of the three-dimensional points following the three-dimensional point to be decoded. Specifically, the three-dimensional data decoding device calculates an inverse-quantized value by multiplying the quantized prediction residual by the decoded quantization scale, and obtains a decoded value by summing the inverse-quantized value and a predicted value.

The decoded unsigned integer value (unsigned quantized value) is converted into a signed integer value in the process described below. That is, when the least significant bit (LSB) of decoded unsigned integer value a2u is 1, the three-dimensional data decoding device sets signed integer value a2q to be $-((a2u+1)>>1)$. When the LSB of unsigned integer value a2u is not 1, the three-dimensional data decoding device sets signed integer value a2q to be $(a2u>>1)$.

Similarly, when the LSB of decoded unsigned integer value b2u is 1, the three-dimensional data decoding device sets signed integer value b2q to be $-((b2u+1)>>1)$. When the LSB of unsigned integer value b2u is not 1, the three-dimensional data decoding device sets signed integer value b2q to be $(b2u>>1)$.

Details of the inverse quantization and reconstruction process in the three-dimensional data decoding device are the same as the inverse quantization and reconstruction process in the three-dimensional data encoding device.

Figure 88:
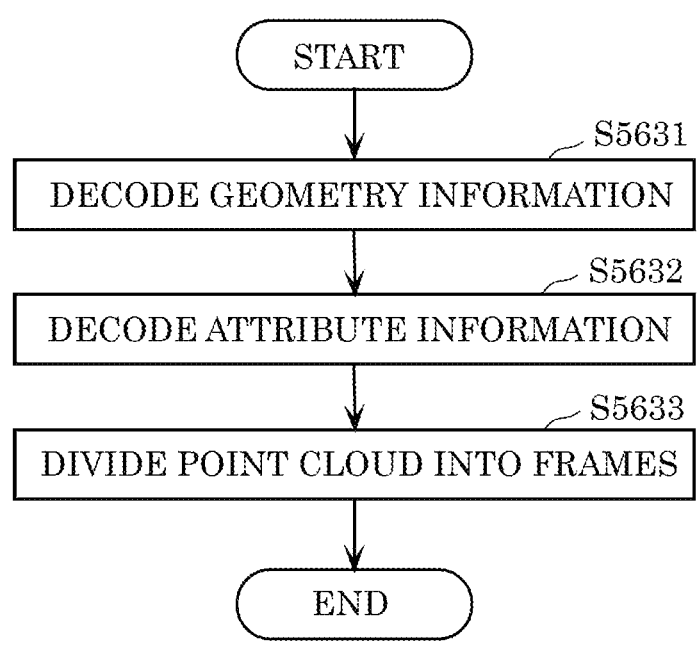
FIG. 88 is a flowchart of a three-dimensional data decoding process according to Embodiment 6.

In the following, a flow of a process performed by the three-dimensional data decoding device will be described. FIG. 88 is a flowchart of a three-dimensional data decoding process performed by the three-dimensional data decoding device. First, the three-dimensional data decoding device decodes geometry information (geometry) from the bitstream (S5631). For example, the three-dimensional data decoding device performs the decoding using an octree representation.

The three-dimensional data decoding device then decodes the attribute information (Attribute) from the bitstream (S5632). For example, when the three-dimensional data decoding device decodes a plurality of kinds of attribute information, the three-dimensional data decoding device may sequentially decode the plurality of kinds of attribute information. For example, when the three-dimensional data decoding device decodes color, reflectance, and frame index as attribute information, the three-dimensional data decoding device may decode the result of encoding of color, the result of encoding of reflectance, and the result of encoding of frame index in the order thereof in the bitstream. For example, if the result of encoding of color is followed by the result of encoding of reflectance in the bitstream, the three-dimensional data decoding device first decodes the result of encoding of color and then decodes the result of encoding of reflectance. If the result of encoding of reflectance is followed by the result of encoding of frame index in the bitstream, the three-dimensional data decoding device first decodes the result of encoding of reflectance and then decodes the result of encoding of frame index. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of kinds of attribute information in parallel, and integrate the results of the decoding into one three-dimensional point cloud. In this way, the three-dimensional data decoding device can decode a plurality of kinds of attribute information at a high speed.

The three-dimensional data decoding device then divides the decoded three-dimensional point cloud into a plurality of frames based on the values of the frame indices decoded along with the geometry information on each three-dimensional point (S5633). For example, the three-dimensional data decoding device adds the geometry information and attribute information on three-dimensional point a to frame 0 when the frame index of decoded three-dimensional point a is 0, and adds the geometry information and attribute information on three-dimensional point b to frame 1 when the frame index of decoded three-dimensional point b is 1. In this way, the three-dimensional data decoding device divides the three-dimensional point cloud obtained by decoding into a plurality of three-dimensional point clouds belonging to a plurality of different frames.

Figure 89:
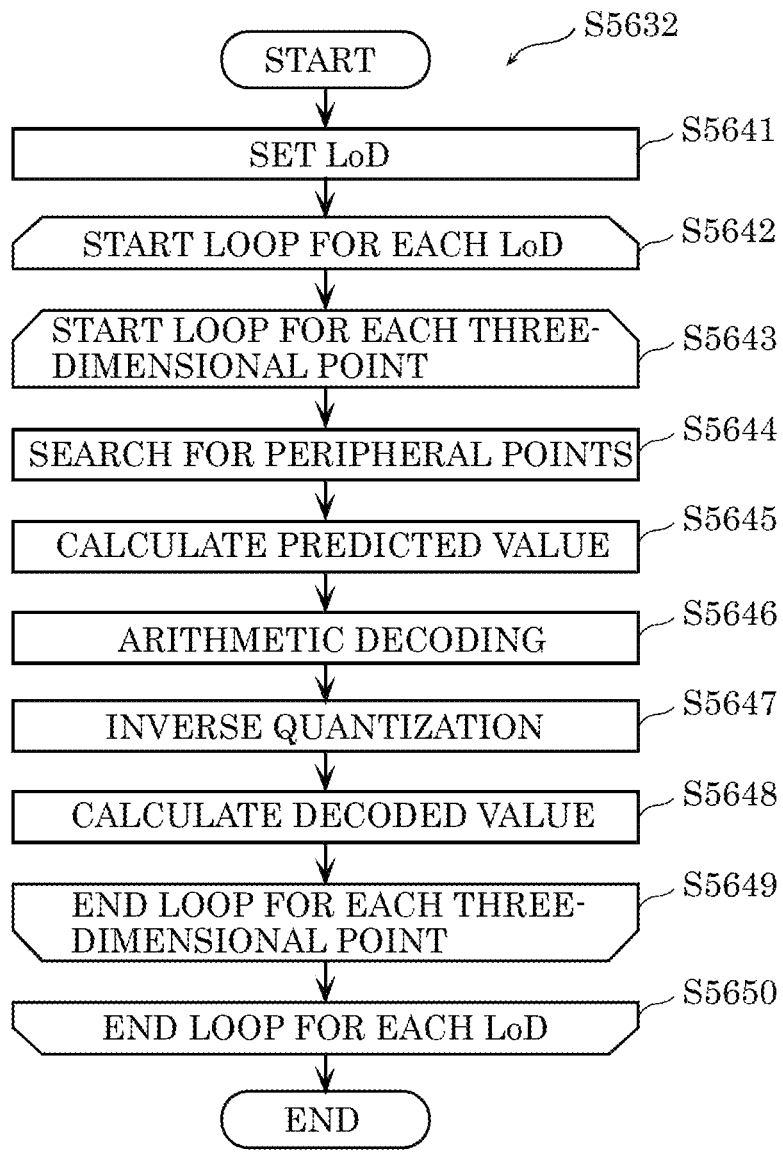
FIG. 89 is a flowchart of an attribute information decoding process according to Embodiment 6.

FIG. 89 is a flowchart of the attribute information decoding process (S5632). First, the three-dimensional data decoding device sets an LoD (S5641). That is, the three-dimensional data decoding device assigns each of a plurality of three-dimensional points having decoded geometry information to any of a plurality of LoDs. For example, the method of the assignment is the same as the method of assignment used in the three-dimensional data encoding device.

The three-dimensional data decoding device then starts a loop on an LoD basis (S5642). That is, the three-dimensional data decoding device repeatedly performs the process from step S5643 to step S5649 for each LoD.

The three-dimensional data decoding device then starts a loop on a basis of a three-dimensional point (S5643). That is, the three-dimensional data decoding device repeatedly performs the process from step S5644 to step S5648 for each three-dimensional point.

First, the three-dimensional data decoding device searches for a plurality of peripheral points, which are three-dimensional points present in the periphery of the target three-dimensional point, that are to be used for calculation of a predicted value of the target three-dimensional point to be processed (S5644). The three-dimensional data decoding device then calculates a weighted average of values of the attribute information on the plurality of peripheral points, and sets the obtained value as predicted value P (S5645). Note that these processings are the same as those in the three-dimensional data encoding device.

The three-dimensional data decoding device then arithmetically decodes the quantized value from the bitstream (S5646). The three-dimensional data decoding device then calculates an inverse-quantized value by inverse-quantizing the decoded quantized value (S5647). The three-dimensional data decoding device then generates a decoded value by adding the predicted value to the inverse-quantized value (S5648). The three-dimensional data decoding device then ends the loop on a basis of a three-dimensional point (S5649). The three-dimensional data decoding device also ends the loop on a LoD basis (S5650).

Figure 90:
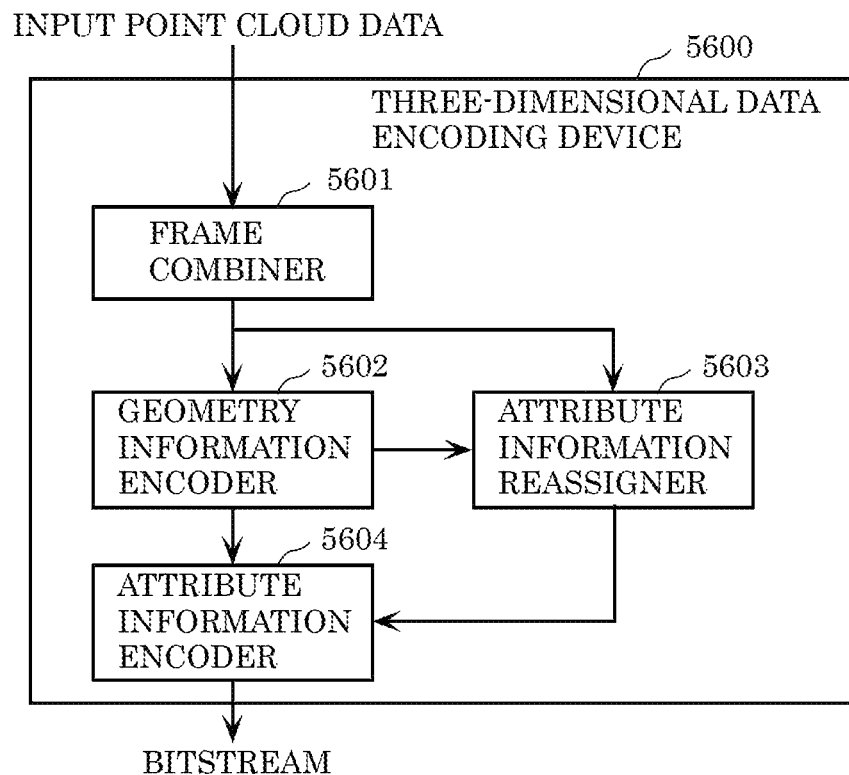
FIG. 90 is a block diagram showing a three-dimensional data encoding device according to Embodiment 6.

Next, a configuration of a three-dimensional data encoding device and a configuration of a three-dimensional data decoding device according to this embodiment will be described. FIG. 90 is a block diagram showing a configuration of three-dimensional data encoding device 5600 according to this embodiment. Three-dimensional data encoding device 5600 includes frame combiner 5601, geometry information encoder 5602, attribute information reassigner 5603, and attribute information encoder 5604.

Frame combiner 5601 combines a plurality of frames. Geometry information encoder 5602 encodes geometry information (geometry) on a plurality of three-dimensional points included in an input point cloud. Attribute information reassigner 5603 reassigns values of attribute information of the plurality of three-dimensional points included in the input point cloud using a result of encoding and decoding of geometry information. Attribute information encoder 5604 encodes the reassigned attribute information (attribute). Three-dimensional data encoding device 5600 also generates a bitstream including the encoded geometry information and the encoded attribute information.

Figure 91:
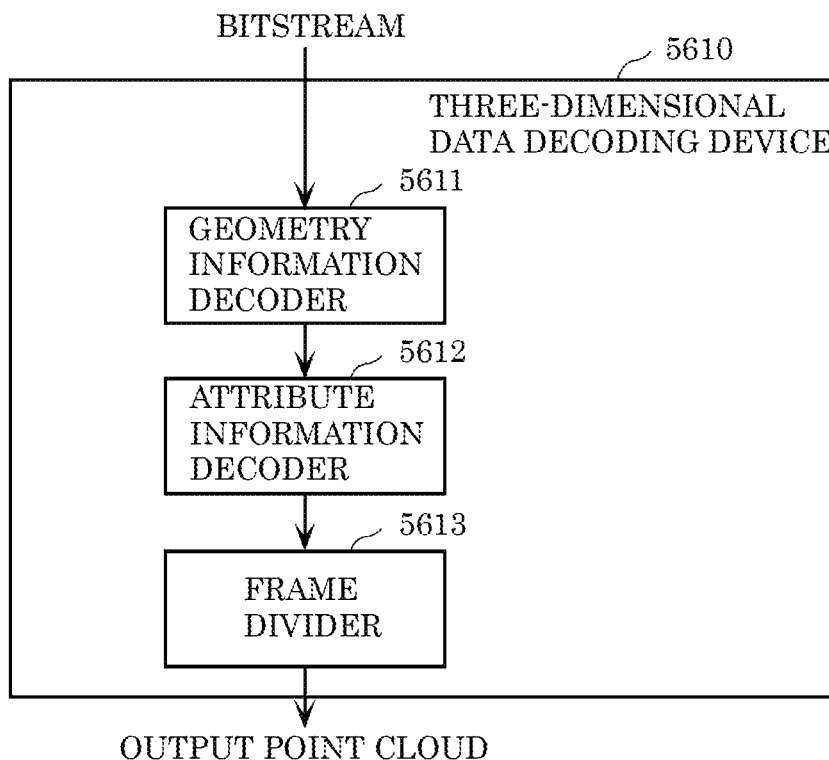
FIG. 91 is a block diagram showing a three-dimensional data decoding device according to Embodiment 6.

FIG. 91 is a block diagram showing a configuration of three-dimensional data decoding device 5610 according to this embodiment. Three-dimensional data decoding device 5610 includes geometry information decoder 5611, attribute information decoder 5612, and frame divider 5613.

Geometry information decoder 5611 decodes geometry information (geometry) on a plurality of three-dimensional points from a bitstream. Attribute information decoder 5612 decodes attribute information (attribute) on the plurality of three-dimensional points from the bitstream. Frame divider 5613 divides the decoded three-dimensional point cloud into a plurality of frames based on the values of the frame indices decoded along with the geometry information on each three-dimensional point. Three-dimensional data decoding device 5610 also generates an output point cloud by combining the decoded geometry information and the decoded attribute information.

Figure 92:
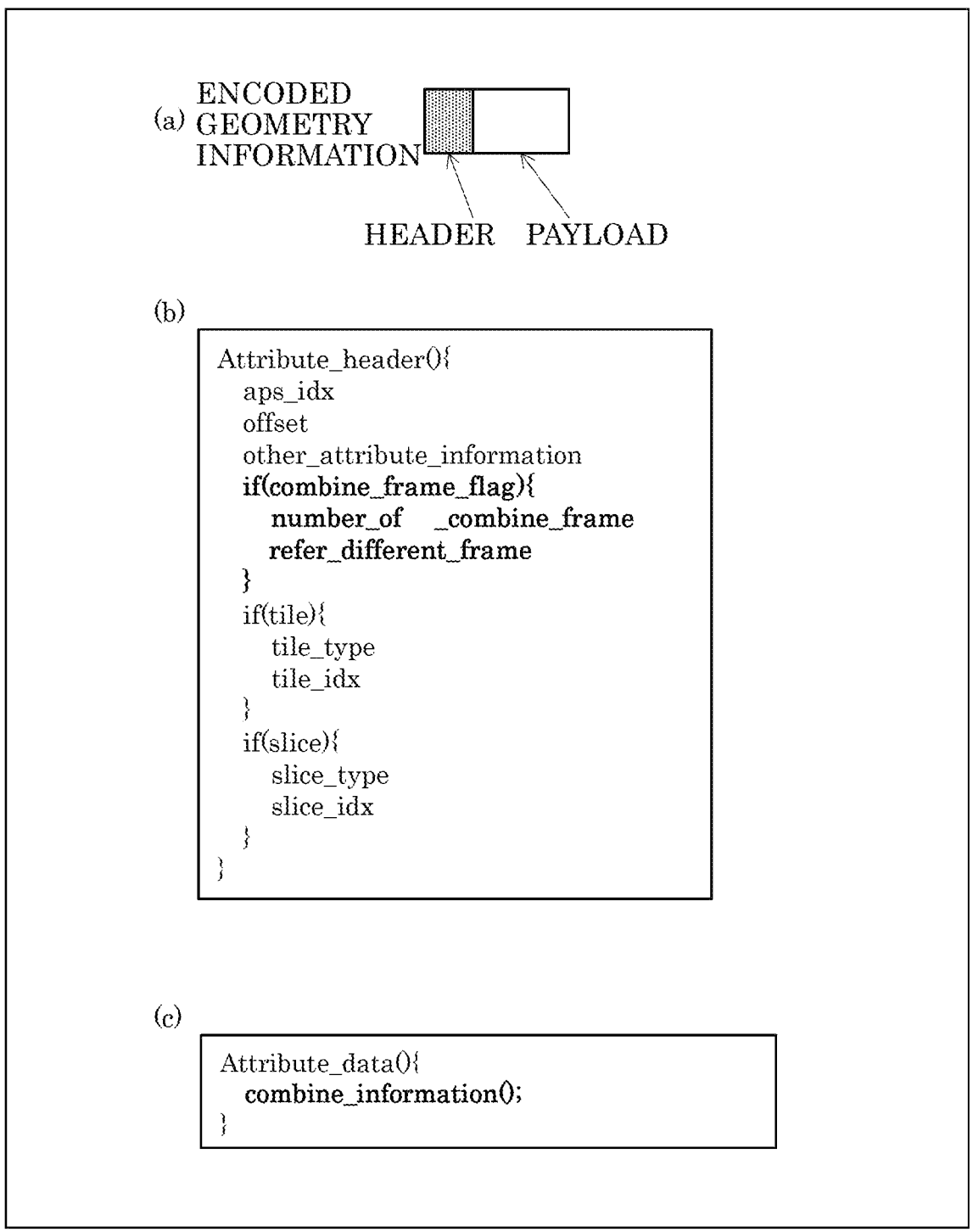
FIG. 92 is a diagram showing a configuration of attribute information according to Embodiment 6.

FIG. 92 is a diagram showing a configuration of attribute information. Part (a) of FIG. 92 is a diagram showing a configuration of compressed attribute information, part (b) of FIG. 92 is a diagram showing an example of a syntax of a header of the attribute information, and part (c) of FIG. 92 is a diagram showing an example of a syntax of a payload (data) of the attribute information.

With reference to part (b) of FIG. 92, a syntax of a header of attribute information will be described, apx_idx denotes an ID of an associated parameter set. When there is a parameter set for each frame, apx_idx may indicate a plurality of IDs. offset denotes an offset position for obtaining combined data. other_attribute_information denotes other attribute data, such as a QP delta that indicates a difference value of a quantization parameter, combine_frame_flag is a flag that indicates whether frame combining has been performed for encoded data or not. number_of_combine_frame denotes the number N of frames combined. number_of_combine_frame may be included in SPS or APS.

refer_different_frame is a flag that indicates whether to encode/decode attribute information on a target three-dimensional point to be encoded/decoded using attribute information on a peripheral three-dimensional point belonging to the same frame as that of the target three-dimensional point or using attribute information on peripheral three-dimensional points belonging to the same frame as that of the target three-dimensional point and a different frame than that of the target three-dimensional point. For example, the value assignment described below is possible. When refer_different_frame is 0, the three-dimensional data encoding device or three-dimensional data decoding device encodes/decodes the attribute information on the target three-dimensional point using attribute information on peripheral three-dimensional points in the same frame as the target three-dimensional point. In this case, the three-dimensional data encoding device or three-dimensional data decoding device does not encode/decode the attribute information on the target three-dimensional point using attribute information on any peripheral three-dimensional point in a different frame than that of the target three-dimensional point.

On the other hand, when refer_different_frame is 1, the three-dimensional data encoding device or three-dimensional data decoding device encodes/decodes the attribute information on the target three-dimensional point using attribute information on peripheral three-dimensional points belonging to the same frame as that of the target three-dimensional point and a different frame than that of the target three-dimensional point. That is, the three-dimensional data encoding device or three-dimensional data decoding device encodes/decodes the attribute information on the target three-dimensional point using attribute information on peripheral three-dimensional points regardless of whether the peripheral three-dimensional points belong to the same frame as that of the target three-dimensional point or not.

Although an example has been described in which, as attribute information on a target three-dimensional point, color information or reflectance information is encoded using attribute information on a peripheral three-dimensional point, the frame index of the target three-dimensional point can also be encoded using the frame index of a peripheral three-dimensional point. For example, the three-dimensional data encoding device may perform the encoding using the predictive encoding method described in this disclosure using the frame index assigned to each three-dimensional point when combining a plurality of frames as attribute information on the three-dimensional point. For example, the three-dimensional data encoding device may calculate a predicted value of the frame index of three-dimensional point A from values of the frame indices of peripheral three-dimensional points B, C, and D of three-dimensional point A, and encode the prediction residual. In that case, the three-dimensional data encoding device can reduce the bit amount required for encoding the frame index, and improve the coding efficiency.

Figure 93:
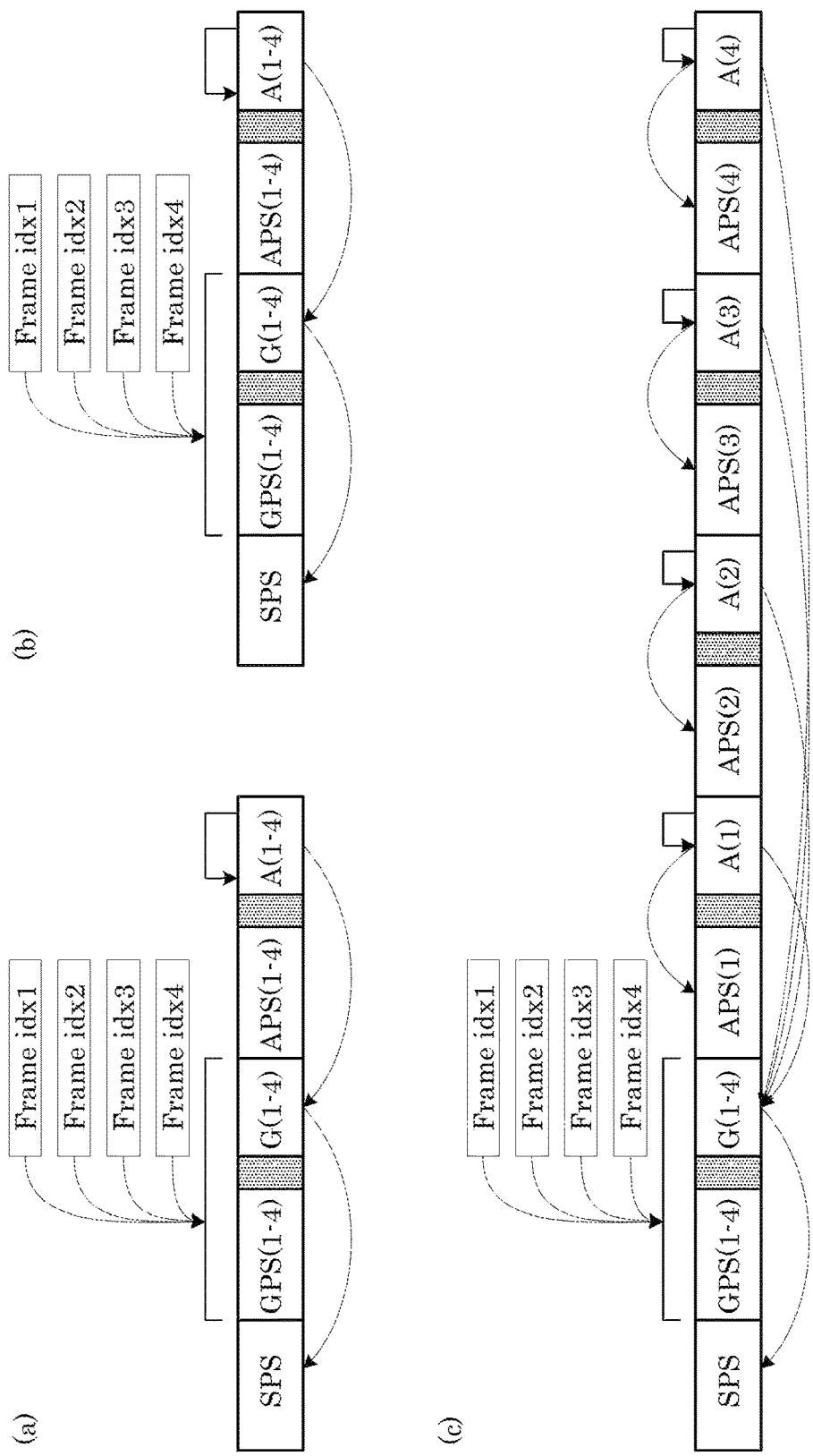
FIG. 93 is a diagram for describing encoded data according to Embodiment 6.

FIG. 93 is a diagram for describing encoded data.

When point cloud data includes attribute information, attribute information of frames may be combined. The attribute information is encoded or decoded by referring to geometry information. The geometry information to be referred to may be geometry information before frame combining or geometry information after frame combining. The number of frames combined for the geometry information and the number of frames combined for the attribute information may be the same, or independent or different.

In FIG. 93, a numeral in parentheses indicates a frame. For example, "1" indicates information of frame 1, and "1-4" indicate information of frames 1 to 4. G denotes geometry information, and A denotes attribute information. Frame_idx1 is a frame index of frame 1.

Part (a) of FIG. 93 shows an example of a case where refer_different_frame is 1. When refer_different_frame is 1, the three-dimensional data encoding device or three-dimensional data decoding device encodes or decodes A(1-4) based on information of G(1-4). In decoding, the three-dimensional data decoding device divides G(1-4) and A(1-4) into frames 1 to 4 using Frame_idx1 to Frame_idx4 decoded along with G(1-4). Note that when encoding or decoding A(1-4), the three-dimensional data encoding device or three-dimensional data decoding device may refer to other attribute information of A(1-4). That is, when encoding or decoding A(1), the three-dimensional data encoding device or three-dimensional data decoding device may refer to other A(1) or refer to A(2-4). An arrow indicates an information reference source and an information reference destination. The source of an arrow indicates a reference source, and the destination of an arrow indicates a reference destination.

Part (b) of FIG. 93 shows an example of a case where refer_different_frame is 0. When refer_different_frame is 0, unlike the case where refer_different_frame is 1, the three-dimensional data encoding device or three-dimensional data decoding device does not refer to attribute information of a different frame. That is, when encoding or decoding A(1), the three-dimensional data encoding device or three-dimensional data decoding device refers to other A( ) but does not refer to A(2-4).

Part (c) of FIG. 93 shows another example of the case where refer_different_frame is 0. In this case, geometry information is encoded on a basis of combined frames, while attribute information is encoded for each frame. Therefore, when encoding or decoding A(1), the three-dimensional data encoding device or three-dimensional data decoding device refers to other A(1). Similarly, when encoding or decoding attribute information, the three-dimensional data encoding device or three-dimensional data decoding device refers to other attribute information belonging to the same frame as that of the attribute information. Note that APS of each piece of A(1-4) may be added to the header.

Figure 94:
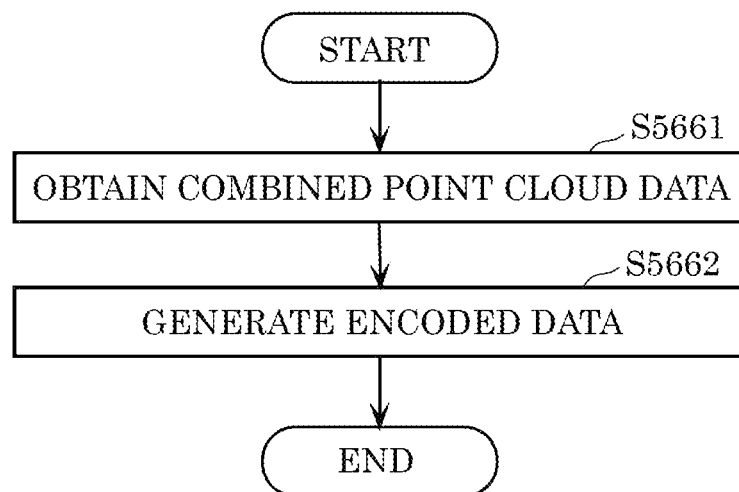
FIG. 94 is a flowchart of a three-dimensional data encoding process according to Embodiment 6.

As stated above, the three-dimensional data encoding device according to the present embodiment performs the process shown in FIG. 94. The three-dimensional data encoding device obtains third point cloud data that is a combination of first point cloud data and second point cloud data, and includes geometry information of each of three-dimensional points included in the third point cloud data, and identification information indicating which of the first point cloud data and the second point cloud data each of the three-dimensional points belongs to (S5661). Next, the three-dimensional data encoding device generates encoded data by encoding the third point cloud data obtained (S5662). In the generating, the three-dimensional data encoding device encodes identification information of each of the three-dimensional points as attribute information.

Accordingly, the three-dimensional data encoding device can improve coding efficiency by encoding pieces of point cloud data collectively.

For example, in the generating (S5662), attribute information of a first three-dimensional point is encoded using attribute information of a second three-dimensional point neighboring the first three-dimensional point, the first three-dimensional point and the second three-dimensional point being included in the three-dimensional points.

For example, the attribute information of the first three-dimensional point includes first identification information indicating that the first three-dimensional point belongs to the first point cloud data. In addition, the attribute information of the second three-dimensional point includes second identification information indicating that the second three-dimensional point belongs to the second point cloud data.

For example, in the generating (S5662), a predicted value of the attribute information of the first three-dimensional point is calculated using the attribute information of the second three-dimensional point, a prediction residual is calculated, the prediction residual being a difference between the attribute information of the first three-dimensional point and the predicted value, and encoded data including the prediction residual is generated.

For example, in the obtaining (S5661), the third point cloud data is obtained by combining the first point cloud data and the second point cloud data.

For example, the encoded data includes the identification information in a same data format as attribute information different from the identification information.

For example, the three-dimensional data encoding device includes a processor and memory, and the processor performs the above process using the memory.

Figure 95:
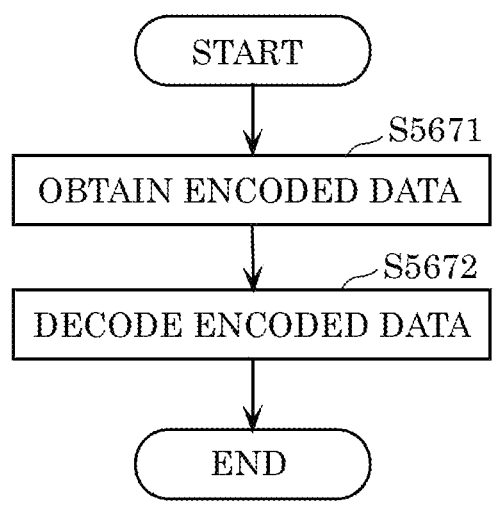
FIG. 95 is a flowchart of a three-dimensional data decoding process according to Embodiment 6.

The three-dimensional data decoding device according to the present embodiment performs the process shown in FIG. 95. The three-dimensional data decoding device obtains encoded data (S5671). Next, the three-dimensional data decoding device decodes the encoded data to obtain geometry information and attribute information of each of three-dimensional points included in third point cloud data that is a combination of first point cloud data and second point cloud data (S5672). It should be noted that the attribute information includes identification information indicating which of the first point cloud data and the second point cloud data one of the three-dimensional points that corresponds to the attribute information belongs to.

Accordingly, the three-dimensional data decoding device can decode encoded data for which coding efficiency has been improved by encoding pieces of point cloud data collectively.

For example, in the obtaining (S5671), attribute information of a first three-dimensional point is decoded using attribute information of a second three-dimensional point neighboring the first three-dimensional point, the first three-dimensional point and the second three-dimensional point being included in the three-dimensional points.

For example, the attribute information of the first three-dimensional point includes first identification information indicating that the first three-dimensional point belongs to the first point cloud data. In addition, the attribute information of the second three-dimensional point includes second identification information indicating that the second three-dimensional point belongs to the second point cloud data.

For example, the encoded data includes a prediction residual. In addition, in the decoding (S5672), a predicted value of the attribute information of the first three-dimensional point is calculated using the attribute information of the second three-dimensional point, and the attribute information of the first three-dimensional point is calculated by adding the predicted value and the prediction residual.

For example, the three-dimensional data decoding device further divides the third point cloud data into the first point cloud data and the second point cloud data using the identification information.

For example, the encoded data includes the identification information in a same data format as attribute information different from the identification information.

For example, the three-dimensional data decoding device includes a processor and memory, and the processor performs the above process using the memory.

Embodiment 7

The following describes a specific example of a method of performing an encoding using the predictive encoding method described in this disclosure in the case where a frame index (frame_idx) assigned to each three-dimensional point when combining a plurality of frames is stored as new attribute information rather than as geometry information on the three-dimensional point as described above.

Figure 96:
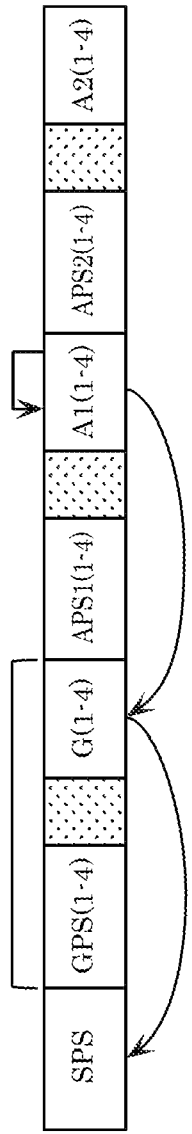
FIG. 96 is a diagram showing an example of encoded data according to Embodiment 7.

FIG. 96 is a diagram showing an example of encoded data (bitstream) according to this embodiment. For example, when applying frame combining in a case where point cloud data has geometry information G (geometry) and first attribute information A1 (attribute) (color, for example), the three-dimensional data encoding device encodes frame index as second attribute information A2. The three-dimensional data encoding device stores, in a sequence parameter set (SPS), identification information that indicates that the type of the attribute information is frame index. That is, the identification information indicates attribute information including a frame index (indicating a frame index) of a plurality of pieces of attribute information. In other words, the identification information indicates whether or not each of a plurality of pieces of attribute information is attribute information including a frame index.

SPS is a parameter set common to a plurality of frames (a plurality of frames combined), and is a parameter set common to the geometry information and the attribute information. Note that the identification information may be included in control information (metadata) rather than in SPS. For example, the identification information may be included in APS or the like.

Note that FIG. 96 shows an example of encoded data of four frames 1 to 4 combined to each other. G(1-4) in this drawing denotes geometry information of the combined frames. A1(1-4) denotes first attribute information of the combined frames, which is color information, for example. A2(1-4) denotes second attribute information, which is a frame index concerning frames 1 to 4.

GPS(1-4) denotes a parameter set of G(1-4), APS1(1-4) denotes a parameter set of A1(1-4), and APS2(1-4) denotes a parameter set of A2(1-4).

For example, A1(1-4) is encoded or decoded using information of G(1-4). Note that pieces of A1(1-4) may refer to each other. In the decoding, G(1-4) and A(1-4) are divided into frames 1 to 4 using frame indices 1 to 4 decoded along with G(1-4).

Note that it may be prescribed that a lossless encoding method be always used when transmitting a frame index as attribute information. For example, the lossless encoding method is an encoding method that does not involves quantization. When a frame index is attribute information, a restriction may be imposed on the quantization parameter so that the encoding is lossless. Note that the three-dimensional data encoding device may store information indicating the encoding method used or the quantization parameter in the bitstream.

Note that the three-dimensional data encoding device may use a lossless encoding method or a lossy encoding method for all or part of the geometry information and the attribute information other than the frame index.

Note that the three-dimensional data encoding device may transmit information on each frame other than frame index as second attribute information. For example, the information on each frame is a timestamp that indicates the time of generation of the frame data, the time of encoding of the frame data, or the time of decoding of the frame data. Alternatively, the information on each frame is sensor information from a sensor used to obtain the frame data. The sensor information includes sensor speed, sensor acceleration, sensor position information, or sensor orientation, for example.

Next, an example of compression of a three-dimensional point cloud that has no attribute information, such as color or reflectance, will be described. FIG. 97 is a diagram showing encoded data in this case.

When combining frames, the three-dimensional data encoding device generates attribute information A1, and transmits encoded data including generated attribute information A1. Here, attribute information A1 indicates a frame index.

Note that, when the number of frames combined is variable, the three-dimensional data encoding device does not have to generate a frame index if the number of frames combined is 1. In that case, the three-dimensional data decoding device can determine that the number of frames combined is 1 if there is no attribute information indicating a frame index.

In the following, a three-dimensional data encoding device that performs motion compensation will be described. For example, when one or more pieces of point cloud data associated with different time points are obtained with LiDAR provided in a mobile body, an object forming a first point cloud and an object forming a second point cloud may move. When combining such different PCC point clouds or point cloud frames, an octree is likely to be able to be shared if the objects in the point clouds are moving slowly, and is unlikely to be able to be shared if the objects are moving fast.

Figure 98:
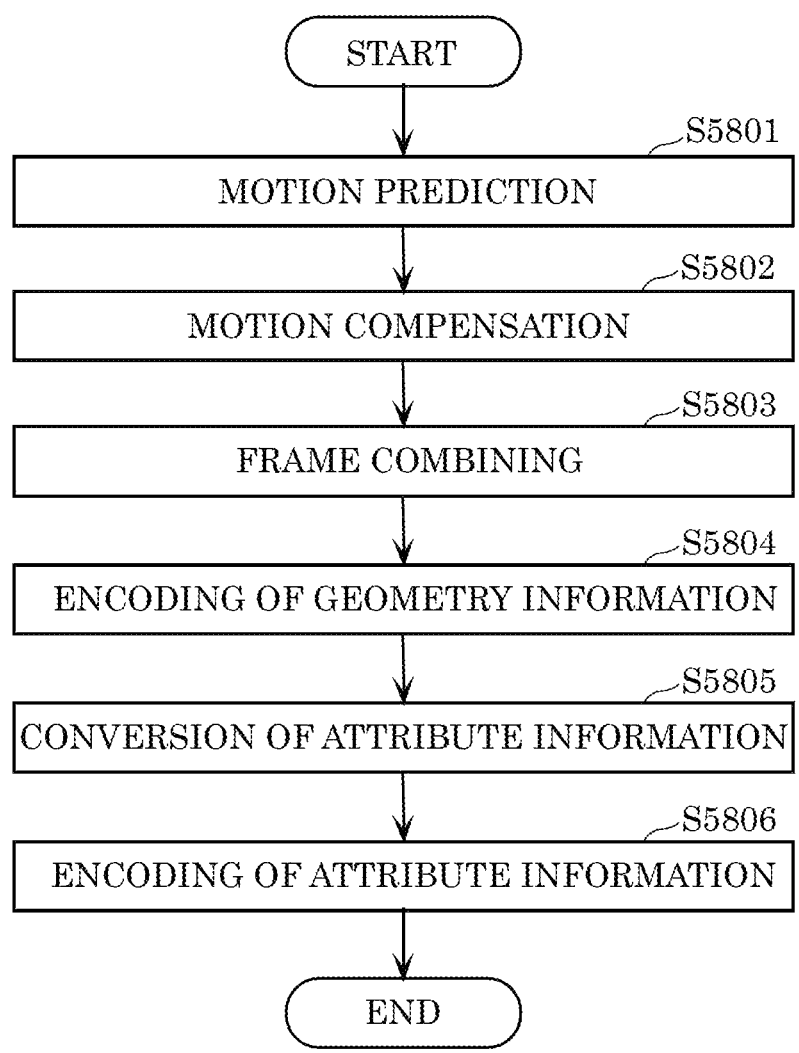
FIG. 98 is a flowchart of a three-dimensional data encoding process according to Embodiment 7.

In view of this, the three-dimensional data encoding device predicts a motion between different frames, and adjusts the point clouds based on the motion before combining the point clouds. FIG. 98 is a flowchart of a three-dimensional data encoding process in this case.

First, the three-dimensional data encoding device calculates a motion vector (motion information) that indicates a motion between frames by predicting the motion between the frames by motion prediction (S5801). For example, the three-dimensional data encoding device generates the motion vector by comparing a point cloud of a current frame and a point cloud of a past frame. Specifically, the three-dimensional data encoding device detects the positions of a same object in two frames, and determines a motion based on the difference between the detected positions. Note that, in the comparison of the point clouds, the three-dimensional data encoding device may use part of the point clouds of the point clouds included in the frames or use all the point clouds included in the frames. The three-dimensional data encoding device may extract a feature point using geometry information or attribute information, and predict a motion of the feature point.

Figure 99:
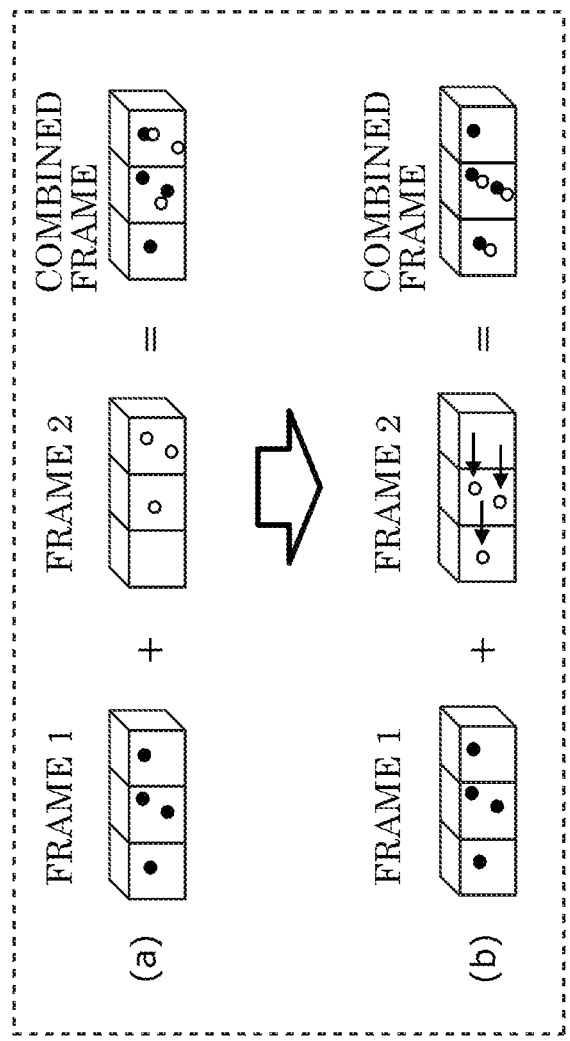
FIG. 99 is a diagram showing an example of a motion compensation and a frame combining according to Embodiment 7.

The three-dimensional data encoding device then performs a motion compensation using the calculated motion vector (S5802). FIG. 99 is a diagram showing an example of the motion compensation and a frame combining. Part (a) of this drawing shows an example of a case where the motion compensation is not performed, and part (b) of this drawing shows an example of a case where the motion compensation is performed. For example, as shown in part (b) of this drawing, the three-dimensional data encoding device predicts a motion of a point cloud from frame 1 to frame 2, and adjusts the position of the point cloud in frame 2 by shifting the position of the point cloud in frame 2 by the motion.

The three-dimensional data encoding device then generates a combined frame by combining frame 1 and adjusted frame 2 (S5803). The three-dimensional data encoding device then encodes geometry information of the combined frame (S5804).

The three-dimensional data encoding device then converts attribute information, and encodes the converted attribute information (S5806). Note that, in the conversion of the attribute information, if the position of a three-dimensional point has changed because of quantization or the like, for example, a process of reassigning the attribute information on the original three-dimensional point to the three-dimensional point changed in position is performed, for example.

Figure 100:
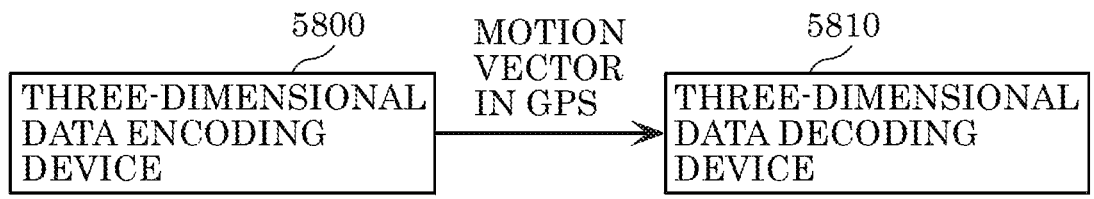
FIG. 100 is a diagram showing an example of transmission of a motion vector according to Embodiment 7.
Figure 101:
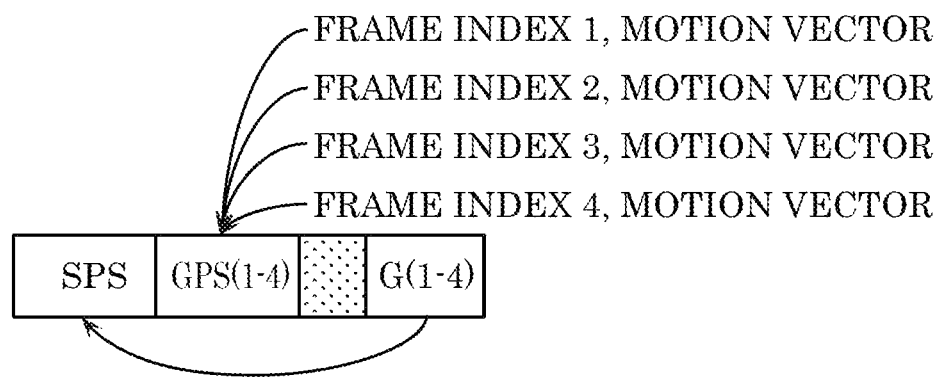
FIG. 101 is a diagram showing an example of encoded data according to Embodiment 7.

Next, a three-dimensional data decoding device that performs a motion compensation will be described. FIG. 100 is a diagram showing an example of transmission of a motion vector from three-dimensional data encoding device 5800 to three-dimensional data decoding device 5810. FIG. 101 is a diagram showing an example of encoded data (bitstream).

The three-dimensional data encoding device 5800 transmits the motion vector by storing the motion vector in control information (metadata) for each frame, such as GPS. Note that the three-dimensional data encoding device 5800 may store the motion vector in the header of the geometry information or the payload of the geometry information. Alternatively, the three-dimensional data encoding device 5800 may store the motion vector in other control information, such as SPS or APS. For example, as shown in FIG. 101, the three-dimensional data encoding device 5800 stores the motion vector for each of the frames combined in GPS.

Figure 102:
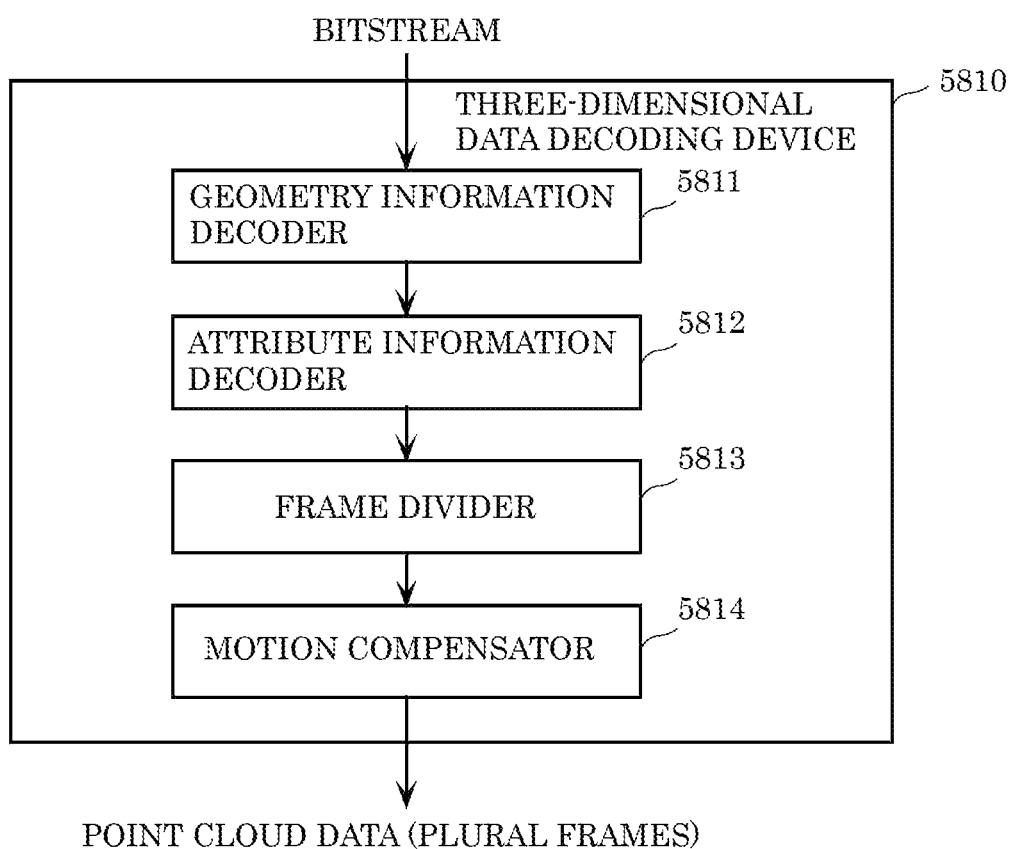
FIG. 102 is a block diagram showing a three-dimensional data decoding device according to Embodiment 7.

FIG. 102 is a block diagram showing a configuration of three-dimensional data decoding device 5810 according to this embodiment. Three-dimensional data decoding device 5810 includes geometry information decoder 5811, attribute information decoder 5812, frame divider 5813, and motion compensator 5814.

Geometry information decoder 5811 decodes a bitstream to obtain geometry information. Attribute information decoder 5812 decodes the bitstream to obtain attribute information. Frame divider 5813 divides the decoded combined frame (geometry information and attribute information) into a plurality of frames. Motion compensator 5814 generates point cloud data of the plurality of frames by adjusting the plurality of frames resulting from the division using a motion vector. That is, motion compensator 5814 performs a process of restoring the position of a point shifted in the three-dimensional data encoding device to the original position using the motion vector.

Figure 103:
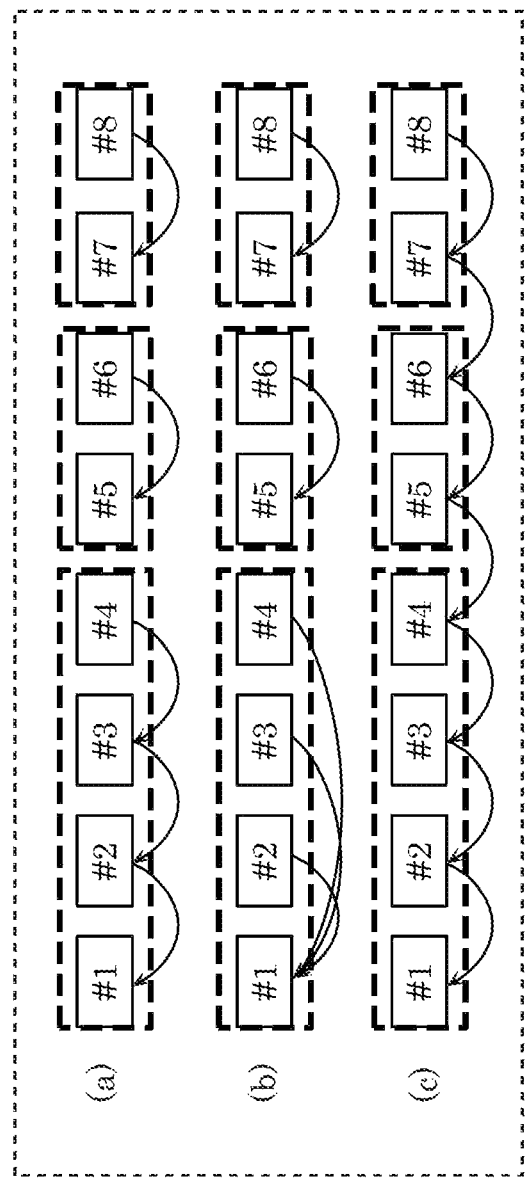
FIG. 103 is a diagram showing an example of a method of calculating a motion vector according to Embodiment 7.

Next, an example of a method of calculating a motion vector will be described. FIG. 103 is a diagram showing an example of a method of calculating a motion vector. In FIG. 103, a frame indicated by a dotted line indicates a set of frames to be combined.

For example, as shown in part (a) of this drawing, the three-dimensional data encoding device may derive a motion vector by comparing the current frame and the preceding frame and transmit the motion vector. In that case, for example, the three-dimensional data encoding device does not derive and transmit a motion vector for the leading frame. Alternatively, as shown in part (c) of this drawing, the three-dimensional data encoding device may derive a motion vector for the leading frame by comparison with the preceding frame and transmit the motion vector. Alternatively, as shown in part (b) of this drawing, the three-dimensional data encoding device may derive a motion vector by comparing the current frame and the leading frame of the set of frames to be combined, and transmit the motion vector.

Figure 104:
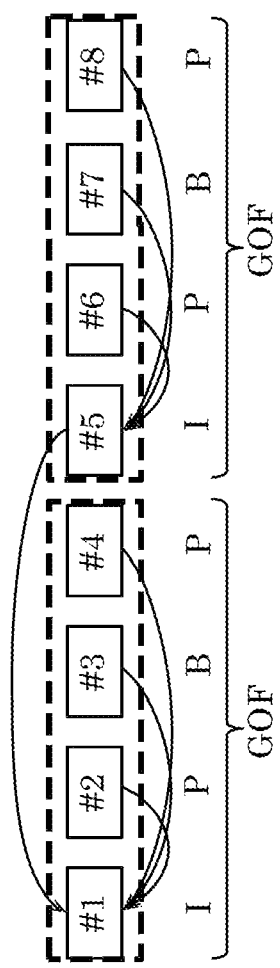
FIG. 104 is a diagram showing an example of a method of calculating a motion vector according to Embodiment 7.

FIG. 104 is a diagram showing an example of a method of calculating a motion vector in a case where an inter-prediction is applied. When the inter-prediction is applied, the three-dimensional data encoding device may derive a motion vector by comparing the current frame and the leading frame of GOF, for example. Alternatively, the three-dimensional data encoding device may derive a motion vector between the leading frames of GOFs. Here, GOF is a processing unit including a plurality of frames, such as a random access unit including I frames.

Note that the three-dimensional data encoding device may generate a motion vector from information on a point cloud, or calculate a motion vector based on any one or more pieces of sensor information used for obtaining a point cloud, such as sensor position, sensor speed, and sensor acceleration.

Next, a case where tile division is used will be described. When dividing a large point cloud into tiles, the magnitude of a motion vector between frames may vary between tiles.

In view of this, the three-dimensional data encoding device may determine whether to apply a motion vector for each tile or not. The three-dimensional data encoding device may use a different method of deriving a motion vector or a different method of compensation for each tile. For example, if the three-dimensional data encoding device derives a motion vector on a tile basis, the three-dimensional data encoding device can apply an appropriate motion compensation even when the magnitude of a motion vector is large in some tiles and small in other tiles.

The three-dimensional data encoding device may store, in the bitstream, a signal for each tile that indicates whether a motion vector is applied or not, the method of deriving a motion vector, or the method of compensation.

Note that, when a motion compensation is performed, the range of a point cloud may increase because of the offset in position. In that case, the three-dimensional data encoding device may expand a bounding box, or convert the position of the point cloud to fall into the existing bounding box without expanding the bounding box.

Figure 105:
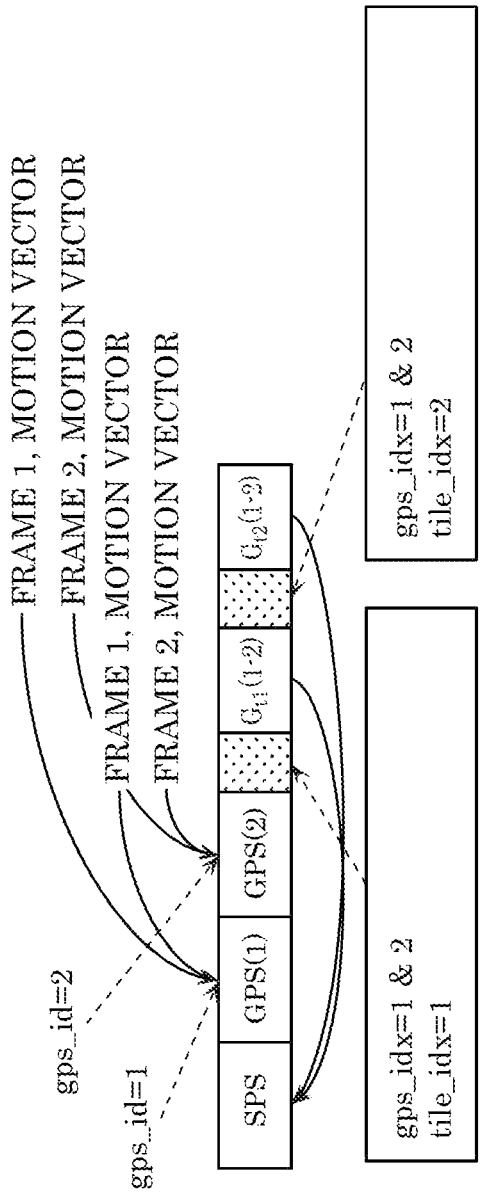
FIG. 105 is a diagram showing an example of encoded data according to Embodiment 7.

FIG. 105 is a diagram showing an example of encoded data in this case. As shown in FIG. 105, for example, a motion vector for each tile may be stored in GPS or the like.

Figure 106:
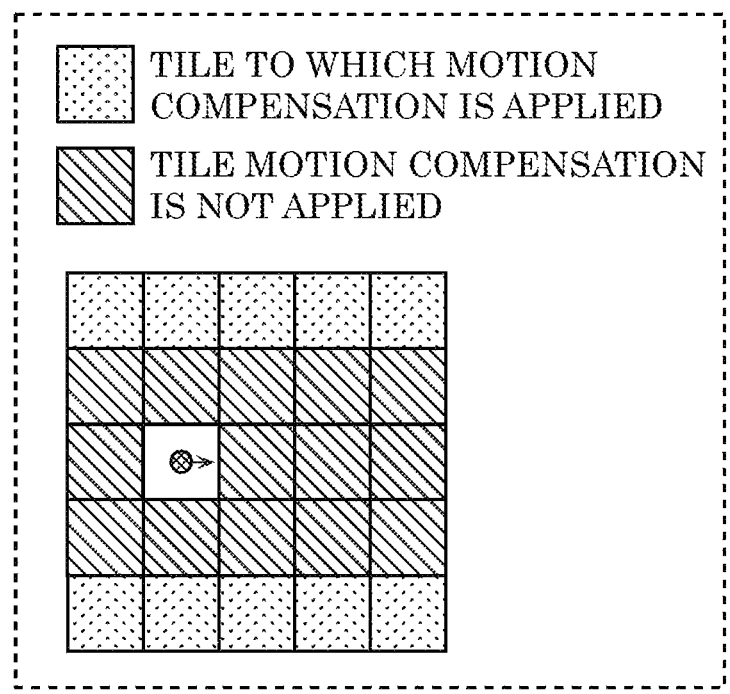
FIG. 106 is a diagram showing an example of tiles to which a motion compensation is applied according to Embodiment 7.

FIG. 106 is a diagram showing an example of tiles to which a motion compensation is applied. As shown in FIG. 106, for example, the three-dimensional data encoding device does not apply a motion compensation to tiles closer to a mobile body, such as a vehicle, and applies a motion compensation to tiles away from the mobile body.

Figure 107:
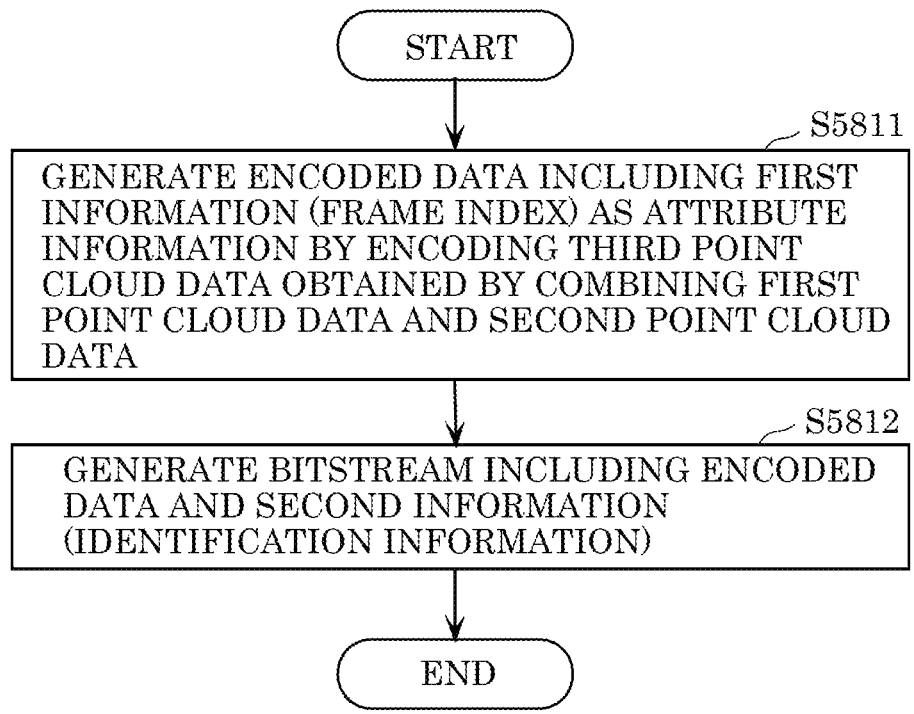
FIG. 107 is a flowchart of an encoding process according to Embodiment 7.

As described above, the three-dimensional data encoding device according to this embodiment performs the process shown in FIG. 107. First, the three-dimensional data encoding device generates encoded data by encoding third point cloud data obtained by combining first point cloud data and second point cloud data (S5811). The three-dimensional data encoding device generates a bitstream including the encoded data and control information (S5812). The encoded data includes geometry information and a plurality of pieces of attribute information on each of a plurality of three-dimensional points included in the third point cloud data. One of the plurality of pieces of attribute information includes first information (a frame index, for example) that indicates whether the associated three-dimensional point belongs to the first point cloud data or the second point cloud data. The control information includes second information (identification information, for example) that indicates attribute information including the first information of the plurality of pieces of attribute information.

With this configuration, when any of the plurality of pieces of attribute information includes the first information, the three-dimensional data decoding device that decodes the bitstream generated by the three-dimensional data encoding device can easily determine the attribute information including the first information using the second information included in the control information. Therefore, the three-dimensional data encoding device can reduce the processing amount of the three-dimensional data decoding device.

For example, the control information is control information (SPS, for example) common to a plurality of frames. For example, the third point cloud data is a plurality of pieces of point cloud data associated with a plurality of time points, and control information is control information common to the plurality of pieces of point cloud data.

For example, the three-dimensional data encoding device encodes the attribute information including the first information using a lossless encoding method. For example, the three-dimensional data encoding device sets a quantization parameter so that a lossless encoding method can be used. For example, the three-dimensional data encoding device stores information indicating the set quantization parameter in the bitstream.

For example, the three-dimensional data encoding device adjusts the position of a point cloud included in the second point cloud data using motion information (a motion vector, for example) that indicates a motion between the first point cloud data and the second point cloud data, and generates the third point cloud data by combining the first point cloud data and the adjusted second point cloud data, and the encoded data includes the motion information.

With this configuration, the three-dimensional data encoding device can bring the positions of point clouds to be combined closer to each other, so that the coding efficiency can be improved.

For example, the three-dimensional data encoding device includes a processor and memory, and the processor performs the process described above using the memory.

Figure 108:
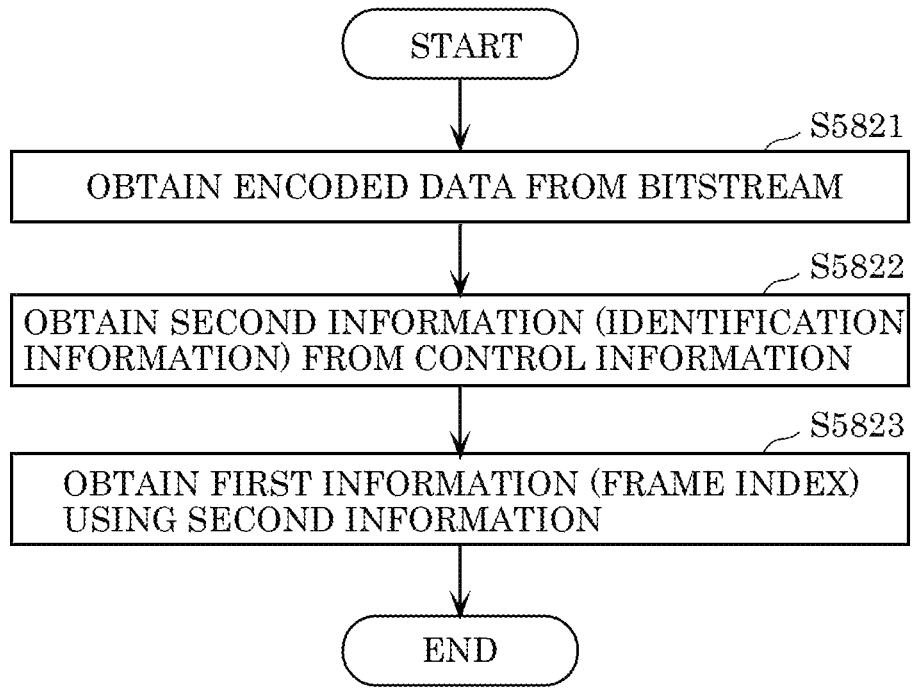
FIG. 108 is a flowchart of a decoding process according to Embodiment 7.

The three-dimensional data decoding device according to this embodiment performs the process shown in FIG. 108. The three-dimensional data decoding device obtains, from a bitstream, encoded data including geometry information and a plurality of pieces of attribute information on each of a plurality of three-dimensional points included in third point cloud data obtained by combining first point cloud data and second point cloud data (S5821). The three-dimensional data decoding device obtains, from control information included in the bitstream, second information (identification information, for example) that indicates, of the plurality of pieces of attribute information, attribute information including first information (a frame index, for example) that indicates whether the associated three-dimensional point belongs to the first point cloud data or the second point cloud data (S5822). The three-dimensional data decoding device obtains the first information using the second information (S5823). For example, the three-dimensional data decoding device identifies the attribute information including the first information using the second information, and obtains the first information from the identified attribute information.

With this configuration, when the first information is included in any of a plurality of pieces of attribute information, the three-dimensional data decoding device can easily determine the attribute information including the first information using the second information included in the control information.

For example, the control information is control information (SPS, for example) common to a plurality of frames.

For example, the attribute information including the first information is encoded using a lossless encoding method. For example, the three-dimensional data decoding device decodes the attribute information encoded using a lossless encoding method using a decoding method corresponding to the lossless encoding method.

For example, a quantization parameter is set so that a lossless encoding method can be used. For example, the three-dimensional data decoding device obtains information indicating the quantization parameter set so that a lossless encoding method can be used from the bitstream, and decodes the attribute information using the decoding method described above using the quantization parameter.

For example, the three-dimensional data decoding device separates the third point cloud data into the first point cloud data and the second point cloud data using the first information.

For example, the three-dimensional data decoding device obtains motion information that indicates a motion between the first point cloud data and the second point cloud data from the bitstream, and adjusts the position of a point cloud included in the second point cloud data using the motion information.

With this configuration, the three-dimensional data decoding device can decode a bitstream encoded with an improved coding efficiency by bringing the positions of point clouds to be combined closer to each other.

For example, the three-dimensional data decoding device includes a processor and memory, and the processor performs the process described above using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
generating encoded data by encoding third point cloud data that is a combination of first point cloud data and second point cloud data; and
generating a bitstream including the encoded data and control information,
wherein the encoded data includes a piece of geometry information and pieces of attribute information of each of three-dimensional points included in the third point cloud data,
one of the pieces of attribute information includes first information indicating whether a corresponding one of the three-dimensional points belongs to the first point cloud data or the second point cloud data, and
the control information includes second information indicating, among the pieces of attribute information, a piece of attribute information including the first information.

2. The three-dimensional data encoding method according to claim 1,
wherein the control information is common to frames.

3. The three-dimensional data encoding method according to claim 1, further comprising:
encoding the piece of attribute information including the first information using lossless encoding.

4. The three-dimensional data encoding method according to claim 3, further comprising:
setting a quantization parameter so that the lossless encoding is to be used.

5. The three-dimensional data encoding method according to claim 1, further comprising:
adjusting a position of a point cloud included in the second point cloud data using motion information indicating motion between the first point cloud data and the second point cloud data; and
generating the third point cloud data by combining the first point cloud data and the second point cloud data after the adjusting,
wherein the encoded data includes the motion information.

6. A three-dimensional data decoding method, comprising:
obtaining encoded data from a bitstream, the encoded data including a piece of geometry information and pieces of attribute information of each of three-dimensional points included in third point cloud data that is a combination of first point cloud data and second point cloud data;
obtaining second information from control information included in the bitstream, the second information indicating, among the pieces of attribute information, a piece of attribute information including first information indicating whether a corresponding one of the three-dimensional points belongs to the first point cloud data or the second point cloud data; and
obtaining the first information using the second information.

7. The three-dimensional data decoding method according to claim 6,
wherein the control information is common to frames.

8. The three-dimensional data decoding method according to claim 6,
wherein the piece of attribute information including the first information is encoded using lossless encoding.

9. The three-dimensional data decoding method according to claim 8,
wherein a quantization parameter is set so that the lossless encoding is to be used.

10. The three-dimensional data decoding method according to claim 6, further comprising:
separating the first point cloud data and the second point cloud data from the third point cloud data using the first information.

11. The three-dimensional data decoding method according to claim 10, further comprising:
obtaining motion information from the bitstream, the motion information indicating motion between the first point cloud data and the second point cloud data; and
adjusting a position of a point cloud included in the second point cloud data using the motion information.

12. A three-dimensional data encoding device, comprising:
a processor; and
memory,
wherein using the memory, the processor:
generates encoded data by encoding third point cloud data that is a combination of first point cloud data and second point cloud data; and
generates a bitstream including the encoded data and control information,
wherein the encoded data includes a piece of geometry information and pieces of attribute information of each of three-dimensional points included in the third point cloud data,
one of the pieces of attribute information includes first information indicating whether a corresponding one of the three-dimensional points belongs to the first point cloud data or the second point cloud data, and
the control information includes second information indicating, among the pieces of attribute information, a piece of attribute information including the first information.

13. A three-dimensional data decoding device, comprising:
- a processor; and
- memory,
- wherein using the memory, the processor:
    - obtains encoded data from a bitstream, the encoded data including a piece of geometry information and pieces of attribute information of each of three-dimensional points included in third point cloud data that is a combination of first point cloud data and second point cloud data;
    - obtains second information from control information included in the bitstream, the second information indicating, among the pieces of attribute information, a piece of attribute information including first information indicating whether a corresponding one of the three-dimensional points belongs to the first point cloud data or the second point cloud data; and
    - obtains the first information using the second information.

* * * * *